US012515027B2

(12) United States Patent
Johnson et al.

(10) Patent No.: US 12,515,027 B2
(45) Date of Patent: Jan. 6, 2026

(54) SUBCUTANEOUS BIODEGRADABLE RESERVOIR DEVICE

(71) Applicant: Research Triangle Institute, Research Triangle Park, NC (US)

(72) Inventors: Leah Marie Johnson, Durham, NC (US); Ariane Van Der Straten, Kensington, CA (US); Ginger Denison Rothrock, Zionsville, IN (US); Linying Alice Li, Durham, NC (US); Ellen Luecke, Research Triangle Park, NC (US); Natalie Girouard, Research Triangle Park, NC (US); Zach Richard Demkovich, Durham, NC (US); Sai Archana Krovi, Morrisville, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 875 days.

(21) Appl. No.: 17/284,989

(22) PCT Filed: Oct. 16, 2019

(86) PCT No.: PCT/US2019/056425
§ 371 (c)(1),
(2) Date: Apr. 13, 2021

(87) PCT Pub. No.: WO2020/081622
PCT Pub. Date: Apr. 23, 2020

(65) Prior Publication Data
US 2021/0346661 A1    Nov. 11, 2021

Related U.S. Application Data

(60) Provisional application No. 62/854,755, filed on May 30, 2019, provisional application No. 62/746,465, filed on Oct. 16, 2018.

(51) Int. Cl.
*A61M 31/00*   (2006.01)
*A61K 9/00*    (2006.01)
*A61L 27/18*   (2006.01)
*A61L 27/54*   (2006.01)
*A61L 27/58*   (2006.01)

(52) U.S. Cl.
CPC ......... *A61M 31/002* (2013.01); *A61K 9/0024* (2013.01); *A61L 27/18* (2013.01); *A61L 27/54* (2013.01); *A61L 27/58* (2013.01); *A61L 2300/43* (2013.01); *A61L 2300/434* (2013.01); *A61L 2300/802* (2013.01); *A61M 2205/02* (2013.01); *A61M 2205/04* (2013.01)

(58) Field of Classification Search
None
See application file for complete search history.

(56) References Cited

U.S. PATENT DOCUMENTS

| 4,148,871 | A | * | 4/1979 | Pitt ...................... | A61K 9/0024 |
| | | | | | 424/426 |
| 4,450,150 | A | * | 5/1984 | Sidman ............... | A61M 31/002 |
| | | | | | 424/424 |
| 5,429,822 | A | | 7/1995 | Gresser et al. | |
| 2003/0007992 | A1 | * | 1/2003 | Gibson ................ | A61K 9/0024 |
| | | | | | 424/425 |
| 2007/0031499 | A1 | * | 2/2007 | Huh ..................... | C08F 222/102 |
| | | | | | 424/487 |
| 2007/0275035 | A1 | | 11/2007 | Herman et al. | |
| 2012/0277690 | A1 | | 11/2012 | Schachter et al. | |
| 2014/0296799 | A1 | | 10/2014 | Baert et al. | |
| 2018/0235900 | A1 | * | 8/2018 | Swarner ............... | A61K 9/0024 |
| 2022/0387310 | A1 | * | 12/2022 | Altreuter ............... | A61K 31/13 |

FOREIGN PATENT DOCUMENTS

| JP | 1993508627 B2 | | 12/1993 |
| JP | 2004535431 A | | 11/2004 |
| WO | WO9116887 A1 | * | 11/1991 |
| WO | 03000156 A1 | | 1/2003 |
| WO | 2003000156 A1 | | 1/2003 |
| WO | WO-2016149561 A1 | * | 9/2016 |

OTHER PUBLICATIONS

Czarnecka, K., et al., Solution Blow Spinning of Polycaprolactone-Rheological Determination of Spinnability and the Effect of Processing Conditions on Fiber Diameter and Alignment, Materials (Basel). Mar. 2021; 14(6): 1463 (Year: 2021).*
ISA/KR; International Search Report and Written Opinion for International Patent Application No. PCT/US2019/056425 dated Feb. 7, 2020, 12 pages.
Langer, Robert, "Implantable Controlled Release Systems", Pharmacology & Therapeutics, 1983, vol. 21, 17 pages.
"HPTN 084: A Phase 3 Double Blind Safety and Efficacy Study of Long-Acting Injectable Cabotegravir Compared to Daily Oral TDF/FTC for Pre-Exposure Prophylaxis in HIV-Uninfected Women", A Study of the HIV Prevention Trials Network, Version 2.0, Nov. 6, 2019, 150 pages.
Solorio, L., et al., "Part III: Implantable Polymeric Drug Delivery Systems", Implantable Drug Delivery Systems: In Engineering Polymer Systems for Improved Drug Delivery, Jan. 17, 2014, 36 pages.
Yang, W. W. et al., "Reservoir-Based Polymer Drug Delivery Systems", Journal of Laboratory Automation, 2012, vol. 17, Issue 1, 9 pages.

(Continued)

*Primary Examiner* — H. Sarah Park
(74) *Attorney, Agent, or Firm* — Rimon P.C.; Allyn B. Elliott

(57) ABSTRACT

A reservoir device comprising an active agent formulation contained within a reservoir is described. The reservoir is defined by a biodegradable, permeable polymer membrane having a thickness of at least 45 μm. The membrane allows for diffusion of an active agent of the formulation there through when positioned subcutaneously in a body of a subject.

9 Claims, 53 Drawing Sheets

(56) References Cited

OTHER PUBLICATIONS

Gunawardana, M., et al., "Pharmacokinetics of long-acting tenofovir alafenamide (GS-7340) subdermal implant for HIV prophylaxis", Antimicrobial Agents and Chemotherapy, Jul. 2015, vol. 59, No. 7, 7 pages.
Chua, C.Y.X., et al., "Transcutaneously refillable nanofluidic implant achieves sustained level of tenofovir diphosphate for HIV pre-exposure prophylaxis", Journal of Controlled Release, Sep. 28, 2018, vol. 286, 27 pages.
Barrett, S.E., et al., Extended-Duration MK-8591-Eluting Implant as a Candidate for HIV Treatment and Prevention, Antimicrobial Agents and Chemotherapy, American Society for Microbiology, Oct. 2018, vol. 62, Issue 10, 13 pages.
"A New Collaboration for HIV Prevention", Intarcia Therapeutics, Inc., Revolutionizing HIV Prevention: Converging Medicine and Technology, Jun. 30, 2017, 1 page.
Pitt, C.G., et al., "Aliphatic Polyesters. I. The Degradation of Poly(e-caprolactone) In Vivo", Journal of Applied Polymer Science, 1981, vol. 26, 9 pages.
Woodruff, Maria Ann, et al., "The return of a forgotten polymer-Polycaprolactone in the 21st century", Progress in Polymer Science, Elsevier, 2010, vol. 35, 40 pages.
Clarification Memo #2, "HPTN 083: A Phase 2b/3 Double Blind Safety and Efficacy Study of Injectable Cabotegravir Compared to Daily Oral Tenofovir Disoproxil Fumarate/Emtricitabine (TDF/FTC), For Pre-Exposure Prophylaxis in HIV-Uninfected Cisgender Men and Transgender Women who have Sex with Men", Version 1.0, Oct. 19, 2017, 2 pages.
EPO; Extended European Search Report for European Patent Application No. EP 19872676 dated Jul. 7, 2022, 8 pages.
IPI; Office Action for Indian Patent Application No. 202117016380 dated Oct. 6, 2022, 7 pages.
WIPO; International Preliminary Report on Patetnability for International Patent Application No. PCT/US19/56425 dated Apr. 29, 2021, 8 pages.
JPO; Examination Report for Japanese Patent Application No. 2021-516877, dated Jul. 25, 2023, 12 pages.
JPO: Office Action for Japanese Patent Application No. 2021-516877, dated Oct. 23, 2023, 8 pages.
CNIPA: Office Action for Chinese Patent Application No. 201980068120.6, dated Dec. 8, 2023, 11 pages.
ILPO: Office Action for Israeli Patent Application No. 282289 dated Dec. 10, 2023, 4 pages.

\* cited by examiner

SUBCUTANEOUS BIODEGRADABLE RESERVOIR DEVICE

CROSS-REFERENCE TO RELATED APPLICATIONS

This application is a national stage application of International Patent Application No. PCT/US19/56425 filed on Oct. 16, 2019, which claims the benefit of U.S. Provisional Patent Application No. 62/746,465, filed Oct. 16, 2018, and U.S. Provisional Patent Application No. 62/854,755, filed May 30, 2019, the entire contents of which are hereby incorporated herein by reference.

FEDERAL FUNDING LEGEND

The invention was made with support under Cooperative Agreement No: AID-OAA-A-14-00012, and Cooperative Agreement No: AID-OAA-A-17-00011 awarded by the United States Agency for International Development. The Government has certain rights in the invention.

TECHNICAL FIELD

A subcutaneous biodegradable reservoir device for sustained delivery of an active agent over an extended period of time is described herein. Physical parameters of the device and active agent formulations contained therein can be selected to provide effective and sustained delivery of the active agent.

BACKGROUND

The need for effective biomedical interventions for preventative indications (e.g., pregnancy, infectious disease) and therapeutic needs (e.g., disease, opioid addiction) remains important worldwide. In general, end-users have persistently struggled with suboptimal adherence to daily oral or on-demand interventions. Sustained, user-independent delivery of active pharmaceutical ingredients (APIs) or active pharmaceutical agents enables users to avoid burdensome time- or event-driven regimens and bypasses many adherence challenges of user-dependent methods. Also, systemic administration, combined with long-term delivery, may significantly protect and treat many disease indications without first pass effects through the liver, which can reduce the bioavailability.

An area where improvements in biomedical intervention could prove beneficial is the global HIV epidemic. HIV Pre-Exposure Prophylaxis (PrEP) with antiretroviral (ARV) drugs is a promising biomedical strategy to address the global problem. Tenofovir-based PrEP has demonstrated successes with daily and on-demand dosing. Despite these advancements, adherence to time- or event-driven regimens for PrEP remains a struggle. Long-acting (LA) delivery of ARV drugs simplifies traditional dosing regimens for PrEP by alleviating the emotional and logistical burden of user-dependent methods. For example, a LA-injectable formulation of the integrase inhibitor, cabotegravir (CAB), is currently under investigation in two phase 2/3 HIV PrEP trials. See, HPTN083 and HPTN084. Although injectable methods are acceptable to many users and offer key advantages, such as a bi-monthly dosing regimen and discretion, drawbacks do exist. Injectable formulations cannot be removed in the event of an adverse drug-related event and the potential exists for a long plasma "tail" of sub-therapeutic drug levels.

A promising biomedical approach for LA-PrEP involves implants that reside under the skin to continuously release drug, which supports adherence over longer time periods, enables discretion of use, lowers the burden of the regimen, and remains reversible during the therapeutic duration. Polymeric implants can comprise different architectures that each has advantages for drug delivery. See Solorio, L. et al.; Yang, W.-W. et al.; and Langer, R. Reservoir-style implants involve a formulated drug core encapsulated by a rate-controlling polymeric barrier. Notable examples of implants with a core-sheath configuration include the collection of subdermal contraceptive implants: Norplant® and Jadelle® for delivery of levonorgestrel (LNG) using a rod of silicone-based polymer and Implanon® and Nexplanon® for delivery of etonogestrel (ENG) using a rod of ethylene-vinyl acetate (EVA)-based polymer. The low dosages required for subcutaneous delivery of hormonal contraceptives enable these implants to last multiple years. Reservoir-style implants have also shown utility for indications in ophthalmology.

Several implants are currently under development for HIV PrEP, with each implant system holding unique configurations and features. A subdermal, silicone implant that delivers TAF from orthogonal channels coated with polyvinyl alcohol (PVA) showed 40-days of drug delivery in beagle dogs without observed adverse events. See Gunawardana, M. et al. A non-polymeric, refillable implant designed to deliver TAF and emtricitabine (FTC) from separate devices showed sustained levels of tenofovir diphosphate (TFV-DP) in peripheral blood mononuclear cells (PBMCs) over 83 days in rhesus macaques but only 28 days for FTC-triphosphate (FTC-TP) due to the large dosing required and short plasma half-life. See Chua, C. Y. X. et al. A titanium osmotic pump system, called the Medici Drug Delivery System™, is being developed for PrEP and for type-2 diabetes. See A New Collaboration for HIV Prevention Available online. Additionally, a matrix-style PrEP implant for delivery of 4'-ethylnyl-2-fluoro-2'-dexoyadenosine (EFdA) has shown promising efficacy for HIV treatment and prevention, as demonstrated in animal models. See Barrett, S. E. et al.

Currently, there is an unmet need for a long-acting, biodegradable drug delivery implant device. If such device had zero-order drug release kinetics, it could provide a flat PK profile at a steady state. As such, when active agent was depleted from the device, only a minimal tail would be expected according to the drug's half-life. Such technology could be used for a wide variety of therapeutics and preventatives, including small molecules and biologics.

SUMMARY OF THE DISCLOSURE

In a first aspect of the invention, a reservoir device includes an active agent formulation contained within a reservoir. The reservoir is defined by a biodegradable, permeable polymer membrane having a thickness of at least 45 µm. The membrane allows for diffusion of an active agent of the formulation there through when positioned subcutaneously in a body of a subject.

Implementations may include one or more of the following features. The device where the permeable polymer membrane has a thickness of at least 45 µm. The device where the active agent formulation includes an active agent and an excipient. The device where the reservoir includes a first segment and a second segment, and where the first segment contains a first active agent formulation and the second segment contains a second active agent formulation, which is different from the first active agent formulation.

In a second aspect of the invention, a reservoir device includes an active agent contained within a reservoir. The reservoir is defined by a biodegradable, permeable polymer membrane, wherein the membrane allows for diffusion of the active agent there through with zero-order release kinetics for a time period of at least 60 days when positioned subcutaneously in a body of a subject.

Implementations may include one or more of the following features. The device where the active agent includes tenofovir alafenamide fumarate (TAF), 4'-ethynyl-2-fluoro-2'-deoxyadenosine (EFdA), EFdA-alafenamide, levonorgestrel (LNG); etonogestrel (ENG) or combinations thereof. The device where the active agent includes an antibody, a small molecule, a protein, a peptide, a hormone or a combination thereof. The device where the reservoir further contains an excipient.

In a third aspect of the invention, a method for manufacturing a reservoir device for delivery of an active agent formulation to a subject includes folding a polymer membrane over to define a tubular cavity; depositing an active agent formulation into the tubular cavity; and creating a seal in the polymer membrane that contains the active agent formulation within the tubular cavity thereby providing a reservoir device. The method also includes the polymer membrane allowing for diffusion of the active agent through the membrane when the reservoir device is positioned subcutaneously in a body of a subject.

BRIEF DESCRIPTION OF THE DRAWINGS

The foregoing aspects and other features of the disclosure are explained in the following description, taken in connection with the accompanying drawings, wherein.

DETAILED DESCRIPTION

Figure 1:
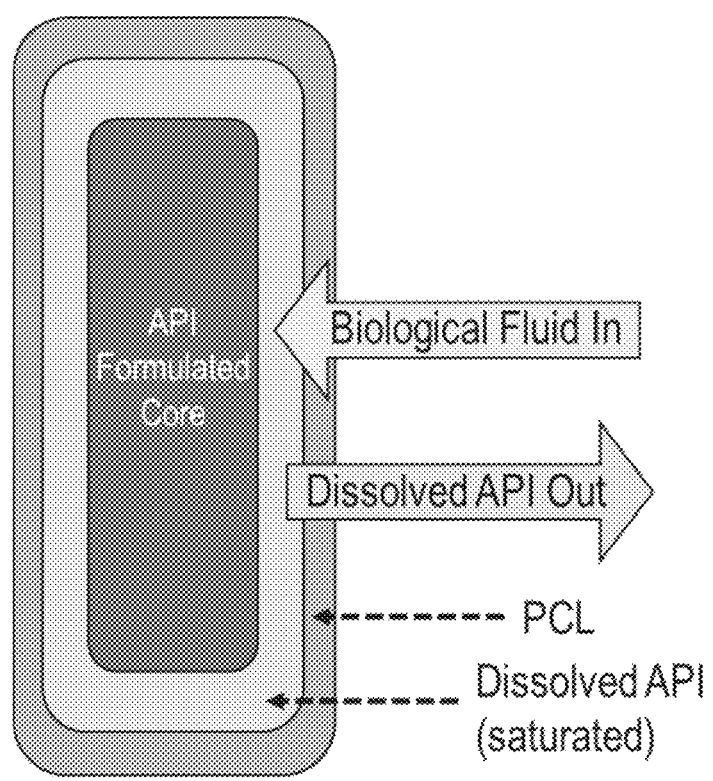
FIG. 1 is a schematic representation of an exemplary drug delivery device in accordance with an aspect of the invention.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "a reservoir device" means at least one reservoir device and can include more than one reservoir device.

Unless otherwise defined, all technical terms used herein have the same meaning as commonly understood by one of ordinary skill in the art to which this disclosure belongs.

A biodegradable medical device and accompanying formulations that enable long-acting, sustained delivery of an active pharmaceutical ingredient (API) are described. The terms "active pharmaceutical ingredient" and "active agent" are used interchangeably throughout the present description. The medical device has a reservoir that contains an active agent formulation. The reservoir is defined by a biodegradable, permeable polymer membrane that has a thickness of at least 45 μm. In a preferred embodiment, the polymer membrane has a thickness of at least 70 μm. The membrane allows for diffusion of an active agent of the formulation there through when positioned subcutaneously in a body of a subject.

The active agent formulation includes an active agent and an excipient. The active agent can be one or a combination of a therapeutic, a preventative, a prophylactic and/or a contraceptive. In some embodiments, the active agent comprises an antibody, a small molecule, a protein, and/or a peptide. For example, in embodiments, the active agent comprises an antibody for the prevention of HIV infection. In other embodiments, the active agent comprises a nucleotide reverse transcriptase inhibitor (NRTI) for prevention of HIV infection. Exemplary active agents include Tenofovir Alafenamide Fumarate (TAF), Tenofovir (TFV), Tenofovir disoproxil fumarate, 4'-Ethynyl-2-fluoro-2'-deoxyadenosine (EFdA) or a pro drug of EFdA such as EFdA-alafenamide (or other), Levonorgestrel (LNG), Etonogestrel (ENG) Emtricitabine (FTC), Tamoxifen, Tamoxifen citrate, Naltrexone hydrochloride, Naltrexone, Naloxone or combinations thereof. Not all active agents are amenable for use in the described device. Active agents having sufficient aqueous solubility and stability and dosing requirements and that are amenable to size parameters of the device are suitable for use in the described device. Moreover, in embodiments, the active agents retain a high level of purity that is both safe and efficacious to the user throughout the intended dosage duration and are not susceptible to immediate degradation caused by environmental contents (e.g., body fluids, physiological temperature). In additional embodiments, the solubility of active agents within potential excipients can range from 0.1-50 mg/mL. Whether the solubility of the active agent in the excipient enables a sufficient rate of drug release to meet therapeutic dose criteria is considered when selecting active agent/excipient pairings. For example, Elvitegravir, an integrase inhibitor used to treat HIV infection, was evaluated for use in the described device but was not selected for further development because of relatively low solubility and suboptimal potency of the drug. More particularly, the required subcutaneous dose for Elvitegravir is estimated to be ~16 mg/day. In an exemplary device, the active agent loading capacity of one device (2.5 mm×40 mm) is about 120 mg. With these values, the implant would be depleted in a week.

Exemplary embodiments of active agent formulations have been shown to provide desirable release profiles for various active agents over an extended period of time. For example, LNG devices can have release rates of 20 μg/day to 40 μg/day. In particular, exemplary LNG formulations exhibited release profiles of approximately 30 μg/day. Moreover, linear release profiles for LNG were achieved for up to 320 days in vitro, and the stability of LNG was greater than 92% within an exemplary implant when tested at 240 days in in-vitro conditions. Further, exemplary ENG formulations exhibited release profiles of approximately 30 μg/day. Linear release profiles for ENG were achieved for 230 days in vitro, and the stability of ENG was >99% within an exemplary implant that was tested at 180 days in in-vitro conditions. Exemplary EFdA formulations exhibited sustained linear release of approximately 5-30 μg/day for over 1 year, and EFdA showed a stability of nearly 99% within an exemplary implant after 1 year in in-vitro conditions.

Additional potential active pharmaceutical ingredients include active agents useful for various indications including, but not limited to, hormones for thyroid disorder, autoimmune disease or adrenal insufficiency, androgen replacement therapy, transgender hormone therapy, androgen deprivation therapy, growth hormone deficiency, Cushing's syndrome, depression, use as contraceptive agents and diabetes; antibiotics; antivirals for HIV, Influenza, Herpes, Hepatitis B, and Hepatitis C; Opioid addiction; antidepressants; antipsychotics; Attention-Deficit/Hyperactivity Disorder (ADHD); Hypertension; and Breast Cancer. Exemplary active pharmaceutical ingredients can include, without limitation, the following hormones: Levothyroxine, Thyroxine (T4), Triiodothyronine (T3), Cortisol, Dexamethasone, Testosterone, Leuprorelin, Goserelin, Triptoreline, Histrelin, Buserelin, Degarelix, cyproterone acetate, flutamide, nilutamide, bicalutamide, enzalutamide, Growth hormone, somatotropin, recombinant growth hormone, Antiglucocorticoid compounds (Mifepristone, metyrapone, ketoconazole), Insulin, Contraceptive agents such as Progestogens: desogestrel, norethisterone, etynodiol diacetate, levonorgestrel, lynestrenol, norgestrel, Estrogen, ethinylestradiol, and mestranol.

Exemplary active pharmaceutical ingredients can include, without limitation, the following antibiotics: penicillins, cephalosporins, rifamysins, lipiarmycins, quinolones, sulfonamides, macrolides, lincosamides, and tetracyclines.

Exemplary active pharmaceutical ingredients can include, without limitation, the following HIV antivirals: Integrase Inhibitors such as Dolutegravir, Elvitegravir, and Raltegravir; Nuceloside/Nucleotide reverse transcriptase inhibitors (NRTIs) such as abacavir, lamivudine, zidovudine, emtricitabine, tenofovir disoproxil fumarate, tenofovir alafenamide, EFdA, didanosine, stavudine, and zalcitabine; Non-nucleoside reverse transcriptase inhibitors (NNRTIs) such as efavirenz, etravirine, nevirapine, rilpivirine, and delavidine mesylate; Protease inhibitors such as atazanavir, cobicistat, lopinavir, ritonavir, darunavir, fosamprenavir, tipranavir, nelfinavir, indinavir, saquinavir, and amprenavir; Entry Inhibitors such as enfuviride; CCR5 antagonists such as maraviroc, and vicriviroc; and P4503A inhibitors such as cobicistat and ritonavir. Exemplary active pharmaceutical ingredients can further include, without limitation, the following influenza antivirals: Amantadine, Umifenovir, Moroxydine, Nitazoxanide, oseltamivir, peramivir, rimantadine, zanamivir; the following Herpes antivirals: Acyclovir, edoxudine, famciclovir, foscarnet, inosine pranobex, idoxuridine, penciclovir, trifluridine, valaciclovir, vidarabine; the following Hepatitis B antivirals: Adefovir, entecavir, pegylated interferon alfa-2a; and the following Hepatitis C antivirals: Sofosbuvir, simeprevir, ledipasvir, daclatasvir, velpatasvir, telaprevir, and taribavirin.

Exemplary active pharmaceutical ingredients can include, without limitation, the following active agents for use with opioid addiction: Methadone, buprenorphine, naltrexone, naloxone, nalmefene, nalorphine, nalorphine dinicotinate, levallorphan, samidorphan, dezocine, nalbuphrine, pentazocine, phenazocine, and butophanol. Exemplary active pharmaceutical ingredients can include, without limitation, the following antidepressants and antipsychotics: Citalopram, Escitalopram, Fluoxetine, Fluvoxamine, Paroxetine, Sertraline, Desvenlafaxine, Duloxetine, Levomilnacipran, Milnacipran, Venlafaxine, Vilazodone, Vortioxetine, Trazodone, Atomoxetine, Reboxetine, Teniloxazine, Viloxazine, Bipropion, Amitriptyline, Amitriptylinoxide, Clomipramine, Desipramine, Dibenzepin, Dimetacrine, Dosulepin, Doxepin, Imipramine, Lofepramine, Melitracen, Nitroxazepine, Nortriptyline, Noxiptiline, Opipramol, Pipofezine, Protriptyline, Trimipramine, Tetracyclic antidepressants, Amoxapine, Maprotiline, Mianserin, Mirtazapine, Setiptiline, Amisulpride, Aripiprazole, Brexpiprazole, Lurasidone, Olanzapine, Quetiapine, Risperidone, Buspirone, Lithium, and Modafinil. Exemplary active pharmaceutical ingredients can include, without limitation, the following agents for ADHD: Adderall XR, Concerta, Dexedrine, Evekeo, Focalin XR, Quillivant XR, Ritalin, Strattera, and Vyvanse. Exemplary active pharmaceutical ingredients can include, without limitation, the following agents for Hypertension: Beta-blockers such as cebutolol, atenolol, betaxolol, bisoprolol, bisoprolol/hydrochlorothiazide, metoprolol tartrate, metoprolol succinate, nadolol, pindolol, propranolol, solotol, timolol; Angiotensin converting enzyme inhibitors (ACE inhibitors) such as benazepril, captopril, enalapril, fosinopril, lisinopril, moexipril, perindopril, quinapril, ramipril, trandolapril; and Angiotensin-receptor blockers (ARBs) such as candesartan, eprosartan, irbesartan, losartan, telmisartan, valsartan. Exemplary active pharmaceutical ingredients can include, without limitation, the following agents for Breast Cancer: Tamoxifen, anastrozole, exemestane, letrozole, fulvestrant, toremifene. Exemplary active pharmaceutical ingredients can include, without limitation, the following agents: Rintatolimod for Chronic fatigue syndrome, Cidofovir, Fomivirsen for cytomegalovirus retinitis, Metisazone for smallpox, pleconaril for picornavirus respiratory infection, ribavirin for Hepatitis C or viral hemorrhagic fevers, and valganciclovir for cytomegalovirus CMV infection.

The excipient is mixed with the active agent to form the active agent formulation, and thus, is also contained within the reservoir. Exemplary excipients include, but are not limited to, castor oil, sesame oil, oleic acid, polyethylene glycol, ethyl oleate, propylene glycol, glycerol, cottonseed oil, polysorbate 80, synperonic PE/L or combinations thereof. Criteria for down-selection of the excipients include the stability (e.g., chemical purity) and compatibility (e.g., physical mixing properties) of the active agent formulation, and support of targeted release kinetics. As used herein, the stability of a component (active or excipient) means that the component retains its original chemical structure and biological activity after exposure to an environmental condition. For example, a component may have a chemical stability greater than 90%, as determined by HPLC-UVVIS analysis. Additional potential excipients include, for example, polyethylene glycol 300 (PEG 300), PEG 400, PEG 600, PEG40, α-cyclodextrin, β-cyclodextrin, and γ-cyclodextrin.

The choice of excipient to use in a formulation with an active agent can affect the release rate and release profile of the active agent. For example, the solubility of a particular active agent in an excipient can affect the release rate and profile of the active agent. In some embodiments, an excipient with higher solubility for an active agent can show a faster release rate. Further description is provided by the examples below.

Additionally, the formulation or concentration ratio of active agent to excipient can affect the release profile of the active agent. In embodiments, it is desirable to find a maximum ratio or optimal ratio of active agent to excipient that maximizes active agent loading capacity in the device while maintaining a zero-order release profile. When the ratio of active agent to excipient is above the maximum ratio, the release profile may not be a linear, zero-order release profile. However, the release profile may transition to a linear, zero-order release profile over time, as active agent is released from the device. A device having an active agent formulation with a ratio of active agent to excipient that is below the maximum ratio may provide a zero-order release profile. All other parameters being the same (for example, excipient type, active agent, device size, and membrane thickness), the device with the lower ratio of drug to excipient has less active agent than a device having the maximum ratio and thus will likely have a shorter active agent release duration than the device with the maximum ratio. Exemplary active agent/excipient ratios include, for example, 5:1, 4:1, 3:1, 2:1, 1:1, 1:2, 1:3, 1:4 and 1:5.

Moreover, the properties and characteristics of a particular active agent and a particular excipient can determine the formulation ratio that is ideal for a particular application. Accordingly, the formulation ratio for a single active agent may be different depending on the excipient that is used.

Two processes are involved in the controlled release of an active agent: 1) Dissolution of the active agent (e.g., TAF) within an excipient, and 2) Diffusion of the active agent solution through the polymer membrane.

With the dissolution process, particles of active agent are continuously being dissolved in the excipient solution. The Noyce-Whitney equation can be used to describe the dissolution process:

$$\frac{dm}{dt} = A \frac{D_s(C_s - C_b)}{h}$$

In the Noyce-Whitney equation, dm/dt is the dissolution rate, A is the surface area of the interface between the substance and the solvent, $D_s$ is the diffusion coefficient within the excipient, h is the thickness of the diffusion layer, $C_s$ is the saturation concentration of the substance within the solvent, and $C_b$ is the mass concentration of the substance in the bulk of the solvent With the diffusion process, the active agent (e.g., TAF) first partitions into the membrane and then diffuses to the other side of the membrane. Fick's First Law of Diffusion can be used to describe the diffusion process:

$$J = -D_m \frac{d\varphi}{dx}$$

In Fick's first law of diffusion, J is diffusion rate or the amount of drug released from the membrane per unit area per unit time, Dm is diffusion coefficient through the membrane, $\varphi$ is concentration, and x is length. FIG. 1 is a labelled, schematic representation of a drug delivery device.

As will be described more fully below in the Examples, linear release profiles having the same constant release rate were observed for devices comprising TAF formulated with castor oil in ratios of 1:1, 2:1 and 3:1. The linear release profile indicated a membrane-controlled release rate for these formulation concentrations.

According to Fick's first law of diffusion, when the reservoir is saturated, a constant concentration gradient dφ/dx is maintained in the membrane, so the rate for drug flux J is constant and zero order release is achieved. The constant release rate for the diffusion-controlled process can be calculated according to the modified diffusion equation:

$$J = D_m K \frac{C_s}{L}$$

In the modified equation, J is the amount of drug released from the membrane per unit area per unit time (mg/day/ mm$^2$), Dm is diffusion coefficient through the membrane, K is partition coefficient, Cs is the saturation concentration of the substance within the excipient, L is thickness of the PCL membrane.

When the dissolution rate is greater than the diffusion rate, the release rate is membrane controlled and the release profile is linear. In contrast, when the dissolution rate is less than the diffusion rate, the release rate is dissolution limited or controlled and the release profile is non-linear.

The active agent formulation can include additional components. For example, antioxidant components (e.g., α-tocopherol, retinyl palmitate, selenium, Vitamin A, Vitamin C, cysteine, methionine, citric acid, sodium citrate, methyl paraben, and propyl paraben), buffering agents and hydrophile lipophile balance (HLB) modifiers can be included in the formulation. Exemplary buffering agents and HLB modifier include, but are not limited to, sodium citrate, dibasic potassium phosphate, sodium succinate, meglumine, glycine, tromethamine, Labrafac WL 1349 (HLB 1), Compritol 888 (HLB 1), Labrafil M2130 (HLB 9) and Gelot 64 (HLB 10). Binders can also be used in the formulation including sugar alcohols (e.g., xylitol, sorbitol, mannitol), polysaccharides (e.g., starches, cellulose, hydroxypropyl cellulose), or disaccharides (e.g., sucrose, lactose). One of ordinary skill in the art will understand that additional suitable excipient components may be included as appropriate and/or as needed.

The biodegradable, permeable polymer membrane also affects the release kinetics of the active agent. For example, the thickness of the membrane affects the release rate of the active agent. As the thickness of the membrane increases, the release rate of the active agent decreases. In exemplary embodiments, the membrane can have a thickness ranging from about 45 µm to about 500 µm. For example, the membrane may have a thickness of 45 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm or 250 µm, 260 µm, 270 µm, 280 µm, 290 µm, 300 µm, 320 µm, 340 µm, 360 µm, 380 µm, 400 µm, 420 µm, 440 µm, 460 µm, 480 µm, or 500 µm.

The polymer membrane can comprise homopolymers, blends of more than one homopolymer, block co-polymers, or combinations thereof. Configurations of the co-polymers can include random, linear block co-polymers, and star-shaped block co-polymers. A non-limiting example of a block co-polymer is ABA, where A is a crystallizable block and B is an amorphous block. A non-limiting example of a star-shaped block co-polymer includes the combination of Poly-ε-caprolactone and Poly-valerolactone. Exemplary embodiments of the device may include one or more of the following polymers: Poly-ε-caprolactone, Poly(ε-caprolactone-co-ε-decalactone), Polyglycolic acid, Polylactic acid, Poly(glycolic-co-lactic) acid, Polydioxanone, Polyvalerolactone, Poly(3-hydroxyvalerate), Poly(3-hydroxylbutyrate), Polytartronic acid, and Poly(β-malonic acid).

The molecular weight of the polymer can affect the release rate of the active agent. For example, release rates of active agent from the implant can be tuned using polymers of different starting molecular weights. Moreover, polymer compositions that include binary polymer blends offer the ability to further tailor biodegradation rates, API release rates, and mechanical properties. The membrane of the device may comprise homopolymers. As used herein, "homopolymer" means a polymer chain comprising a single monomer. Homopolymers can be different molecular weights. Non-limiting examples of homopolymers include poly-ε-caprolactone (PCL), poly(L-lactide), poly(D-lactide), poly(D,L-lactide), polyglycolide (PGA), polyacrylic acid, polydioxanone (PDO), poly(valerolactone), poly(3-hydroxyvalerate), poly(3-hydroxylbutyrate) (3-PHB), poly(4-hydroxylbutyrate) (4-PHB), polyhydroxyvalerate (PHV), polytartronic acid, poly(D,L-methylethylglycolic acid), poly (dimethylglycolic acid), poly (D,L-ethylglycolic acid), and poly(β-malonic acid) or combinations thereof. In certain embodiments, blends of two homopolymers are used.

In certain embodiments, the membrane of the implant may comprise co-polymers. Co-polymers can comprise different connectivity including block co-polymers, graft co-polymers, random co-polymers, alternating co-polymers, star co-polymers, and periodic co-polymers. Nonlimiting examples of co-polymers include poly(L-lactide-co-D,L-lactide), poly(L-lactide-co-D-lactide), poly(L-lactide-co-glycolide), poly(L-lactide-co-ε-caprolactone), poly(D,L-lactide-co-ε-caprolactone), poly(D,L-lactide-co-glycolide), poly(glycolide-co-ε-caprolactone), poly(ε-caprolactone-co-D,L-ε-decalactone), polylactide-block-poly(ε-caprolactone-co-ε-decalactone)-block-poly(lactide), poly(ethylene glycol-co-ε-caprolactone), poly-ε-caprolactone-co-polyethylene glycol, poly(3-hydroxylbutyrate-co-3-hydroxylvalerate), poly(ethylene glycol-co-lactide), or combinations thereof.

For example, the membranes may comprise polycaprolactone (PCL) at a number average molecular weight ranging from 15,000 to 120,000 Da. In some embodiments, a higher molecular weight PCL (e.g., 80 kDa) results in a faster release rate of active agent, whereas a lower molecular weight PCL (e.g., 45 kDa) results in a slower release rate of active agent.

In embodiments, the implant is designed to biodegrade within the body after the active agent(s) is depleted. The biodegradable polymer (e.g., PCL) can be tuned to meet the requisite biodegradation properties (that is, to optimize the time between depletion of active agent and complete polymer biodegradation). For example, biodegradation can be tuned by selecting targeted molecular weights of a homopolymer (e.g., PCL of 45 kDa or 80 kdA or blends) or by using co-polymers, as listed above. The polymer membrane has an initial molecular weight at implantation. In embodiments, the polymer membrane is configured such that the molecular weight of the membrane is reduced to a molecular weight ranging from 10 kDa to 2 kDa after the active agent is depleted from the device. For example, the molecular weight may be reduced to a molecular weight ranging from about 8 kDa to about 3 kDa after the drug is depleted from the device. Without being bound by theory, it is believed that PCL undergoes biodegradation via bulk mode hydrolysis. For example, substantial loss of weight and fragmentation of polymer can occur at about 5 kDa MW, with intracellular bioresorption taking place at about 3 kDa MW. In embodiments, the polymer membrane can be configured such that it undergoes fragmentation at a time ranging from about 1 month to about 6 months after the active agent is depleted from the device. In this regard, exemplary embodiments having 80 kDa MW PCL films have shown an extended rate of biodegradation, typically on the order of >24 months. Further description is provided by the examples below.

Figure 2A:
FIGS. 2A and 2B are schematic representations of different embodiments of homopolymer blends.
Figure 2A:
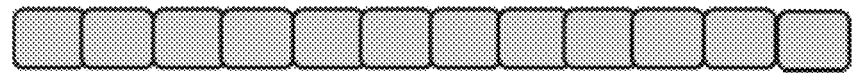
Figure 2B:
Figure 2B:
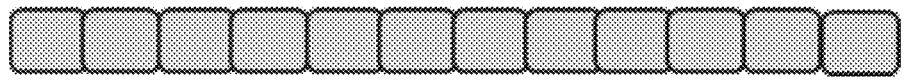
Figure 2C:
FIGS. 2C, 2D, 2E, 2F and 2H are schematic representations of different embodiments of co-polymers.
Figure 2D:
Figure 2E:
Figure 2F:
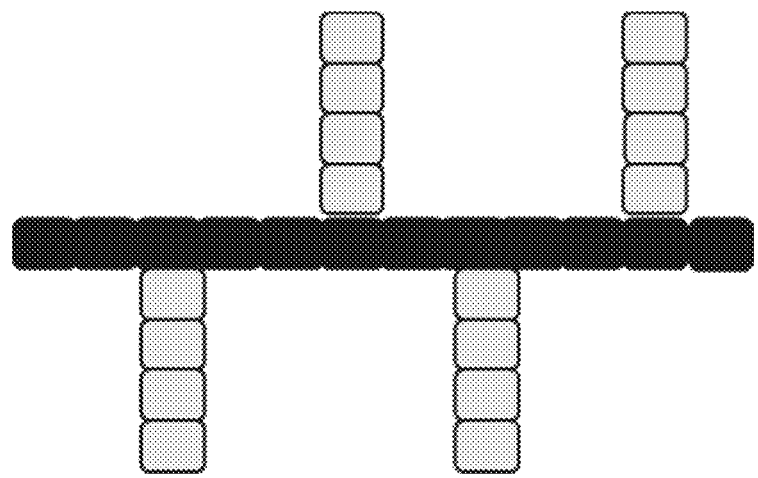
Figure 2G:
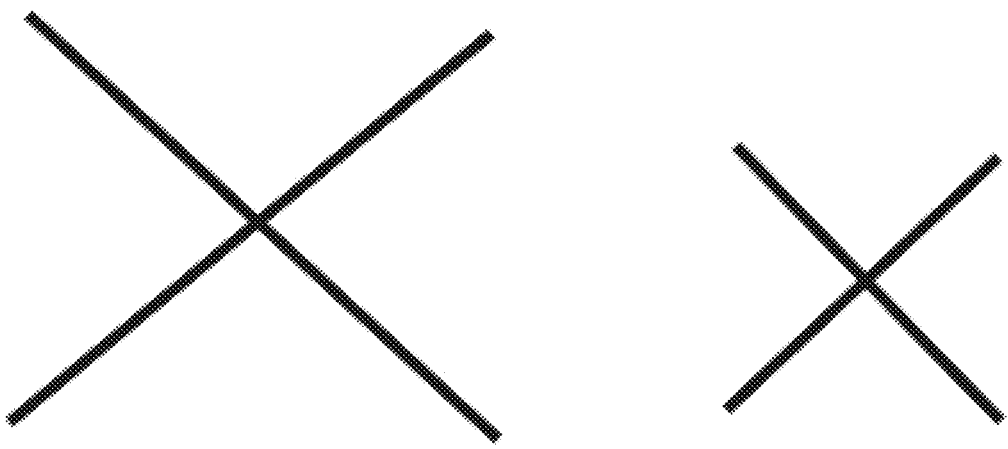
FIG. 2G is a schematic representation of star homopolymers of different molecular weights.
Figure 2H:
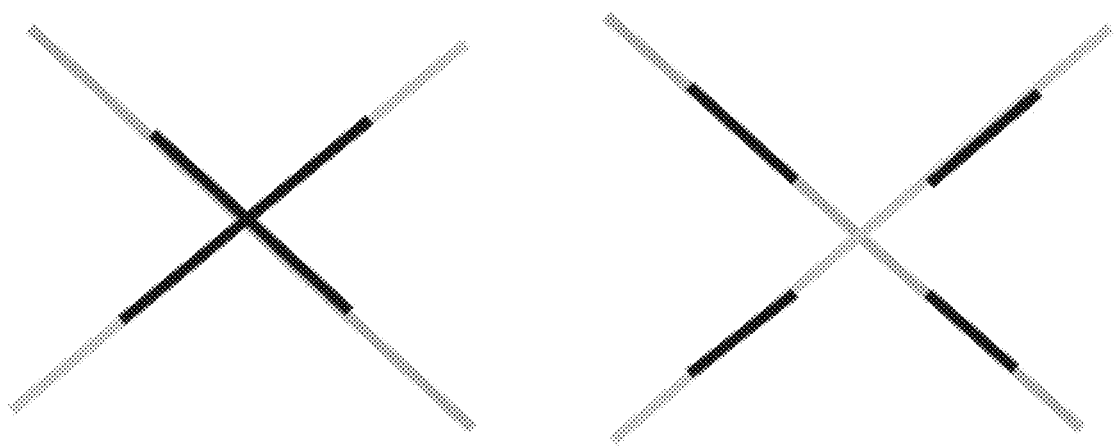

The polymer membrane can comprise a blend of homopolymers with the same composition but different molecular weights (MW). For example, the polymer membrane could comprise a blend of PC12 and PC17, where each homopolymer is PCL, but the average molecular weight of each is different. The polymer membrane may comprise a blend of homopolymers, where each homopolymer has a different composition and a different molecular weight. For example, the polymer membrane could comprise a blend of PCL and PLA. The polymer membrane may comprise co-polymers, blends of co-polymers, or blends of homopolymers and co-polymers. FIGS. 2A and 2B are schematic representations of different embodiments of homopolymer blends. FIG. 2A illustrates a blend of two homopolymers, with each homopolymer having a different chemical composition. Each segment or block in the illustration represents a monomeric unit. FIG. 2B illustrates a blend of two homopolymers, with each homopolymer having the same chemical composition, but different molecular weights. FIGS. 2C, 2D, 2E, 2F and 2H are schematic representations of different embodiments of co-polymers. FIG. 2C is an alternating co-polymer; FIG. 2D is a random co-polymer; FIG. 2E is a block co-polymer; FIG. 2F is a graft co-polymer; FIG. 2G is a representation of star homopolymers of different molecular weights; and FIG. 2H is star co-polymers.

Additionally, the composition, molecular weight and thickness of the membrane affect the biodegradation rate of the device. The device comprised of the biodegradable polymer is placed subcutaneously in a subject. It releases active agent for an intended dosage duration. The device is designed to lose integrity due to biodegradation at time proximate to but after availability of the active agent. That is, parameters of the polymer membrane can be chosen to enable the device to maintain integrity for at least as long as the intended dosage duration of the active agent in the device.

In embodiments, the device structure maintains integrity for a time period of about 3 months to about 2 years. For example, the device may be effective for active agent delivery for 3 months, 6 months, 9 months, 12 months, 15 months, 18 months, 21 months or 24 months. In embodiments, the device may be effective for active agent delivery for at least 3 months, at least 6 months, at least 9 months, at least 12 months, at least 15 months, at least 18 months, at least 21 months, at least 24 months or up to 3 months, up to 6 months, up to 9 months, up to 12 months, up to 15 months, up to 18 months, up to 21 months, or up to 24 months.

The device is designed for subcutaneous implantation, which simplifies administration but constrains the size of the device and the reservoir. In embodiments, the device can have a cylindrical shape, such as a cylinder with a length ranging from about 10 mm to about 50 mm and a width (or diameter) ranging from about 1 mm to about 3 mm. Moreover, the device can be fabricated by extrusion of an FDA-approved biodegradable polymer to generate a fillable tube. The tube can then be ultrasonically welded or heat sealed to enclose the reservoir to contain the active agent.

In an embodiment, the device has a cylindrical shape and comprises a biodegradable polymer film that contains a reservoir of active agent formulation for prevention or treatment of disease. The device can be configured to have multiple segments, each segment with a different active agent and a different excipient. For example, the device can have two segments with each segment having a different active agent. In this example, the device can be engineered to release two active agents simultaneously, both at zero-order release kinetics. For example, the device can be fabricated with a segmented architecture that contains a formulated anti-retroviral drug and a hormonal contraceptive housed in separate compartments within a single implant design.

It is also contemplated that two separate devices, each containing a different active agent, but engineered to release the active agents simultaneously, both at zero-order release kinetics, can be subcutaneously implanted at the same time to achieve a similar result to implanting a segmented device. In certain embodiments, two separate implants are inserted in a V-shaped pattern, about 30-45 degrees apart. Implanting separate devices rather than a single segmented device can provide flexibility, such as the ability to remove one device while leaving the other implanted. For example, in the instance where a formulated anti-retroviral drug is in one device and a hormonal contraceptive is in another device, it would be possible to remove the hormonal contraceptive device while leaving the anti-retroviral drug device.

Figure 3A:
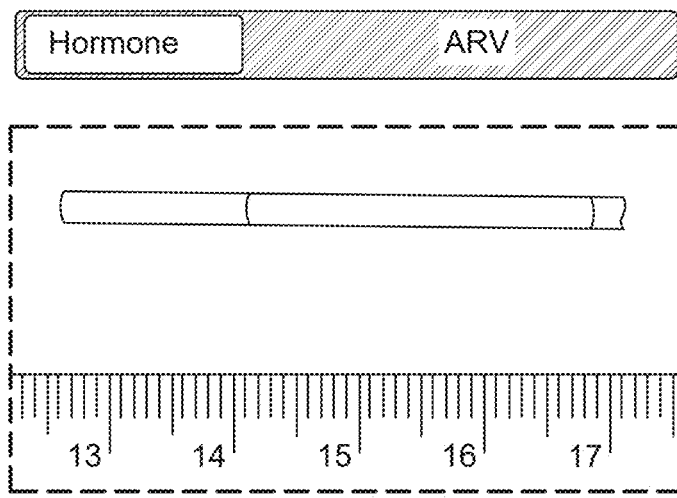
FIG. 3A is a schematic illustration and a photograph showing an exemplary embodiment that can be used to delivery more than one active agent.
Figure 3B:
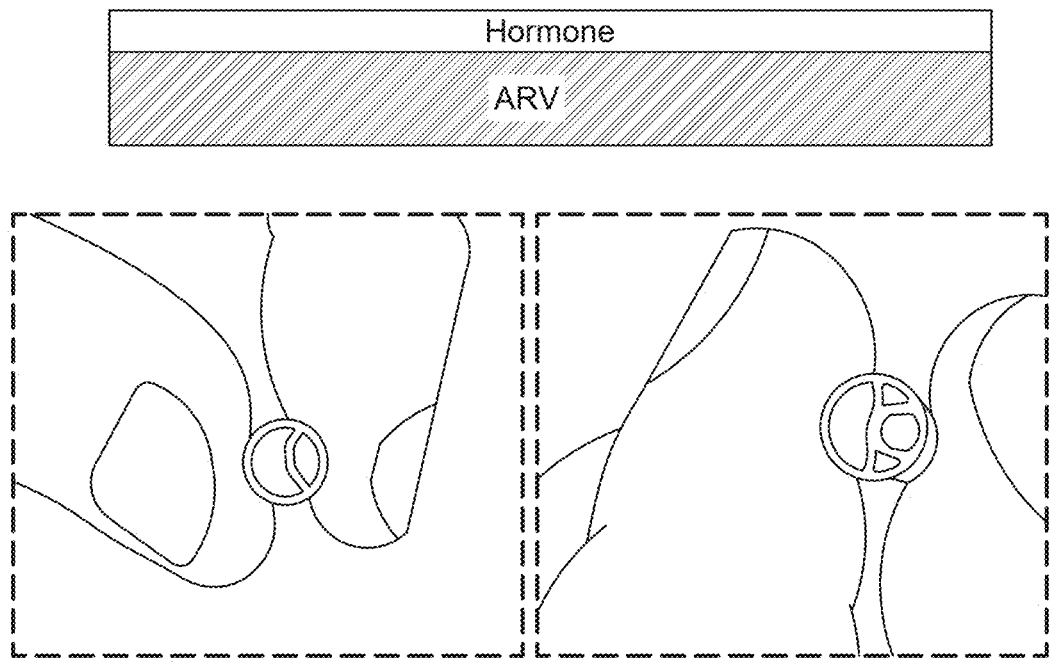
FIG. 3B is a schematic illustration and a photograph showing an alternative segmented device, a lateral segmented device.

FIG. 3A is a schematic illustration and a photograph showing an exemplary embodiment that can be used to delivery more than one active agent. The exemplary device is a transverse segmented device having two distinct compartments for containment of an active agent, with the compartments being separated by a transverse divider or partition. An alternative device (not illustrated) is a pair of separate devices, each having a single compartment for containment of an active agent. The two separate implants can be delivered in-line using a single trocar. FIG. 3B is a schematic illustration and a photograph showing another alternative segmented device, a lateral segmented device, wherein the distinct compartments are separated laterally, for example, by a divider or partition.

Characteristics, including desired release rate, drug-loading capacity, geometry, dimensions, and biodegradation rate can be considered when determining which form of the device to use. For example, the target release rate and loading capacity of the device can depend on the class and potency of the active agent. Wall thickness, surface area, and formulation can be adjusted to achieve desired characteristics. Maximum amount of drug in the device reservoir (drug loading capacity) is a limiting factor to consider for maximum daily dose of an agent. In exemplary embodiments, the polymer in the device can be designed to degrade in-vivo following depletion of the active agent. The biodegradation timeframe of the polymer depends on the starting molecular weight (MW) of the polymer.

Release profiles of the active agent are affected, among other things, by the properties of the polymer used for the device, including surface area, thickness, and molecular weight (which affects crystallinity). These properties can be tuned to provide desired dosing for the active agent delivery and desired time frame for polymer bioresorption.

An exemplary embodiment of the implant device can include a subcutaneous biodegradable implant for HIV PrEP as a single indication. Additionally, an exemplary embodiment of the implant device can include a multipurpose prevention technology (MPT) for HIV and pregnancy prevention. The implant device uses a semi-crystalline aliphatic polyester, PCL, pioneered by Pitt et al. in the 1980s (G. Pitt, et al.) and largely neglected for nearly 20 years (Woodruff, M. A. et al.). Renewed appeal for PCL has surfaced in light of biomedical applications, including tissue engineering and drug delivery that demand materials with long-term functionality, mechanical integrity, biocompatibility, and capacity for biodegradation and bioresorption. PCL is currently used in FDA-approved products for root canal fillings (Resilon®) and sutures (Monocryl®) and was previously explored for use as a 1-year contraceptive implant (Capronor®). In terms of HIV PrEP, PCL implants can advantageously offer long-acting delivery of ARVs, while also enabling bioresorption at the end of the implant lifetime. A biodegradable implant can benefit health care systems by eliminating the need for a clinic visit, whereby a minor surgical procedure would be required to remove the implant when discontinuing PrEP. For this device, reversibility and retrievability are available throughout the duration of treatment.

In embodiments of the device, the release rate of the active agent is controlled by various parameters, including, but not limited to, the formulation within the reservoir, the physicochemical properties of the active agent and the polymer film, the surface area of the device, and the thickness of the polymer film. In preferred embodiments, the reservoir device can be used for relatively long term prevention or treatment of disease or for prevention of pregnancy, or combinations of both.

Advantageously, the biodegradable reservoir device has a zero-order release profile. Moreover, the reservoir device has additional beneficial attributes. For example, the device is subcutaneous; can release one or more active agent(s) for various periods of time including about 3 months to about 2 years; is removable within the window of drug delivery; can be used for zero-order release of multiple active agents; and can be tuned based on various considerations, including, for example: (1) active agent; (2) excipient composition and concentration (e.g., ratio of excipient to active agent); (3) polymer membrane thickness, molecular weight, composition and crystallinity; and (4) device surface area. The device can provide long acting, zero-order release of more than one active agent. Moreover, the release kinetics are tunable to meet different dosing requirements.

The reservoir device is designed for subcutaneous implantation, which simplifies administration thereby facilitating access in resource-limited settings. Moreover, the biodegradable device can alleviate the need for an extra clinic visit to remove the implant after active agent depletion. However, because active agent is delivered through a device rather than a gel or nanosuspension, the device can be removed or retrieved throughout the duration of use. This feature can be beneficial in clinical situations requiring swift removal (e.g., product-related serious adverse event). Additionally, the reservoir device can simultaneously deliver combinations of biologics, such as antibodies, and/or small molecules.

The reservoir device can be designed for controlled release of a wide range of therapeutic and preventive active pharmaceutical ingredients (also referred to herein as active agents). Unlike other sustained release technologies, membrane-controlled devices can be functionally tuned to achieve zero-order release kinetics thereby attaining a relatively flat drug release profile and a relatively tight concentration range over several weeks to months to potentially years.

Polymer properties and drug formulations affect the release rate of active agents through polymer membranes. Thus it is important to keep these properties in mind when designing the described reservoir devices in order to achieve zero-order release kinetics. The present disclosure describes different reservoir devices, including devices having different properties, such as differences in molecular weight, different active agents, different excipients, different formulation concentrations, and differences in membrane thickness, ultimately tuning release kinetics according to required dosage and duration.

Figure 4A:
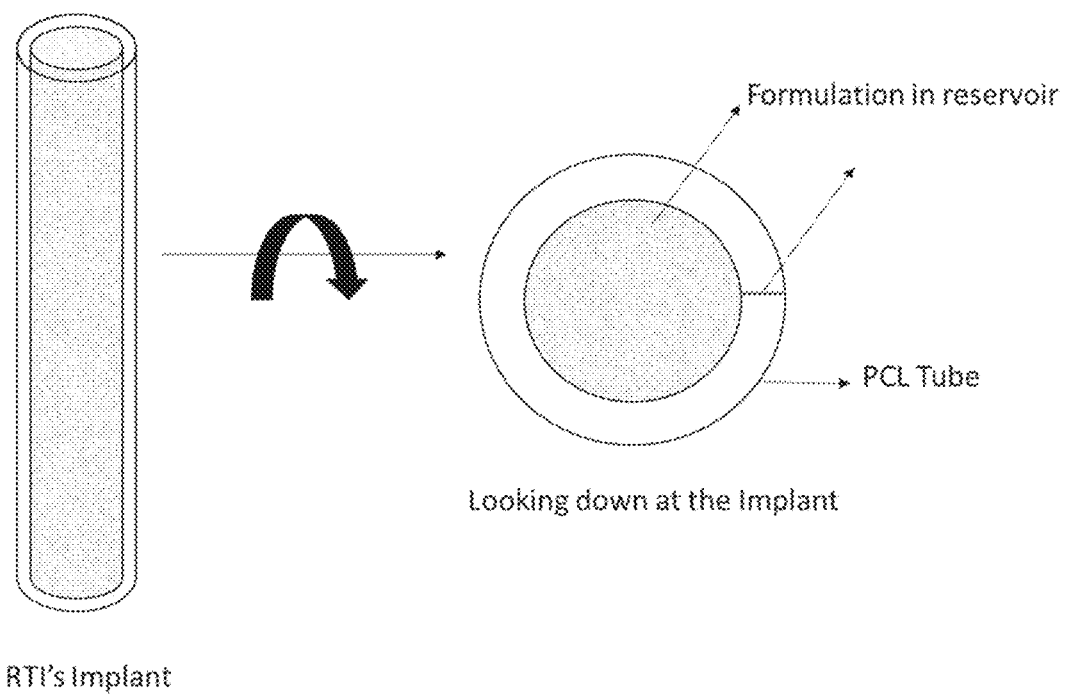
FIG. 4A is a schematic representation of an exemplary drug delivery device in accordance with an aspect of the invention. The figure on the left is a perspective view of the exemplary device. The figure on the right is a top view of the exemplary device.
Figure 4B:
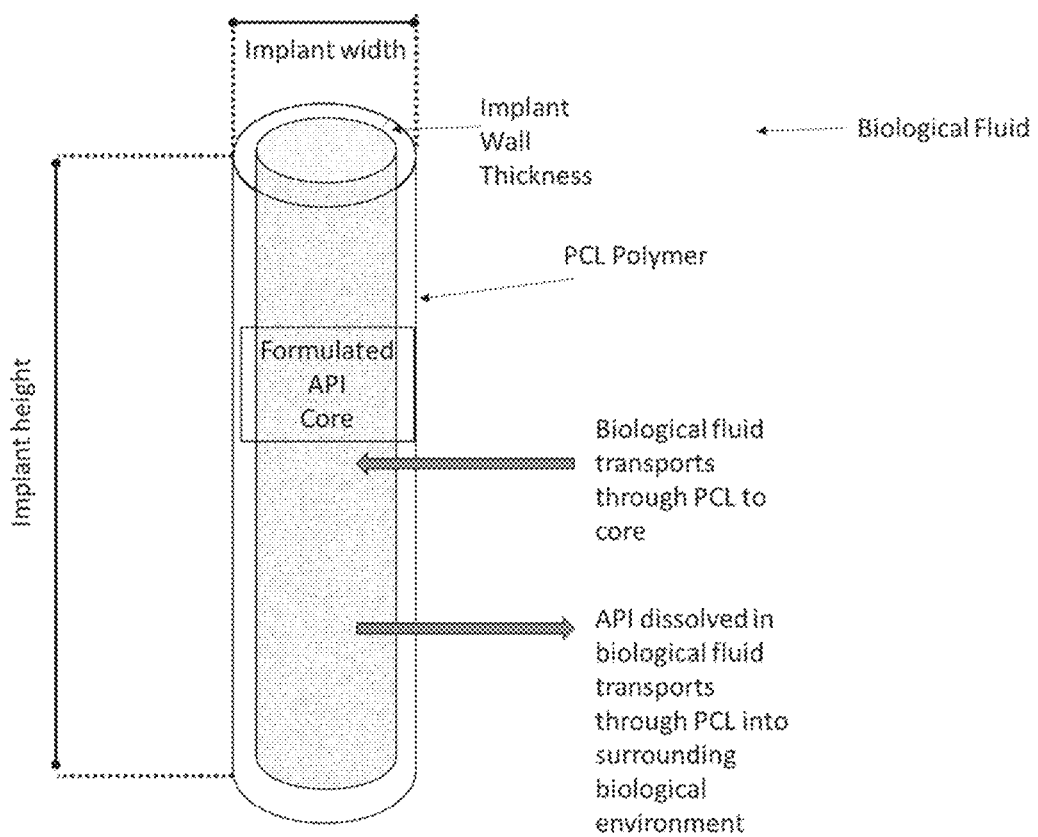
FIG. 4B is a labelled version of the schematic representation of FIG. 4A.

A schematic representation of an embodiment of the device is shown in FIGS. 4A and 4B. As shown, a polymer membrane encapsulates a reservoir of formulated active agent. Passage of biological fluid into the implant solubilizes the active agent, whereupon the active agent is controllably released from the device. Release kinetics of the device are affected by the properties of the polymer membrane. In this embodiment, the device is a flexible, permeable polymer membrane cylinder filled with active agent and excipient.

As shown in FIGS. 4A and 4B, the device comprises active agent and excipient contained in a reservoir defined by a polymer membrane enclosed by heat sealing or by an ultrasonic weld. The membrane is permeable to the active agent after implantation of the device into a body of a subject. The polymer membrane allows for diffusion of the active agent through the polymer membrane when positioned subcutaneously in a body of a subject.

Figure 4C:
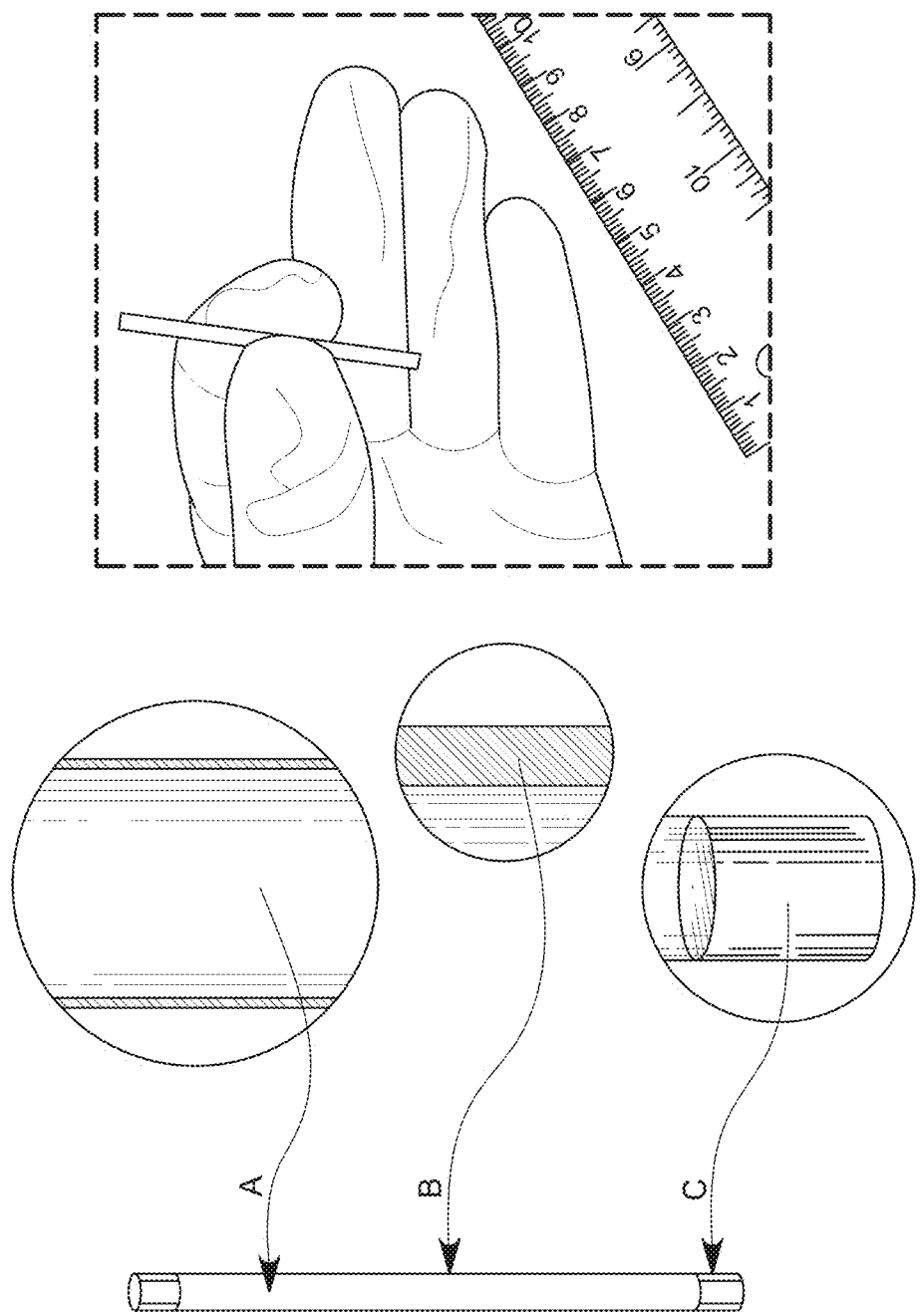
FIG. 4C is a schematic representation of another exemplary device and a photograph of the exemplary device.

FIG. 4C provides a schematic representation of another exemplary device. In FIG. 4C, the device includes a formulated drug core (A) encapsulated by a rate-controlling PCL membrane (B). The device is end-sealed using PCL material (C) for trocar compatibility.

The device in FIG. 4C is a reservoir-style PCL implant that can deliver TAF at sustained, zero-order release kinetics. Once inserted subcutaneously, biological fluid from the surrounding environment transports through the PCL membrane into the reservoir to solubilize TAF, whereupon TAF then transports passively through the PCL membrane and exits the implant. Without being bound by theory, it is believed that as an aliphatic polyester, PCL undergoes bulk hydrolysis through random chain scission as water permeates through the polymer. However, biodegradation of PCL is slow and can require years (e.g., 1-2 years) for complete bioresorption, depending on the starting MW. Because bulk erosion of PCL is slow, the faster process of drug delivery is decoupled from biodegradation, enabling zero-order release profiles of drug from the implant. At this zero-order release profile, the daily drug delivery rates can be controlled by various parameters: surface area of the device, thickness of the device wall, polymer properties, and drug formulation.

In some embodiments, the device can be manufactured by folding a polymer membrane over to define tubular-shaped cavity, depositing active agent formulation into the cavity, and applying an ultrasonic force or heat sealing to the membrane to create a seal that contains the active agent formulation within the tubular-shaped reservoir. The membrane allows for diffusion of active agent there through when the device is positioned subcutaneously in a body of a subject.

In some embodiments, a polymer rod can be incorporated into the cavity of a tube (i.e., form a donut shaped structure) to reduce the loading capacity of the tube while maintaining the surface area for drug release to achieve the target dosing. The therapeutic duration of the implant can be further tuned by adjusting the dimensions of the polymer rod comprising biodegradable materials, such as PCL, poly(lactic-co-glycolic acid) (PLGA), or polylactic acid (PLA).

An exemplary embodiment of the device includes a subcutaneous and trocar-compatible implant device for long-acting delivery of tenofovir alafenamide (TAF). The reservoir-style implant comprises an extruded tube of a biodegradable polymer, poly(ε-caprolactone) (PCL), filled with a formulation of TAF and castor oil or sesame oil excipient. Parameters affecting daily release rates of TAF include the surface area of the implant, the thickness of the PCL tube walls (between 45 and 300 μm), and the properties of the PCL or blend of PCL (e.g., crystallinity). The device has a linear relationship between daily release rates and surface area, demonstrating a membrane-controlled release mechanism from extruded PCL tubes. Release rates of TAF from the implant are inversely proportional to the wall thickness, with release rates between approximately 0.8 and 0.2 mg/day for 45 and 200 μm, respectively. Sustained release of TAF at 0.25±0.03 mg/day over the course of 180 days in vitro can be achieved.

An exemplary embodiment of the device includes a subcutaneous and trocar-compatible implant device for long-acting delivery of EFdA. The reservoir-style implant comprises an extruded tube of a biodegradable polymer, poly(ε-caprolactone) (PCL), filled with a formulation of EFdA and castor oil excipient. The ratio of EFdA to castor oil may be 1:1. Parameters affecting daily release rates of EFdA include the surface area of the implant, the thickness of the PCL tube walls (between 45 and 300 μm), and the properties of the PCL or blend of PCL (e.g., crystallinity). The device may have a length of 20 mm or 30 mm, and a membrane thickness of 70 μm, 100 μm, 150 μm, 200 μm or 300 μm.

An exemplary embodiment of the device includes a subcutaneous and trocar-compatible implant device for long-acting delivery of LNG. The reservoir-style implant comprises an extruded tube of a biodegradable polymer, poly(ε-caprolactone) (PCL), filled with a formulation of LNG and sesame oil excipient. The ratio of LNG to sesame oil may be 2:1. Castor oil or ethyl oleate may also be used as an excipient. Parameters affecting daily release rates of LNG include the surface area of the implant, the thickness of the PCL tube walls (between 45 and 300 μm), and the properties of the PCL or blend of PCL (e.g., crystallinity). The device may have a length of 10 mm or 20 mm, and a membrane thickness of 70 μm, 100 μm, 150 μm, 200 μm or 300 μm. The device can release about 30 μg/day of LNG for a sustained period of time of up to 420 days in in vitro conditions.

An exemplary embodiment of the device includes a subcutaneous and trocar-compatible implant device for long-acting delivery of ENG. The reservoir-style implant comprises an extruded tube of a biodegradable polymer, poly(ε-caprolactone) (PCL), filled with a formulation of ENG and sesame oil excipient. The ratio of ENG to sesame oil may be 2:1. Castor oil can also be used as an excipient. Parameters affecting daily release rates of ENG include the surface area of the implant, the thickness of the PCL tube walls (between 45 and 300 μm), and the properties of the PCL or blend of PCL (e.g., crystallinity). The device may have a length of 10 mm or 20 mm, and a membrane thickness of 70 μm, 100 μm, 150 μm, 200 μm or 300 μm. The device can release about 30 μg/day of ENG for a sustained period of time of up to 180 days in in vitro conditions Methods are provided herein in the EXAMPLES for evaluating devices comprising PCL membranes that meet mechanical properties required for device insertion and utilization using commercially available injection systems. The dimensions and geometry of the devices have been tuned to accommodate injector systems, such as trocar used for the Jadelle contraceptive implant for hormonal therapy.

EXAMPLES

Example 1. Preparation of a Biodegradable Reservoir-Style Device

In this exemplary embodiment, a device comprising PCL was prepared via extrusion. This fabrication method is amenable to scale-up manufacturing processes. PCL enables zero-order release kinetics. The polycaprolactone pellets were formed into tubes by a hot-melt, single-screw extrusion process. PCL with two different molecular weights were used: 45 kDa and 80 kDa.

A 24:1 L/D screw with a conveying design was rotated at 5 RPM to convey the solid PCL pellets down the extrusion barrel. The extrusion barrel had three heating zones, an adapter, crosshead, and die. The temperature profile for the 80 kDa PCL was as follows: Barrel 1: 63° C., Barrel 2: 100° C., Barrel 3: 105° C., Adapter: 100° C., Crosshead: 155° C., Die: 170° C. The temperature profile for the 45 kDa PCL was as follows: Barrel 1: 54° C., Barrel 2: 63° C., Barrel 3: 68° C., Adapter: 68° C., Crosshead: 68° C., Die: 74° C. After exiting the extruder, both materials were subjected to a water bath for cooling, at 21° C. All tubes had an outer diameter of 2.5 mm, and wall thicknesses included 45 µm, 70 µm, 100 µm, and 200 µm.

Extruded PCL tubes were cut to a length of 50 mm, filled with a formulation having a 3:1 ratio of TAF: castor oil, and sealed at the other end using an injection sealer. Some devices had a final length of 40 mm and a width of 2.5 mm.

Figure 5:
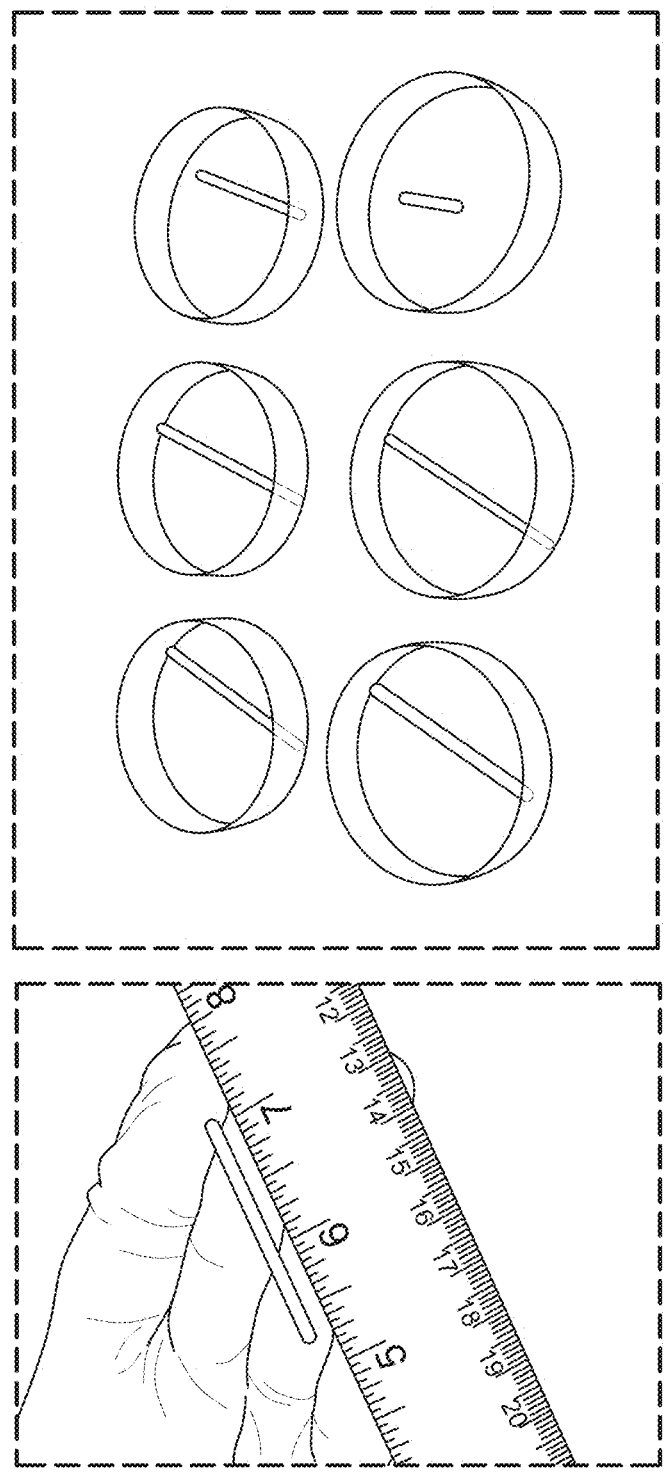
FIG. 5 is two photographs showing the prepared devices.

FIG. 5 provides photographs showing the prepared devices. The photographs show biodegradable implants prepared with PCL extruded tubes. The implant device on the left was 40 mm in length. The right photograph shows a variety of configurations of the implant devices, including segmented implants and implants of different lengths.

Example 2. Biodegradation of the Device

Figure 6:
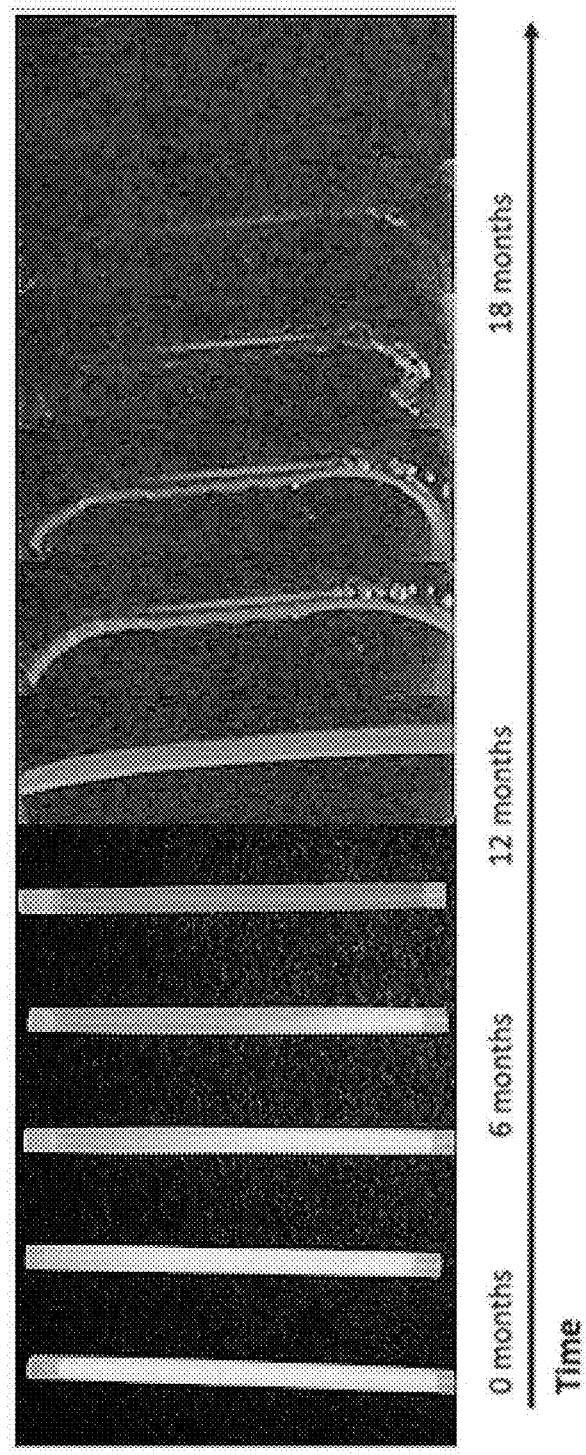
FIG. 6 is a photograph showing the concept of representative degradation of a PCL implant over time.

Biodegradation of a PCL implant device was evaluated. Strips of PCL were incubated in 1N formic acid for one month to simulate one year in-vivo and investigate the degradation profile of the device. The degradation profile indicates how the polymer membrane substantially or fully degrades. FIG. 6 is a photograph showing the concept of degradation of a PCL implant over time.

Example 3. Changes in Release Rate Due to Properties of PCL

Testing was performed to evaluate how changes in PCL membrane properties and use of different excipients affected release rate. PCL tubes were sealed with an impulse heat sealer (AIE-110T) by applying a pulse of heat for a few seconds and allowing the tubing to cool for about 10 seconds. Tubes of varying thickness were evaluated: 70 µm, 100 µm, and 200 µm. Additionally, PCL of varying molecular weights was evaluated. Namely, PCL with molecular weights of 80 kDa and 45 kDa was evaluated.

Thicker tubes were sealed with longer heat pulses with the following heat sealer settings: 70 µm setting 2, 100 µm setting 2.5, 200 µm setting 3. The sealing step fused the PCL tube wall together through melting and created a flat-shaped seal. The seal was trimmed with scissors to remove excess PCL. The empty tubes were marked at 40 mm and 50 mm lengths, and cut at the 50-mm mark. The tube opening was then stretched and fitted with a small funnel. The drug-excipient formulation was then introduced to the tube through the funnel until the formulation reached the 40-mm mark. Once the formulation reached the 40 mm mark, the remaining interior tube wall was cleaned and sealed in a similar manner to the first seal. After fabrication, all implants were photographed with a ruler to record the final dimensions (photos not shown). Paste area was measured with ImageJ and release rates were normalized to the surface area of a full-sized implant (2.5 mm in width, 40 mm in length), 314 mm$^2$.

Exemplary implants included drug-excipient formulations of 1) 3:1 TAF to castor oil and 2) 3:1 TAF to sesame oil. The implants were incubated in 1×PBS (pH 7.4) at 37° C. Drug quantity released in media was measured via UV-Vis three times per week during which the implants were transferred to fresh buffer to maintain sink conditions. Drug concentrations were determined by correlating UV absorbance values to a standard curve. Standard curves involved measuring peak absorbance values as a function of drug concentrations diluted by half from bulk solutions. Peak absorbance values were determined by scanning the dilute drug solutions from 230 to 700 nm at a step size of 1 nm and assessing the maximum UV absorbance value.

The biodegradable polymer (e.g., PCL) can be tuned to meet the requisite biodegradation properties (that is, to optimize the time between depletion of active agent and polymer biodegradation). For example, 80 kDa MW PCL films exhibited an extended time until biodegradation, typically on the order of >24 months.

Figure 7:
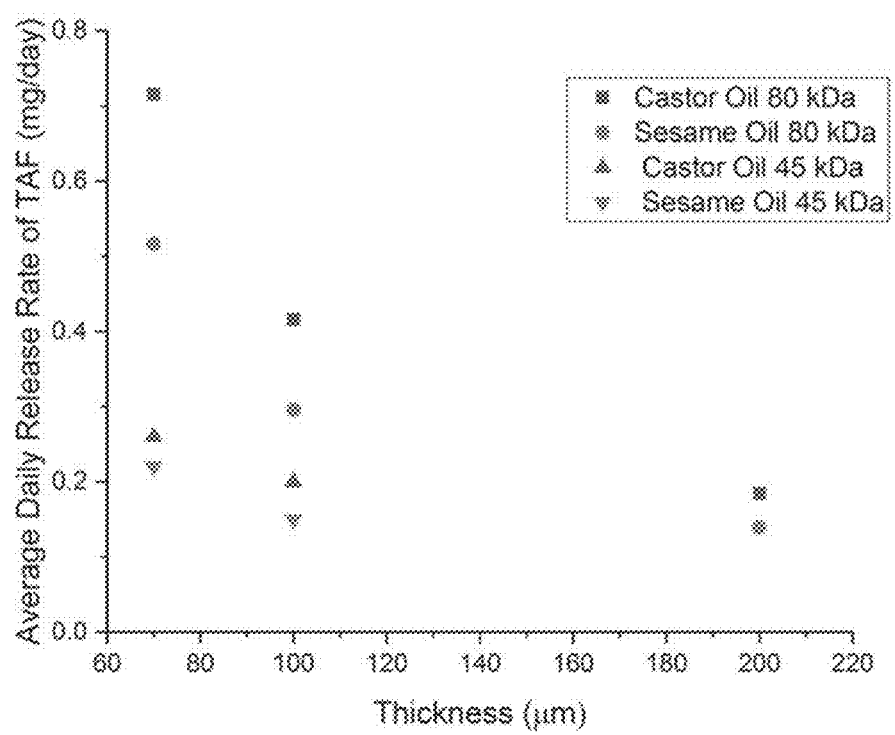
FIG. 7 is a chart showing the average daily release rate of TAF (mg/day) versus membrane thickness for Example 3.

FIG. 7 is a chart showing the average daily release rate of TAF (mg/day) versus membrane thickness for Example 3. The chart compares PCL membranes with molecular weights of 80 kDa and 45 kDa, formulations using castor oil and sesame oil as excipients and polymer membranes of 70 µm, 100 µm, and 200 µm. FIG. 7 shows that the molecular weight of PCL affects the release rate of API from the device. In general, a higher MW of PCL resulted in a faster release rate of the drug, whereas the lower MW of PCL resulted in a slower release rate of drug.

FIG. 7 also shows that the formulation affects the release rate. Here, formulations of 3:1, TAF: castor oil released faster, whereas 3:1, TAF: sesame oil released slower. Without being bound by theory, it is believed that the differences in release rates between Castor oil and Sesame oil devices are related to the solubility of TAF within the excipients.

Example 4. Formulation of the Device: Screening Multiple Apis and Accompanying Excipients Testing was performed to evaluate the solubility of multiple active agents in multiple excipients. The following active agents were evaluated: TAF, EFdA, LNG, and ENG. Various excipients, including sesame oil, castor oil, oleic acid, and polyethylene glycol were evaluated.

Figure 8:
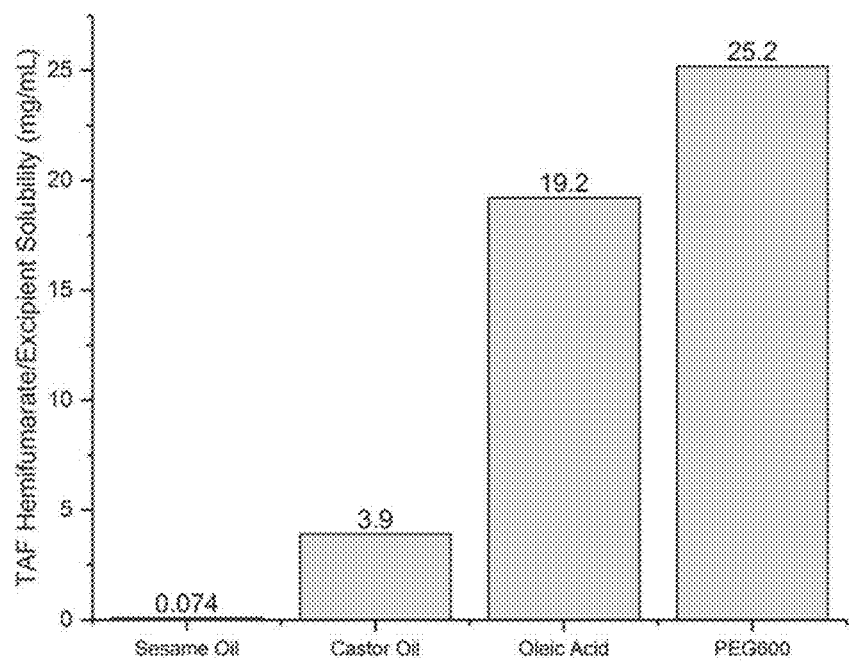
FIG. 8 is a bar chart showing the resulting solubility of TAF within four different excipients, including sesame oil, castor oil, oleic acid, and polyethylene glycol (PEG) 600.

To measure solubility of TAF with various excipients, approximately 25 mg/mL TAF was mixed by vortex mixing with the excipients and placed in a water bath at 37° C. Over a 24-hour period, the solutions were mixed periodically and returned to the water bath. After approximately 72 hours, the solutions were removed from the water bath and appearance recorded for each of the saturated solutions. The solutions were mixed again by vortex mixing and then centrifuged while still warm at 1500 rpm for 3 minutes to separate out any undissolved TAF. The supernatants were prepared for analysis by UPLC. Triplicate weighed aliquots were prepared from the collected supernatants and analyzed for assay using a UPLC/UV method. The analysis was performed using a Waters BEH C18 column (2.1 mm×50 mm, 1.7 µm) under gradient, reversed phase conditions with detection at 260 nm. The saturated solutions were quantitated by linear regression analysis against a 5-point calibration curve. FIG. 8 is a bar chart showing the resulting solubility of TAF within four different excipients, including sesame oil, castor oil, oleic acid, and polyethylene glycol (PEG) 600. As shown, TAF was most soluble in oleic acid and PEG600.

Testing using the same methodology was performed for EFdA, LNG, and ENG using various excipients. Tables 1, 2, and 3 below show the solubility results for EFdA, LNG, and ENG, respectively.

TABLE 1

Solubility of EFdA in different excipients.

| Excipient | EFdA Solubility (mg/mL) |
|---|---|
| Castor oil | 2.5 |
| Glycerol | 36.0 |
| Sesame Oil | 0.223 |
| Ethyl Oleate | 0.054 |
| Propylene glycol | 35.4 |
| Cottonseed Oil | 0.057 |
| Oleic Acid | 0.522 |
| Polysorbate 80 | 34.9 |
| PEG 300 | 37.7 |
| PEG 400 | 31.5 |
| PEG 600 | 34.5 |
| PEG 40 Castor Oil | 31.8 |

TABLE 2

Solubility of LNG in different excipients.

| Excipient | LNG Solubility (mg/mL) |
|---|---|
| Ethyl Oleate | 0.63 ± 0.07 |
| Oleic Acid | 0.73 ± 0.06 |
| Propylene Glycol | 2.66 ± 0.20 |
| Sesame Oil | 0.50 ± 0.07 |
| PEG 400 | 2.97 ± 0.19 |
| Synperonic PE/L 44 | 2.50 ± 0.82 |
| PEG 40 Castor Oil | 3.49 ± 0.58 |
| PEG 600 | 3.12 ± 0.41 |
| Glycerol | 0.75 ± 0.22 |
| Polysorbate 80 | 3.15 ± 0.57 |
| Castor Oil | 1.85 ± 0.30 |
| PEG 300 | 3.02 ± 0.21 |
| Cottonseed Oil | 0.35 ± 0.02 |

TABLE 3

Solubility of ENG in different excipients

| Excipient | ENG Solubility (mg/mL) |
|---|---|
| Ethyl Oleate | 5.60 ± 0.05 |
| Castor Oil | 16.20 ± 0.76 |
| Sesame Oil | 3.74 ± 0.06 |
| Synperonic PE/L 44 | 24.07 ± 0.94 |
| Oleic Acid | 4.73 ± 0.37 |
| Propylene glycol | 18.66 ± 1.28 |
| Polysorbate 80 | 25.44 ± 1.55 |
| PEG 40 Castor Oil | 28.02 ± 1.71 |
| PEG 300 | 32.95 ± 0.93 |
| PEG 400 | 32.82 ± 1.13 |
| PEG 600 | 31.10 ± 1.26 |
| Cotton seed oil | 3.98 ± 0.07 |
| Glycerol | 2.02 ± 1.20 |

Elvitegravir, which is marketed by Gilead, was also evaluated. It was concluded that this API was not ideal for described device. The low aqueous solubility, combined with the high predicted dosing quantities, resulted in the elimination of Elvitegravir as an API option for this system.

Example 5. Effect of Excipient on Release of LNG from Device

Figure 9A:
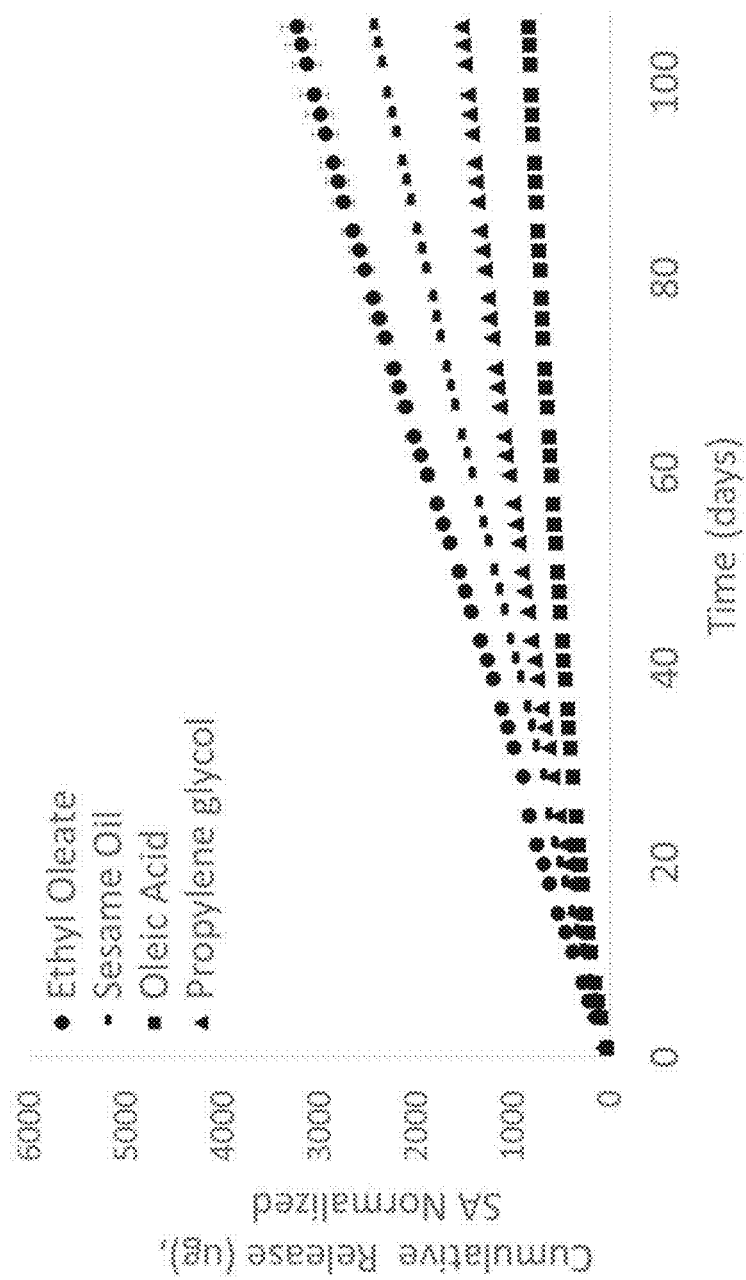
FIGS. 9A and 9B are line charts showing the cumulative release profiles and daily release profiles of various LNG formulations within 70 µm implants fabricated with 80 kDa PCL over time.
Figure 9B:
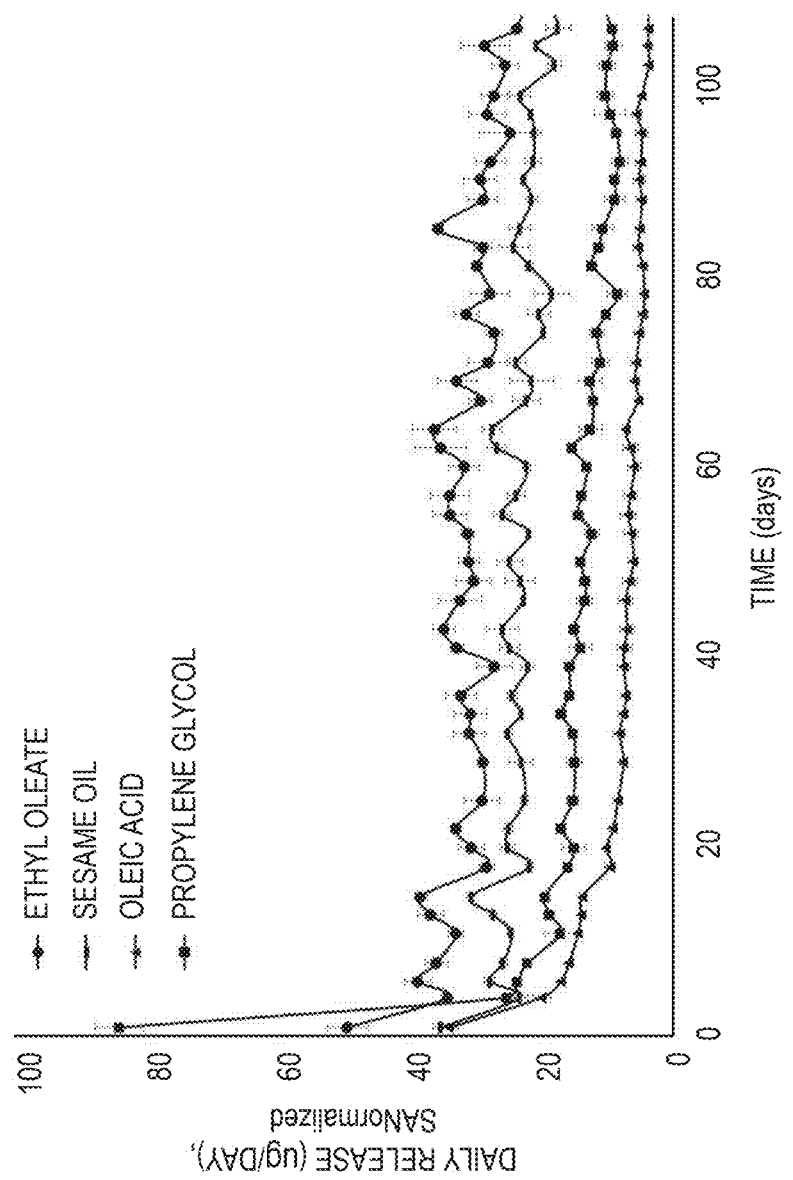
Figure 9C:
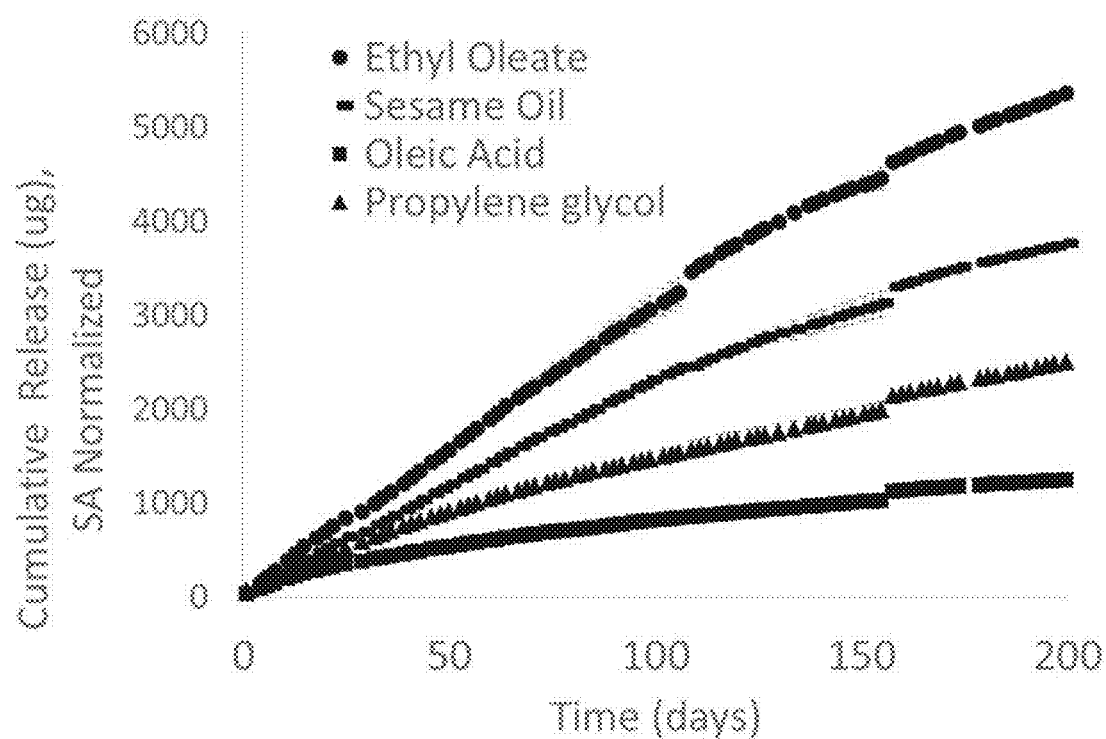
FIG. 9C is a line chart showing cumulative release of LNG over 200 days.

Testing was performed to determine the effect of excipient on release profile of LNG from exemplary devices. In this example, in-vitro release studies with down-selected LNG formulations were performed. The testing used extruded polymer devices or implants with wall thicknesses of 70 µm and containing LNG formulated with ethyl oleate, oleic acid, propylene glycol and sesame oil in a mass ratio of 1:4. Additionally, 1 wt % of α-tocopherol was included in the formulations as an antioxidant. FIGS. 9A and 9B are line charts showing the cumulative release profiles and daily release profiles of various LNG formulations within 70 µm implants fabricated with 80 kDa PCL over time. FIG. 9A provides cumulative release of LNG over 100 days, and FIG. 9B provides daily release rate of LNG over 100 days. All of the LNG devices exhibited tight zero order release over a course of 100 days. FIG. 9C provides cumulative release of LNG over 200 days. The devices formulated with the ethyl oleate excipient exhibited the fastest release rate, and devices with oleic acid showed the slowest release rate, while the devices containing the sesame oil or propylene glycol excipient have an intermediate release rate. The release rate of the ethyl oleate device was around 30 µg/day, which met a targeted dosing of LNG of 30-40 µg/day. The release rates of the devices in this example were normalized to the surface area of a 10 mm-long implant, therefore the targeted release rates can also be achieved with slower releasing devices (i.e., sesame oil, oleic acid, propylene glycol) using an implant with a longer length. These devices will continue to release through 6 months, as the expected duration of release is estimated to be longer than 8 months.

Figure 9D:
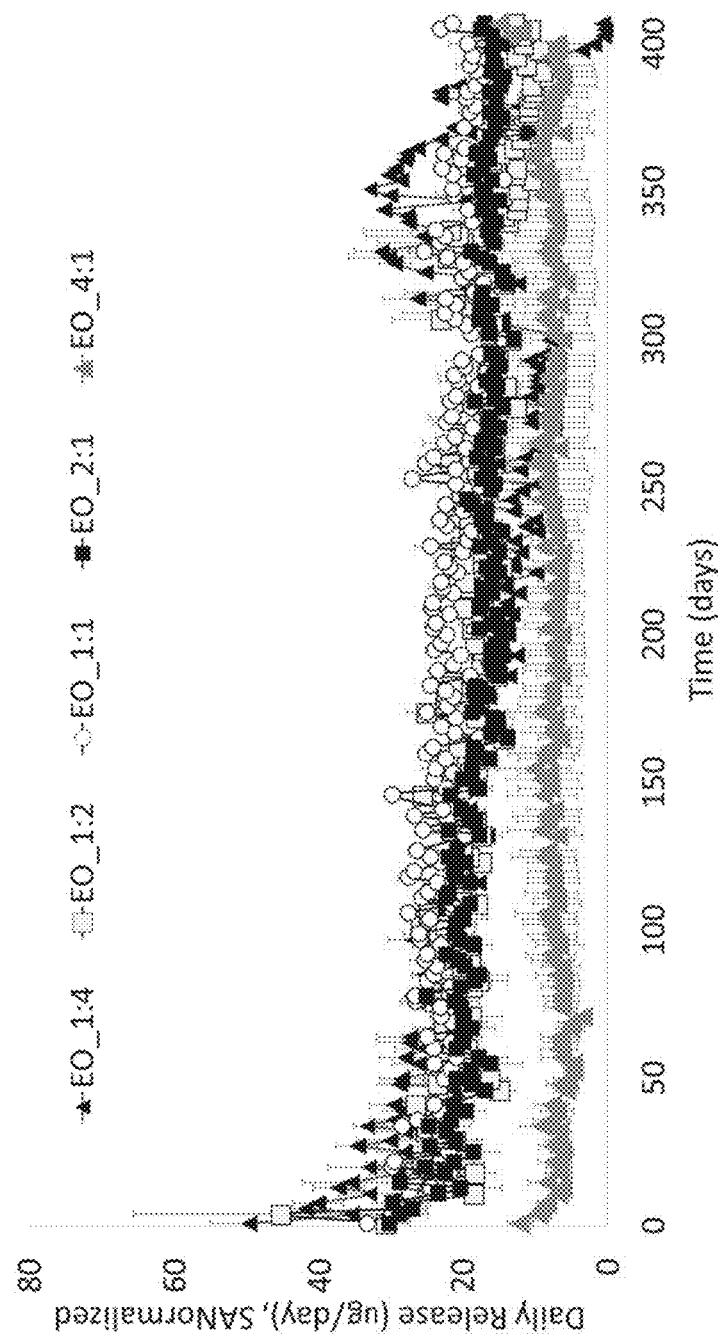
FIG. 9D is a line chart showing daily release rate for devices formulated with different ratios of LNG to ethyl oleate for approximately 400 days.
Figure 9E:
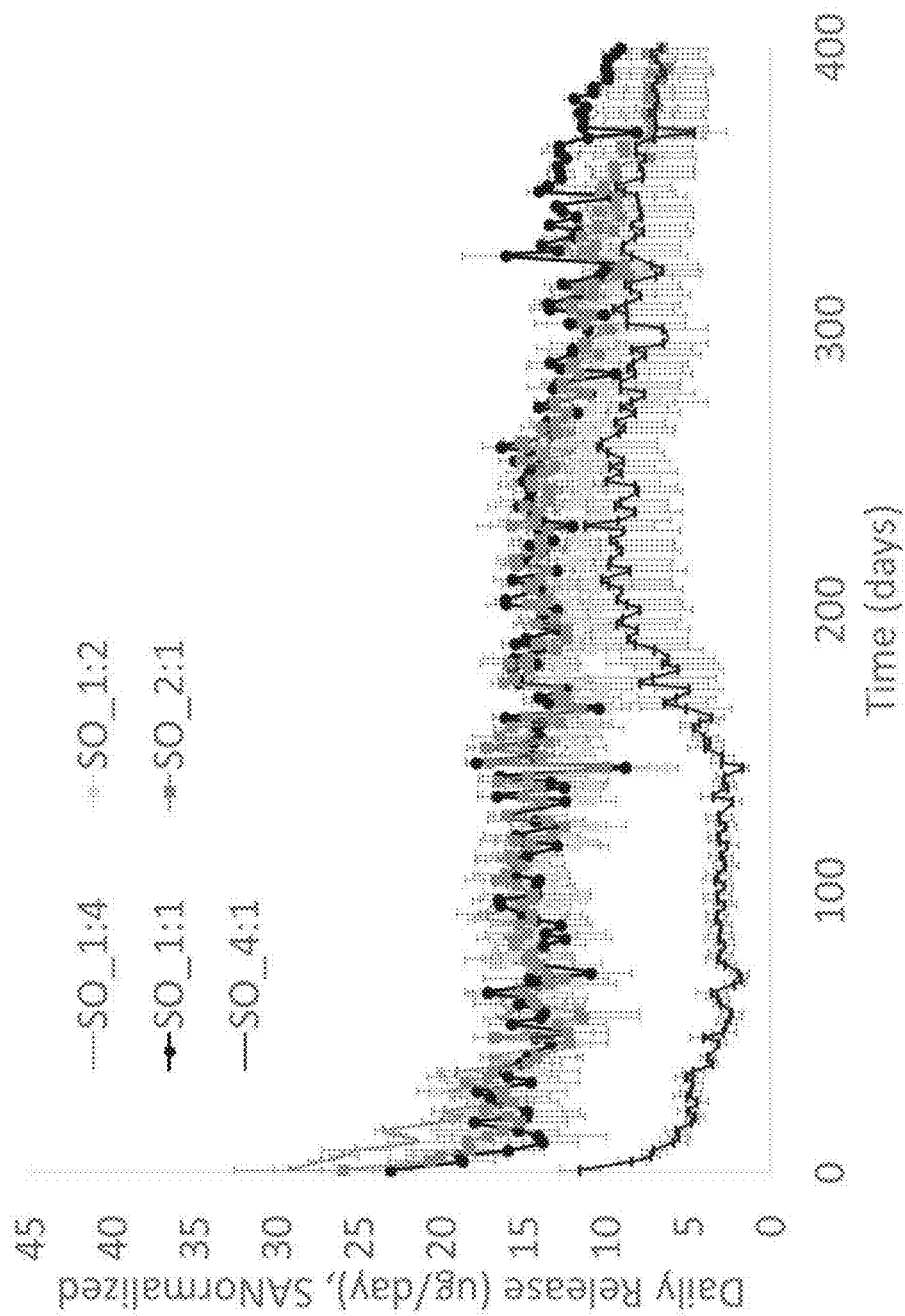
FIG. 9E is a line chart showing daily release rate for devices formulated with different ratios of LNG to sesame oil for approximately 400 days.

Additional testing was performed to evaluate the effects of formulation (i.e., ratio of drug to excipient) on LNG release rates. The testing involved formulations of LNG with either sesame oil or ethyl oleate at mass ratios of 1:4, 1:2, 1:1, 2:1, and 4:1 (LNG:excipient). Implants with wall thicknesses of 70 µm and PCL of 89 kDa MW were used. The implant dimensions measured 10 mm in length by 2.5 mm outer diameter. FIG. 9D is a line chart showing daily release rate for devices formulated with different ratios of LNG to ethyl oleate for approximately 400 days. FIG. 9E is a line chart showing daily release rate for devices formulated with different ratios of LNG to sesame oil for approximately 400 days. As can be seen, the devices achieved linear release profiles for approximately 400 days. Further, the 4:1 ratio (LNG:excipient) for both ethyl oleate and sesame oil, initially exhibited a lower LNG release rate as compared to the other ratios, then the release rate gradually increased and merged with the remainder of the formulations. Without being bound by theory, this result suggests that the 4:1 ratio formulation started as dissolution-limited release and gradually transitioned to membrane-controlled release. This occurrence offers opportunities for additional tuning of release profiles. The LNG formulation at 2:1 drug excipient ratio demonstrated linear release profiles over 320 days.

Table 4 shows the approximate daily release rates of LNG formulated with either ethyl oleate or sesame oil at (1:4, 1:2, 1:1, and 2:1 ratios of LNG:excipient). The release rates of the devices were normalized to the surface area of a 10 mm-long implant; therefore the higher release rate can also be achieved with an implant with a longer length. Additionally, the implants were tested at defined timepoints to assess the chromatographic purity of LNG inside the device core. The implants comprising LNG formulated with sesame oil or ethyl oleate all showed LNG with >99% purity after 400 days of exposure to in-vitro conditions.

TABLE 4

Average release rate and chromatographic purity of formulations with different ratios of LNG to excipient.

| Drug: excipient ratio | Average release rate (μg/day) | % Purity at 400 days |
|---|---|---|
| LNG: Ethyl Oleate 1:4 | 25.0 | not analyzed |
| LNG: Ethyl Oleate 1:2 | 25.0 | not analyzed |
| LNG: Ethyl Oleate 1:1 | 25.0 | 99.4 |
| LNG: Ethyl Oleate 2:1 | 25.0 | 99.5 |
| LNG: Ethyl Oleate 4:1 | 7.0 | 99.4 |
| LNG: Sesame Oil 1:4 | 15.0 | 99.5 |
| LNG: Sesame Oil 1:2 | 15.0 | 99.4 |
| LNG: Sesame Oil 1:1 | 15.0 | 99.4 |
| LNG: Sesame Oil 2:1 | 15.0 | 99.3 |
| LNG: Sesame Oil 4:1 | 4.0 | 99.1 |

Example 6. Effect of Excipient on Release of ENG from Device

Figure 10A:
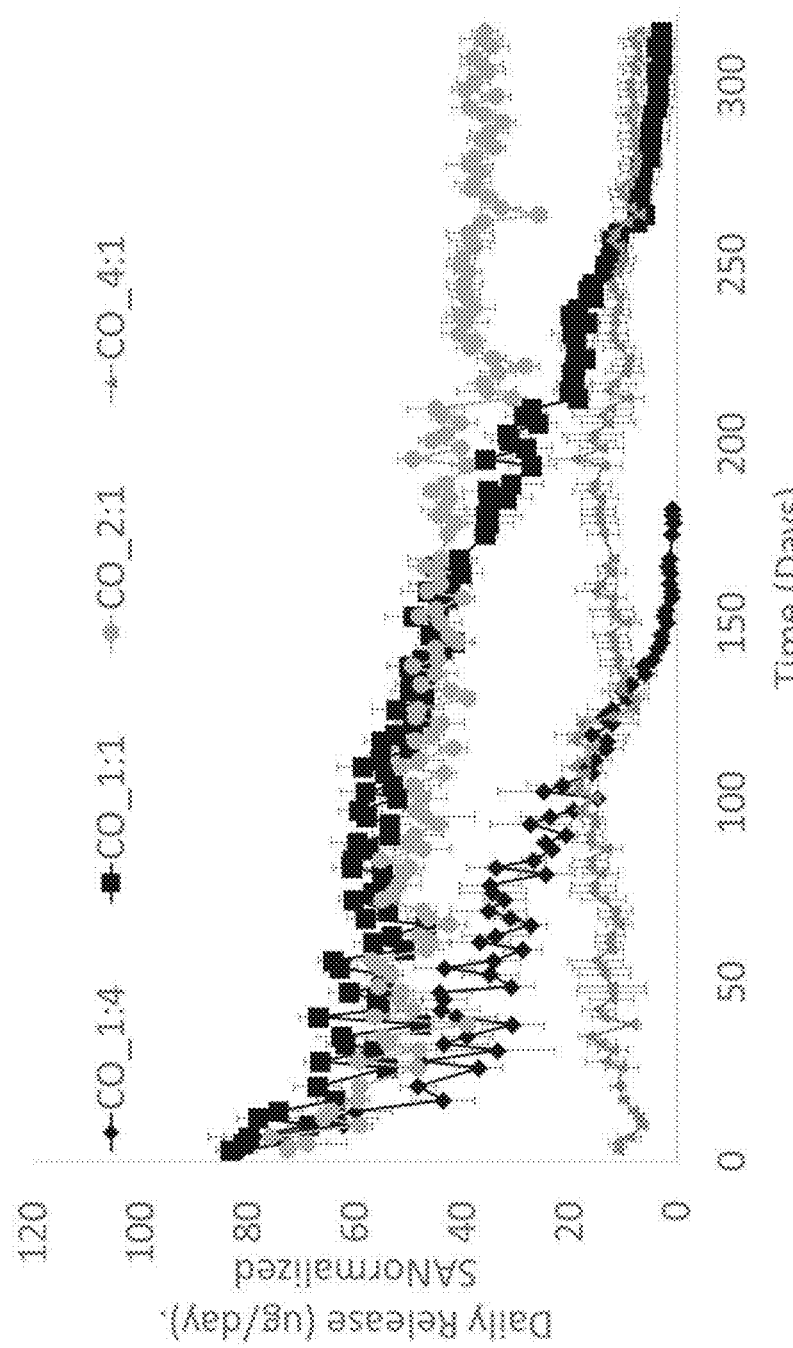
FIGS. 10A and 10B are line charts showing the daily release profiles of various ENG formulations within implants having a length of 10 mm and an outer diameter of 2.5 mm.
Figure 10B:
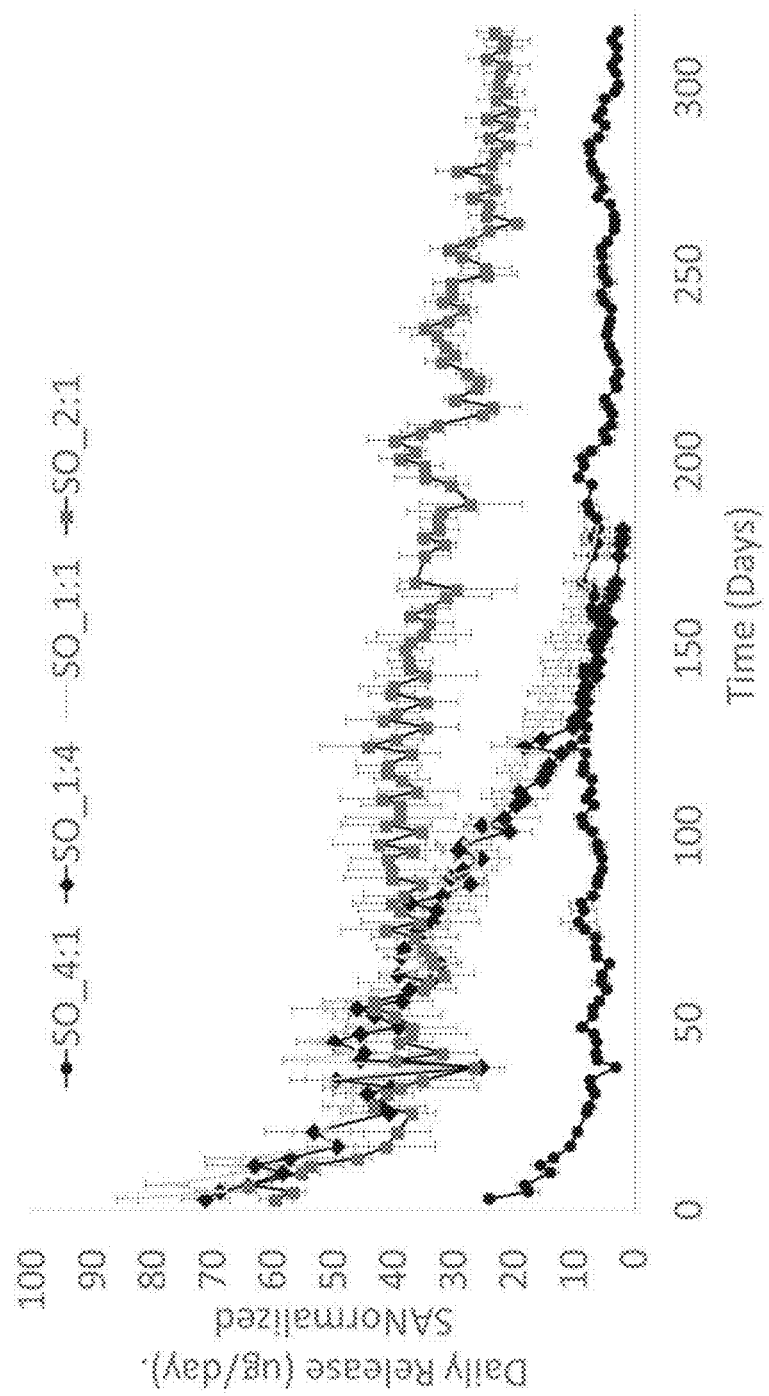

Testing was performed to determine the effect of excipient on release profile of ENG from exemplary devices. In this example, in-vitro release studies with ENG formulations were performed. The testing used extruded polymer devices or implants with wall thicknesses of 100 μm and PCL of 89 kDa MW. The devices contained ENG formulated with castor oil and sesame oil in a mass ratios 1:4, 1:1, 2:1, and 4:1 for castor oil and 4:1, 1:4, 1:1, and 2:1 for sesame oil. FIGS. 10A and 10B are line charts showing the daily release profiles of various ENG formulations within implants having a length of 10 mm and an outer diameter of 2.5 mm. As can be seen, the 2:1 ratio with both excipients demonstrated a sustained release of ENG with zero-order kinetics for approximately 300 days. Additionally, the 4:1 ratio (ENG: excipient) for both castor oil and sesame oil exhibited a lower release rate of ENG as compared to the other ratios. Without being bound by theory, it is believed that this lower release rate is likely attributed to a dissolution control mechanism, whereas the remainder of the formulations followed a membrane-controlled release profile. The ENG formulations with lower drug to excipient ratios (i.e., 1:4, 1:1 ratios) started to deviate from linear release around Day 50, which is attributed to the depletion of the drug.

Table 5 shows the approximate daily release rates of ENG formulated with either castor oil or sesame oil at 1:4, 1:1 and 2:1 and 4:1 ratio within 10 mm-long devices. The PCL wall thickness of the ENG devices was 200 μm. The average daily release rate was ~30 μg/day for both 200 μm implants containing ENG sesame oil or castor oil formulation. The chromatographic purity of all ENG formulations was assessed at defined timepoints using UPLC method. Both formulations had a 99% purity after 180-day of exposure to an in-vitro condition.

TABLE 5

Approximate daily release rates of ENG

| Drug: excipient ratio | Release rate (ug/day) | % Purity at 180 Days |
|---|---|---|
| ENG: Castor Oil 1:4 | 60 | Below detection limit |
| ENG: Castor Oil 1:1 | 60 | Not analyzed |
| ENG: Castor Oil 2:1 | 60 | Not analyzed |
| ENG: Castor Oil 4:1 | 10 | Not analyzed |
| ENG: Castor Oil 1:4 | 30 | 99.1 |
| ENG: Sesame Oil 1:4 | 50 | 98.5 |

TABLE 5-continued

Approximate daily release rates of ENG

| Drug: excipient ratio | Release rate (ug/day) | % Purity at 180 Days |
|---|---|---|
| ENG: Sesame Oil 1:1 | 50 | 99.8 |
| ENG: Sesame Oil 2:1 | 50 | Not analyzed |
| ENG: Sesame Oil 4:1 | 10 | Not analyzed |
| ENG: Sesame Oil 1:4 | 30 | 99.0 |

Example 7. Effect of Excipient, Wall Thickness, and Surface Area on Release of EFdA from Device Testing was performed to determine the effect of excipient on release profile of EFdA from exemplary devices. The testing demonstrated sustained zero-order release over 200 days with EFdA-castor oil devices fabricated with 80 KDa PCL tubes at wall thickness of 70 μm. An in-vitro release study involving implants with wall thicknesses of 70, 100, and 200 μm, which contained various EFdA formulations, was performed to assess the effects of the PCL wall thickness, surface area, end-sealing methods and excipients on the release kinetics of EFdA from the implants. All devices were formulated with a 1:1 mass ratio of EFdA to excipient.

Figure 11A:
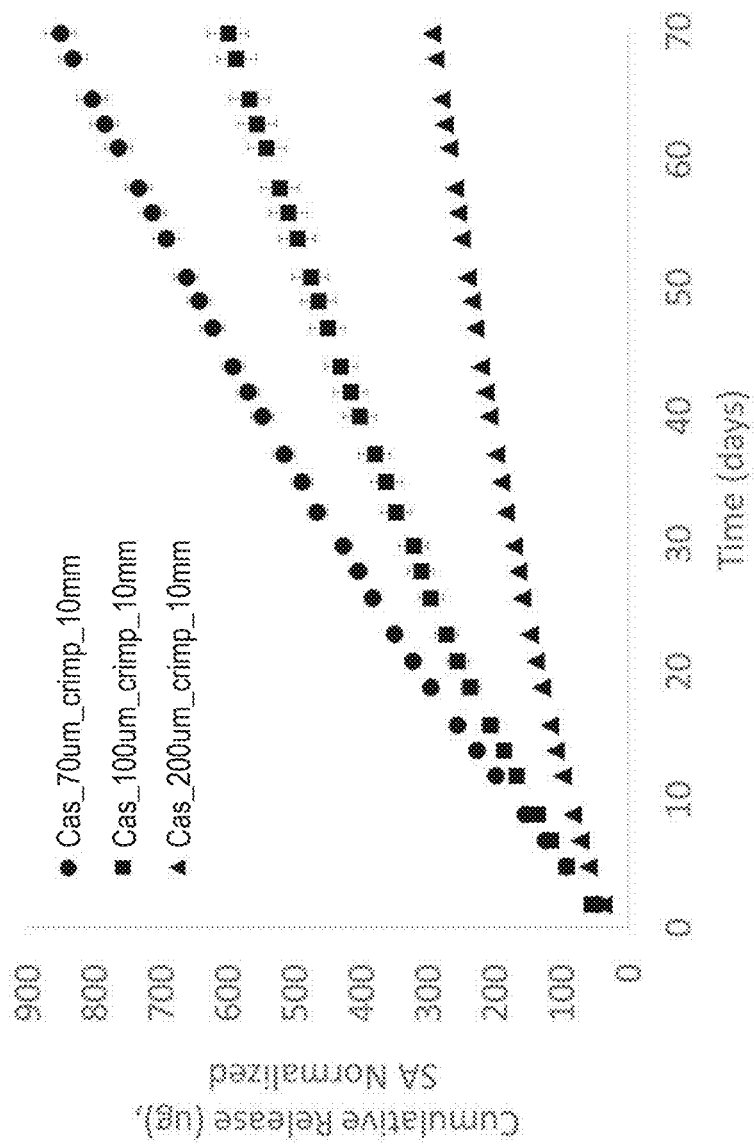
FIG. 11A is a line chart showing the cumulative release of EFdA over time for devices with thicknesses of 70 µm, 100 µm and 200 µm for a time period of 70 days.
Figure 11B:
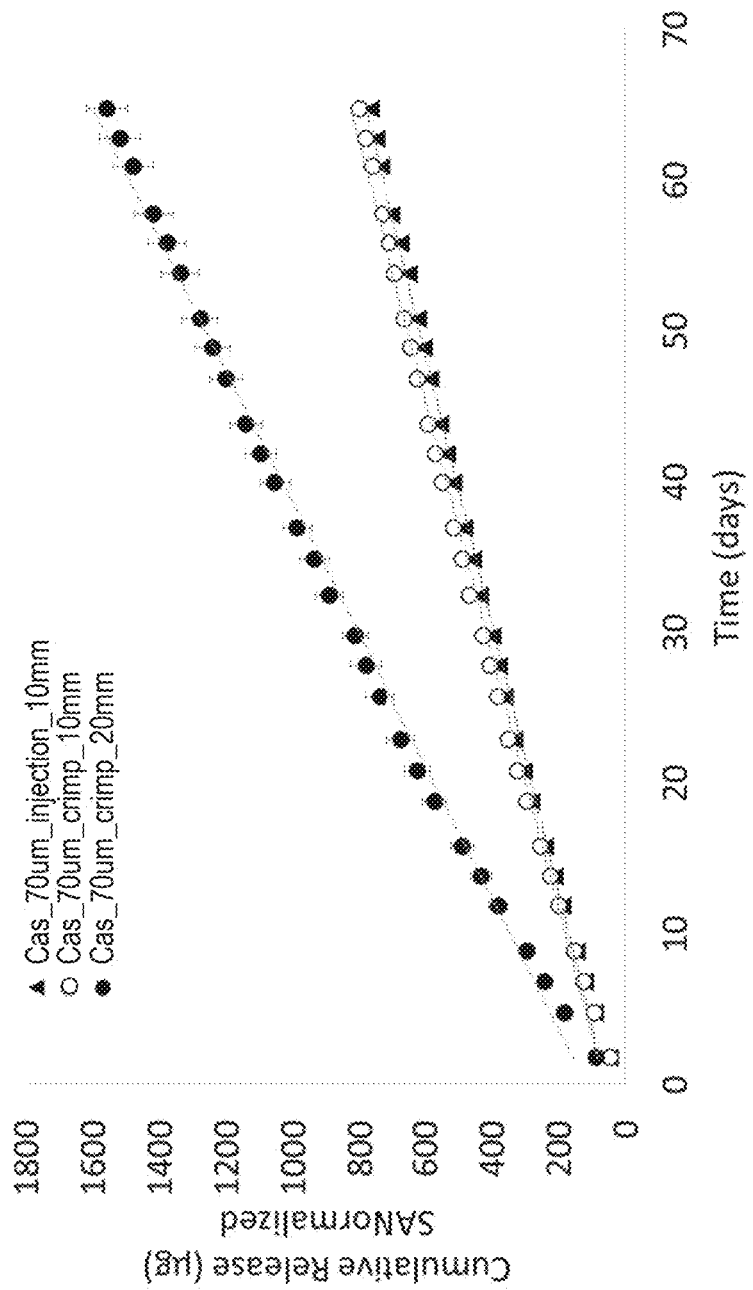
FIG. 11B is a line chart showing cumulative release amounts for devices with a 70 µm wall thickness and lengths of 20 mm and 10 mm.
Figure 11C:
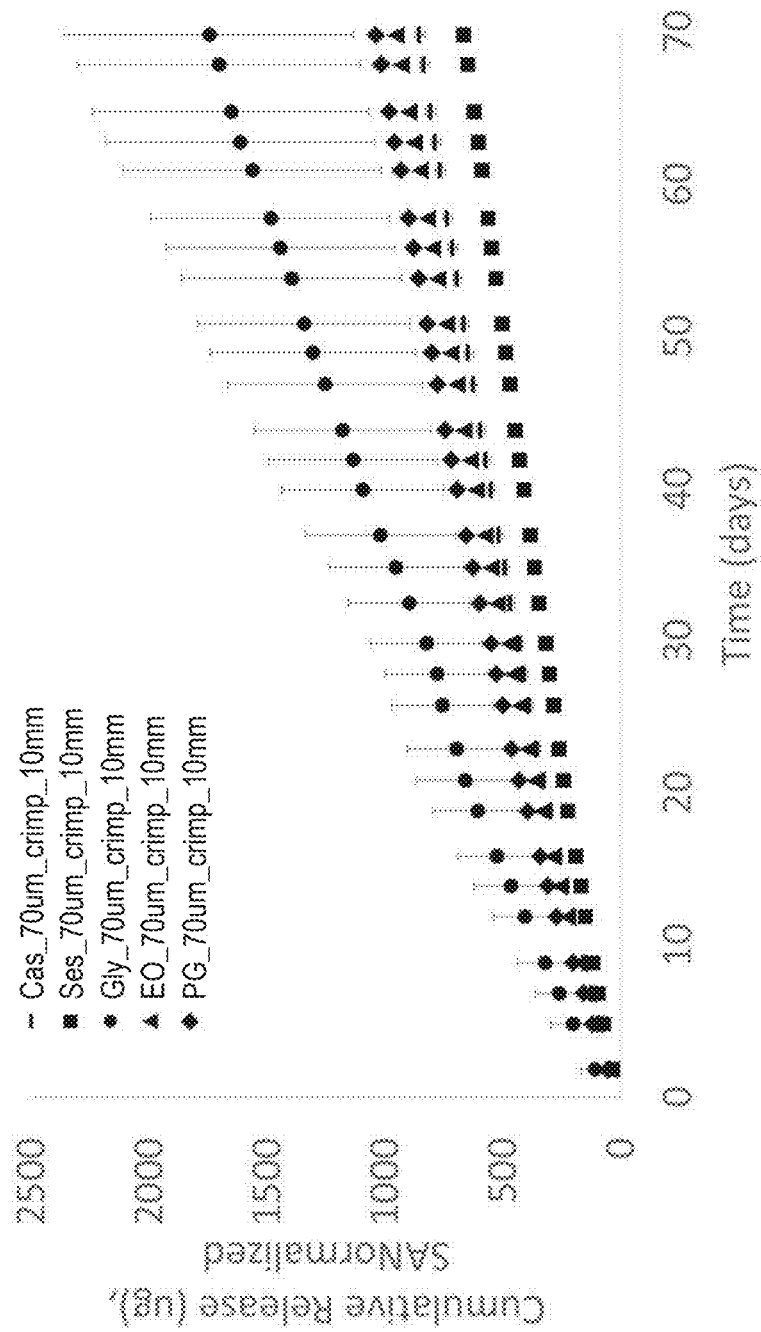
FIG. 11C is a line chart showing cumulative release profiles for EFdA formulated with varying excipients in devices with wall thicknesses of 70 µm.
Figure 11D:
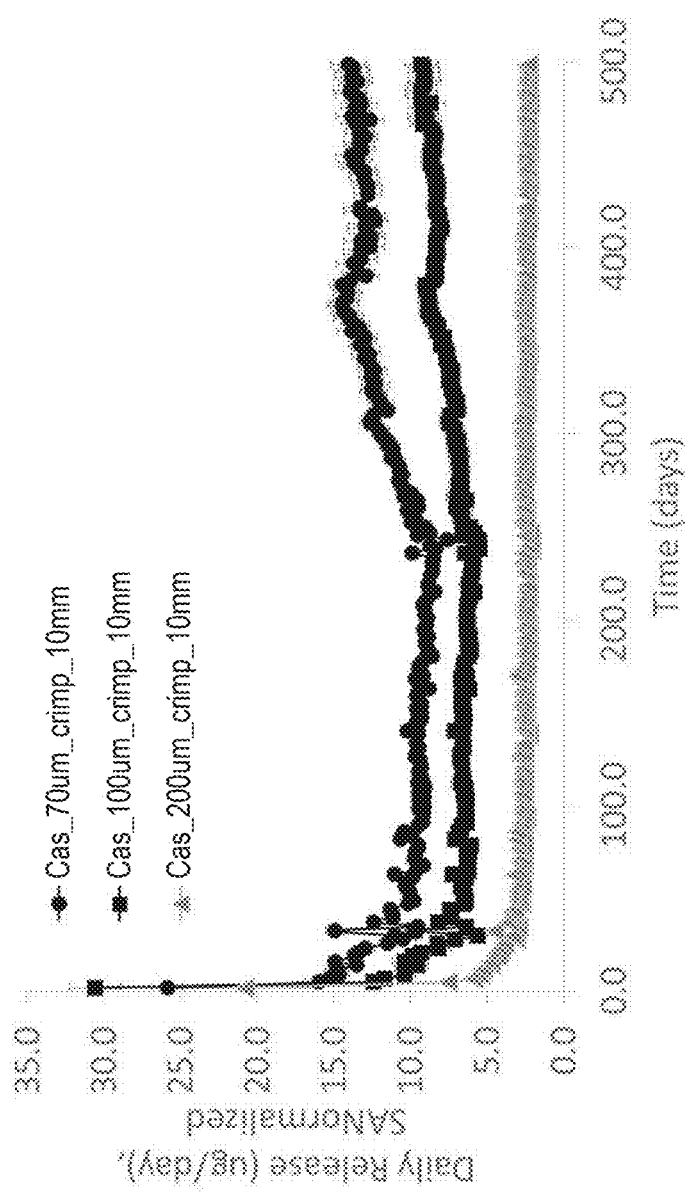
FIG. 11D is a line chart showing the daily release rates over time for devices with thicknesses of 70 µm, 100 µm and 200 µm for approximately 500 days.

EFdA-castor oil formulations within implants of varying wall thickness and surface area were tested. All devices were formulated with a 1:1 mass ratio of EFdA to castor oil. This study used implants with PCL of 89 kDa MW. The implant dimensions measured 10 mm in length by 2.5 mm outer diameter. The release rate of EFdA was a function of the implant thickness where the 70 μm devices had the fastest release rate, and the 200 μm tube had the slowest release rate. FIG. 11A provides a line chart showing the cumulative release of EFdA over time for devices with thicknesses of 70 μm, 100 μm and 200 μm for a time period of 70 days. FIG. 11D is a line chart showing the daily release rates over time for devices with thicknesses of 70 μm, 100 μm and 200 μm for approximately 500 days. In addition, testing showed that the release rate scaled proportionally with increasing membrane surface area, where devices with a 70 μm wall thickness and a length of 20 mm released twice the amount of EFdA compared to devices with 70 μm wall thicknesses and a length of 10 mm Both device types included the same formulation. FIG. 11B shows the data comparing cumulative release amounts for devices with a 70 μm wall thickness and lengths of 20 mm and 10 mm.

Additionally, two end-sealing methods were evaluated. Although the crimp seal exhibited good integrity and has been commonly used in the in-vitro release assessment, the alternative injection-sealing method is more amenable to a larger scaled process and trocar compatibility. The release kinetics of implants with both crimp seals and injection seals containing the same EFdA-Castor oil mixture was evaluated. The release rates were the same irrespective of the sealing methods, and the injection sealing method did not result in device failures. FIG. 11B illustrates these results.

Figure 11E:
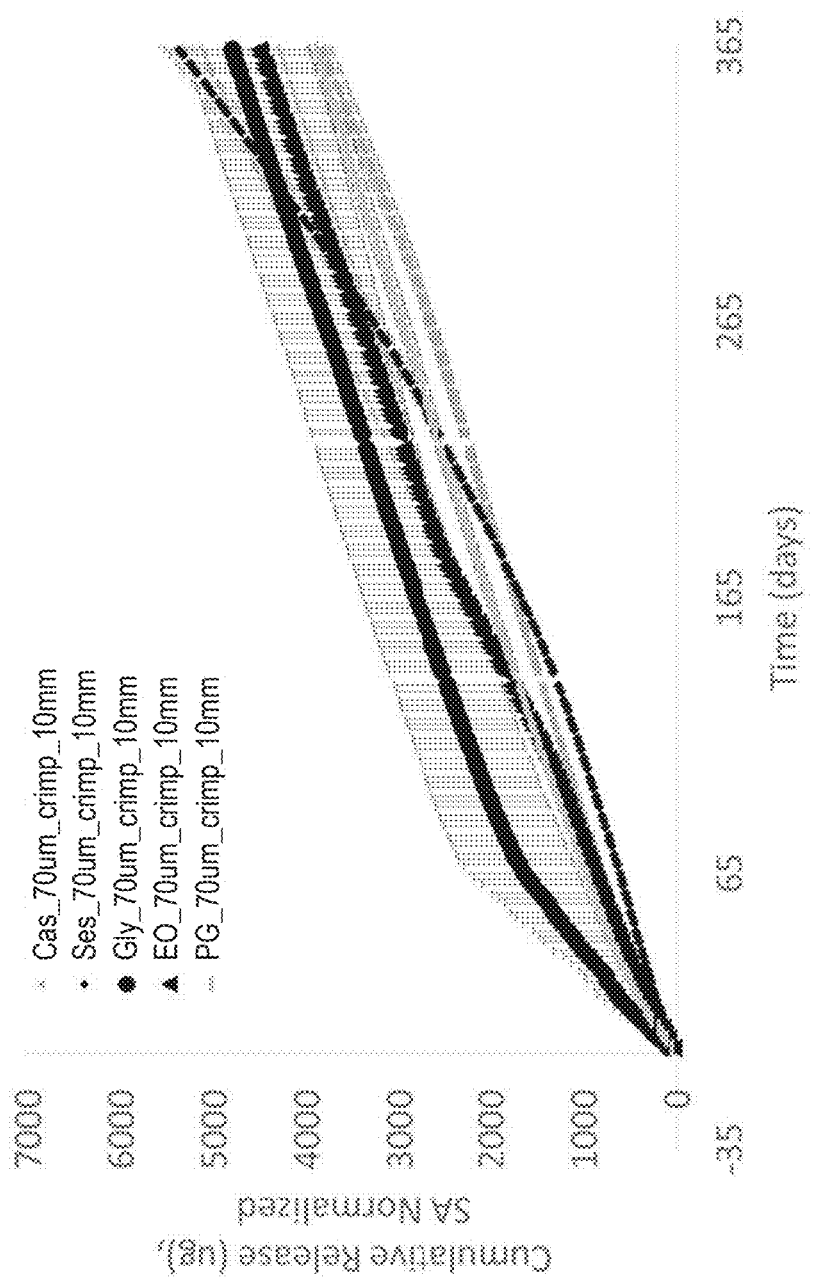
FIG. 11E is a line chart showing the cumulative release profiles for EFdA formulated with varying excipients in PCL tubes with wall thicknesses of 70 µm with a medical grade PCL and implants prepared with a crimped seal for a duration of a year.

In addition to castor oil excipient, EFdA was formulated with several other excipients including sesame oil, glycerol, ethyl oleate and propylene glycol. The release rate for the sesame oil device was 8 μg of EFdA/day, and the release rate for the glycerol device was 30 μg of EFdA/day. FIG. 11C illustrates the cumulative release profiles for EFdA formulated with varying excipients in devices with wall thicknesses of 70 μm. As can be seen, the devices had sustained, zero order release for over 60 days. The glycerol devices exhibited a large variation in the release rate, which could have been due to device failure caused by the swelling/bulging of the devices. FIG. 11E shows the cumulative release profiles for EFdA formulated with varying excipients in PCL tubes with wall thicknesses of 70 μm with a medical grade PCL and implants prepared with a crimped seal for a duration of a year. Table 6 shows the average release rate and chromatographic purity of EFdA formulated with various excipients for a 10 mm device. As can be seen in Table 6, the excipients used influenced the release rate, ranging from 10 to 15 μg of EFdA/day for the castor oil device and the glycerol device, respectively. The EFdA castor oil devices exhibited sustained linear release over 1 year, whereas the remainder of formulations deviated from zero-order release profiles after 200-day exposure to the in-vitro environment. Without being bound by theory, it is believed that the large variations in the release rates of these devices could arise from device failure caused by the swelling/bulging of the devices. Additionally, devices were used for chromatographic purity analysis to assess the stability of various formulations at Day-365. The implants all showed EFdA with >99% purity after 1 year of exposure to in-vitro conditions.

TABLE 6

Average release rate and chromatographic purity of EFdA formulated with various excipients for a 10 mm device.

| Excipients | Release Rate (μg/day, 10 mm device) | % Purity at Day-365 |
|---|---|---|
| Castor oil | 10.0 | 99.3 |
| Sesame oil | 12.0 | 99.3 |
| Glycerol | 15.0 | 99.5 |
| Ethyl Oleate | 13.0 | 99.4 |
| Propylene Glycol | 11.0 | 99.5 |

Figure 11F:
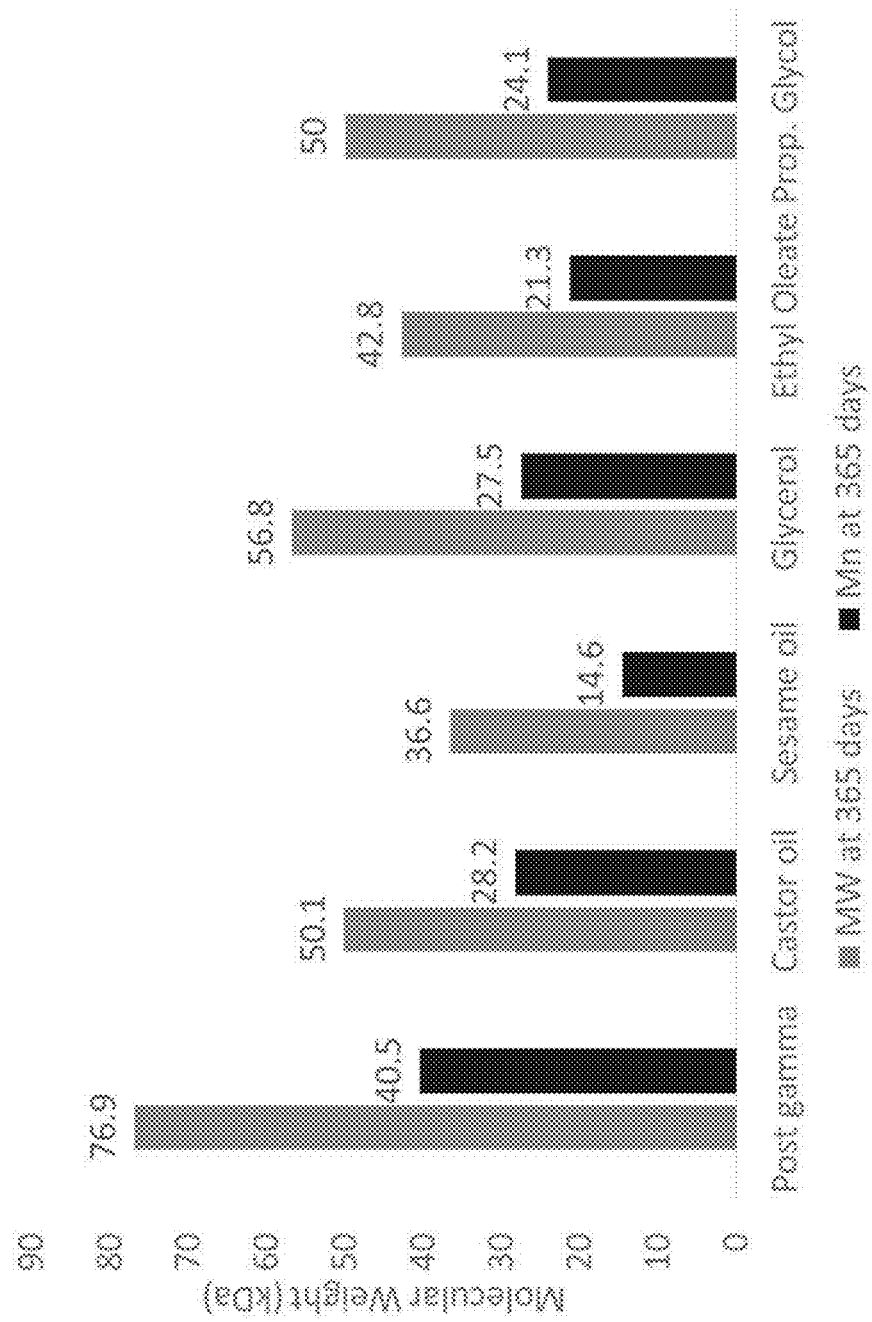
FIG. 11F is a chart showing the molecular weight of exemplary devices immediately following gamma treatment and then again after 365 days of testing.

Testing was performed to determine whether different formulations had a different effect on the degradation of the polymer being used. FIG. 11F is a chart showing the molecular weight of exemplary devices immediately following gamma treatment and then again after 365 days of testing. The excipients tested included castor oil, sesame oil, glycerol, ethyl oleate and propylene glycol. The results indicated that the formulations do affect the degradation rate of the polymer. Devices comprising formulations with sesame oil had the highest degradation rate.

Example 8. Effect of Ratio of Active Agent to Excipient on Release of TAF from Device Testing was performed to evaluate release kinetics of varying formulations of active agent and excipient. In particular, the release mechanism and release profiles for TAF formulated with varying mass quantities of castor oil from extruded PCL tubes was evaluated. Heat extruded PCL devices were fabricated (2.5 mm×40 mm) using 80 kDa Sigma grade PCL. The devices were loaded with a paste consisting of TAF and castor oil formulations in mass ratios of 1:1, 2:1, 3:1, 4:1, and 5:1 and enclosed by heat sealing. For the in vitro release studies, devices were incubated in 40 mL of phosphate buffered saline (PBS) at pH 7.4 in a shaking incubator at 37° C. The implants were transferred to fresh buffer three times per week to maintain sink conditions. TAF concentration released in media over time was measured via UV-Vis spectroscopy.

Figure 12:
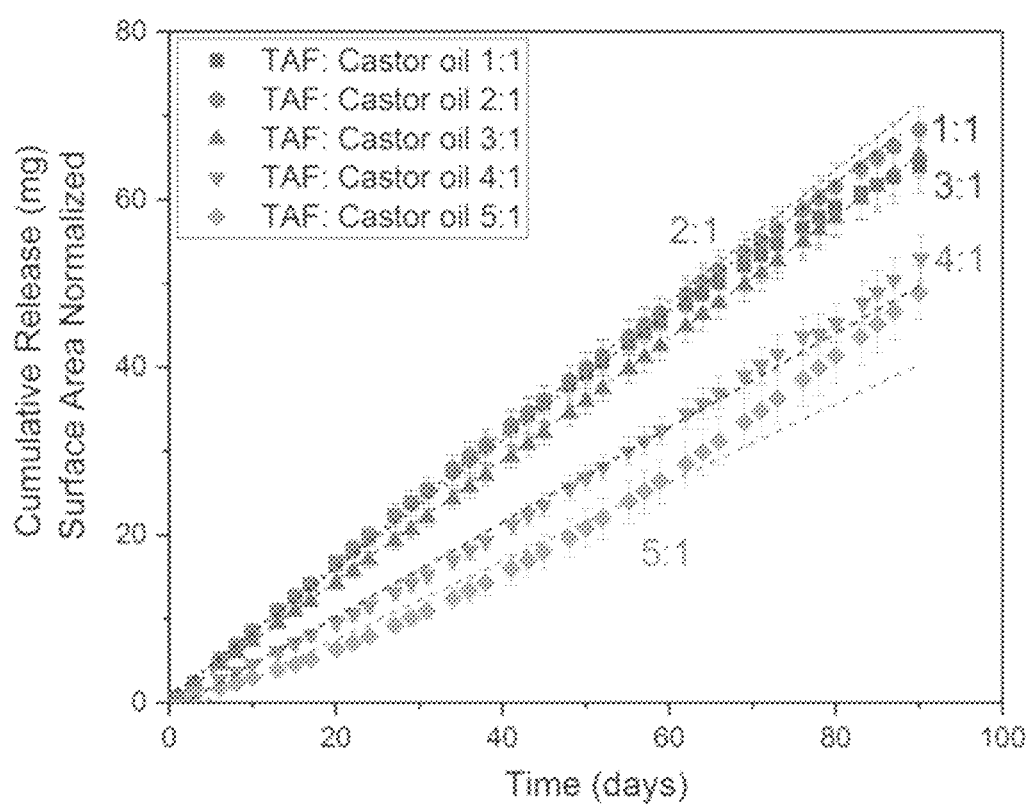
FIG. 12 is a line chart showing cumulative release over a time period of 90 days for Example 8.
Figure 13:
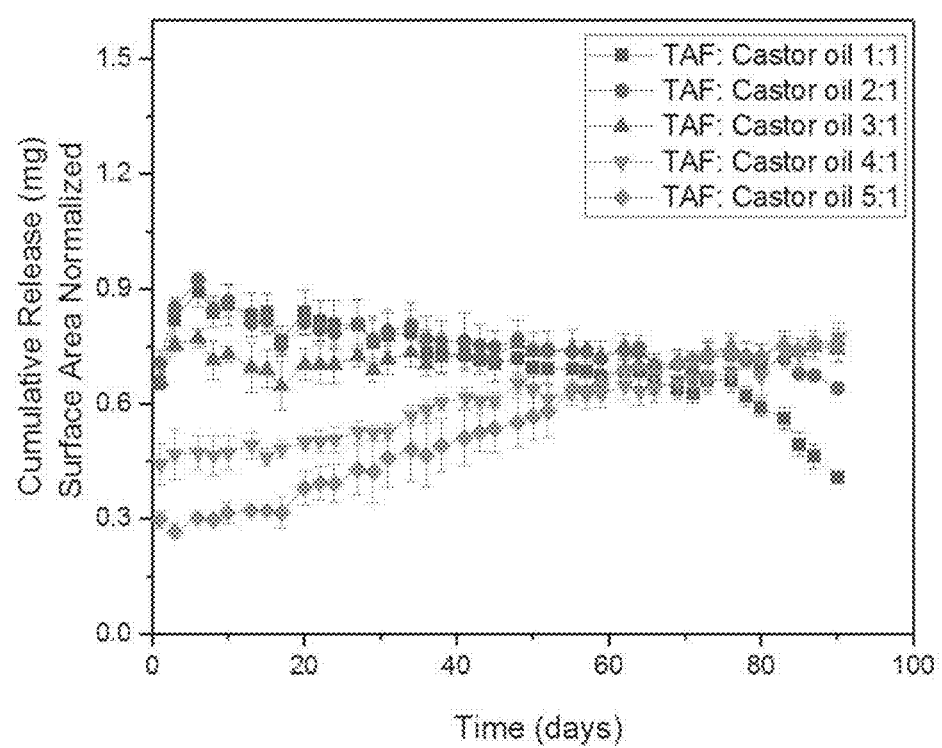
FIG. 13 is a line chart showing daily release rate over a time period of 90 days for Example 8.

FIGS. 12 and 13 show the results of the in-vitro testing for the varying formulations. In particular, FIG. 12 is a line chart showing the cumulative release over a time period of 90 days, and FIG. 13 is a line chart showing the daily release rate over a time period of 90 days. In FIG. 12, the dashed lines show linear regression fits to the release data for each formulation. Devices formulated with TAF and castor oil in mass ratios of 1:1 and 2:1 started to deplete at 76 days and 83 days, respectively. This result demonstrates that by changing the ratio of drug to excipient, the drug release rate can be maintained for varying amounts of time. That is, the duration of delivery is different but the daily release rate can be maintained for the duration. Each group consisted of n=3 devices and measurements represent mean values +/− standard deviation.

As can be seen in FIGS. 12 and 13, formulations of TAF and castor oil in mass ratios of 1:1, 2:1 and 3:1 resulted in linear release rates, suggesting membrane-controlled release. In contrast, formulations of TAF and castor oil at mass ratio of 4:1 and 5:1 demonstrated non-linear release profiles, with gradually increasing release rates over 90 days. The release rates of all tested formulations merged over time.

For TAF castor oil formulations at mass ratios of 1:1, 2:1 and 3:1, a release rate of 0.7 mg of TAF per day from 70 μm implants (2.5 mm×40 mm) was measured. The modified diffusion equation provided above was used to predict the release rate for a full sized device. The predicted rate was compared to the measured rate. Comparison data is shown in Table 7 below. For the calculations, the surface area of the devices was 314 mm². J=0.002 mg/day/mm². The solubility of TAF in castor oil ($C_s$) was measured to be 3.9 mg/mL using UPLC method, thus Cs=3.9 mg/mL. L=70 μm. Thus, in the equation, $$D_m K = \frac{J \times L}{C_s} = 4.63 \times 10^{-13} \, m^2/s.$$

TABLE 7

Predicted and experimental values of release rates for castor oil devices when the release rate is governed by diffusion of drug through the polymer membrane.

| PCL wall thickness (μm) | Predicted release rates for full sized device (mg/day) | Measured release rates for full sized device (mg/day) |
|---|---|---|
| 70 | 0.7 | 0.7 ± 0.08 |
| 100 | 0.49 | 0.38 ± 0.04 |
| 200 | 0.25 | 0.22 ± 0.01 |

The devices loaded with 4:1 and 5:1 TAF and castor oil pastes demonstrated non-linear release profiles with gradually increasing release rates over a course of 90 days. The initial release rates for 4:1 and 5:1 TAF-castor oil formulations were measured to be 0.2 and 0.4 mg/day, respectively. Their release rates were lower than the diffusion rate (0.7 mg/day for 70 μm castor oil EXPDs), indicating that dissolution of the drug was the rate-limiting step. According to Noyce-Whitney equation, the dissolution rate is proportional to the surface area of the interface between the substance and the solvent (A). Compared to 1:1, 2:1 and 3:1 ratio TAF-castor oil formulations, the 4:1 and 5:1 ratio formulations contained smaller quantities of excipient, which confined the interface between TAF and castor oil and appeared to not fully wet the drug particles, leading to lower initial dissolution rates. The release rates of 4:1 and 5:1 ratio formulations increased over time and merged with that of TAF castor oil formulations in mass ratios of 1:1, 2:1 and 3:1. This may be due to an increase in the dissolution rates over time. These results suggest that the release processes for the 4:1 and 5:1 ratio formulations start out as dissolution-limited release and gradually transition to membrane-controlled release. The data suggests that when membrane-controlled release is achieved, TAF formulations with varying drug excipient ratios (i.e., 1:1, 2:1 and 3:1) can exhibit the same constant release rate. Using this data, a mathematical model was developed to predict the rate of drug release.

The TAF excipient ratio of 3:1 was identified as the optimal drug excipient ratio that maximized TAF loading capacity while maintaining zero-order release. When the TAF excipient ratio was above the optimal ratio (also referred to herein as "maximum ratio"), the release process was firstly governed by the dissolution process and then gradually transitioned to membrane-controlled release. When the membrane-controlled release was achieved, TAF formulations with varying drug excipient ratios (i.e., 1:1, 2:1 and 3:1) exhibited the same constant release rate.

Example 9. Effect of Ratio of Active Agent to Excipient and Particle Size of Active Agent on Release of TAF from Device Additionally, the effect of particle size distribution on release kinetics was evaluated. In particular, the release rate of TAF with various particle size distributions from the extruded PCL devices was investigated. TAF particles with D90 ranging from 3 to 613 μm were evaluated. Table 8 shows the size parameters of the various particles that were tested.

TABLE 8

Particle size data (D10, D50, D90) of TAF tested.

|  | D10 (μm) | D50 (μm) | D90 (μm) |
| --- | --- | --- | --- |
| TAF1 | 4 ± 0.1 | 41 ± 2 | 201 ± 5 |
| TAF2 | 29 ± 1 | 266 ± 13 | 613 ± 33 |
| TAF3 | 2 ± 0.08 | 9 ± 0.4 | 39 ± 1 |
| Jet Milled TAF | 0.8 ± 0.006 | 1.7 ± 0.03 | 3 ± 0.1 |

Figure 14:
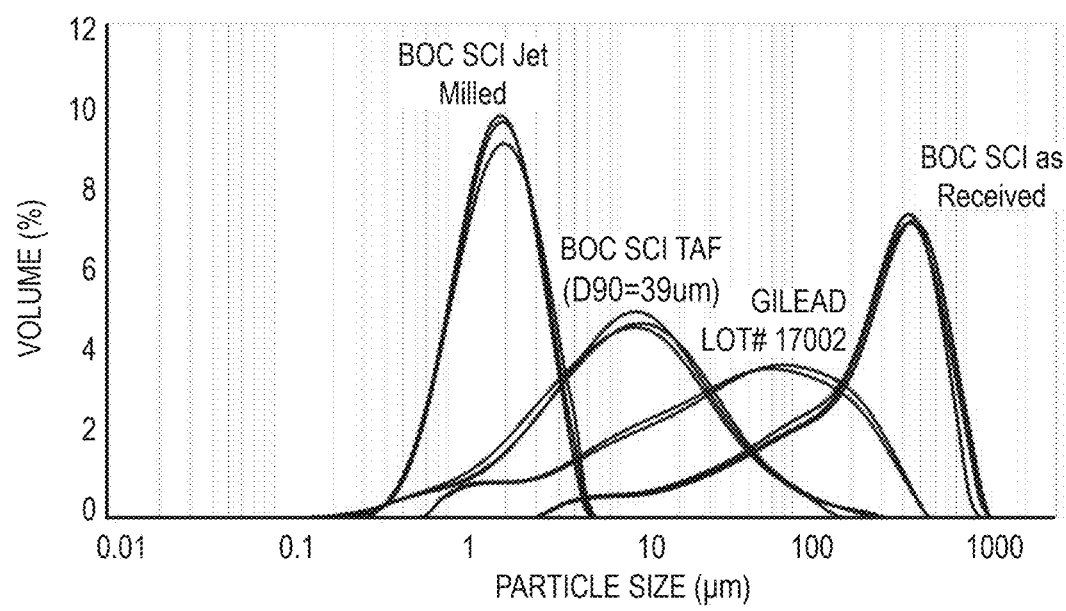
FIG. 14 is a particle size distribution curve for TAF samples measured by the Malvern Mastersizer 2000 in Example 8.
Figure 15:
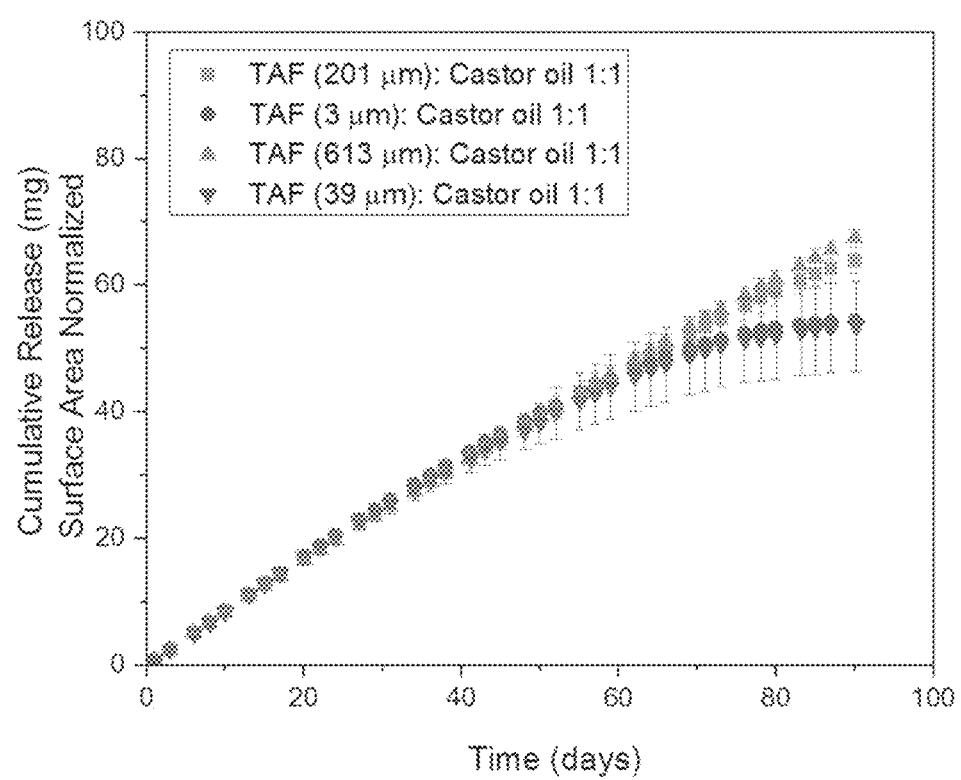
FIG. 15 is a line chart showing cumulative release profiles of TAF formulated with castor oil in a ratio of 1:1 over a time period of 90 days.
Figure 16:
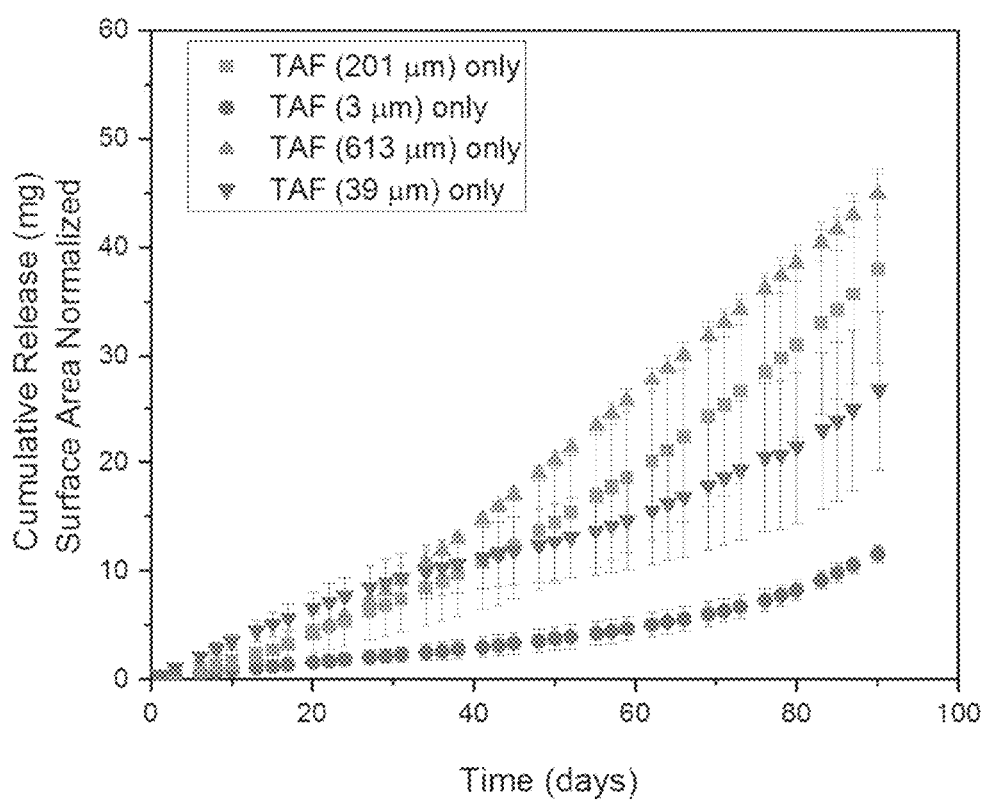
FIG. 16 is a line chart showing cumulative release profiles for pure TAF with various particle size distributions over a period of 90 days.

Additionally, FIG. 14 provides the particle size distribution for the TAF samples measured by the Malvern Mastersizer 2000. The release kinetics for TAF formulated with castor oil excipient in a mass ratio of 1:1 was tested. FIGS. 16 and 16 show the results of the testing. FIG. 15 provides the cumulative release profiles of TAF formulated with castor oil in a ratio of 1:1 over a time period of 90 days. The release kinetics for devices containing TAF powders of varying particle size distributions with no excipient was also tested. FIG. 16 provides the cumulative release profiles for pure TAF with various particle size distributions over a period of 90 days. Each group consisted of n=3 devices and measurements represent mean values +/− standard deviation.

As can be seen in FIG. 15, the 1:1 formulation achieved the same release rate for all the TAF particles with various sizes. The results indicated that release rate from the device was not influenced by TAF particle size at this formulation. FIG. 16 shows that the devices wherein excipient was not used exhibited non-linear release profiles, and the release rates were affected by the particle size.

The data showed that the release rate from the device was not influenced by TAF particle size, when TAF was formulated with an excipient and membrane-controlled release was achieved. In contrast, the release rate for the dissolution-limited release process was affected by the particle size distribution.

The release rate from the device was affected by the particle size when no excipient was used. In contrast, the release rate was not influenced by TAF particle size when the TAF excipient ratio was 1:1 (i.e., when membrane-controlled release is achieved).

Example 10. Release of API from Device without Excipient

Figure 17:
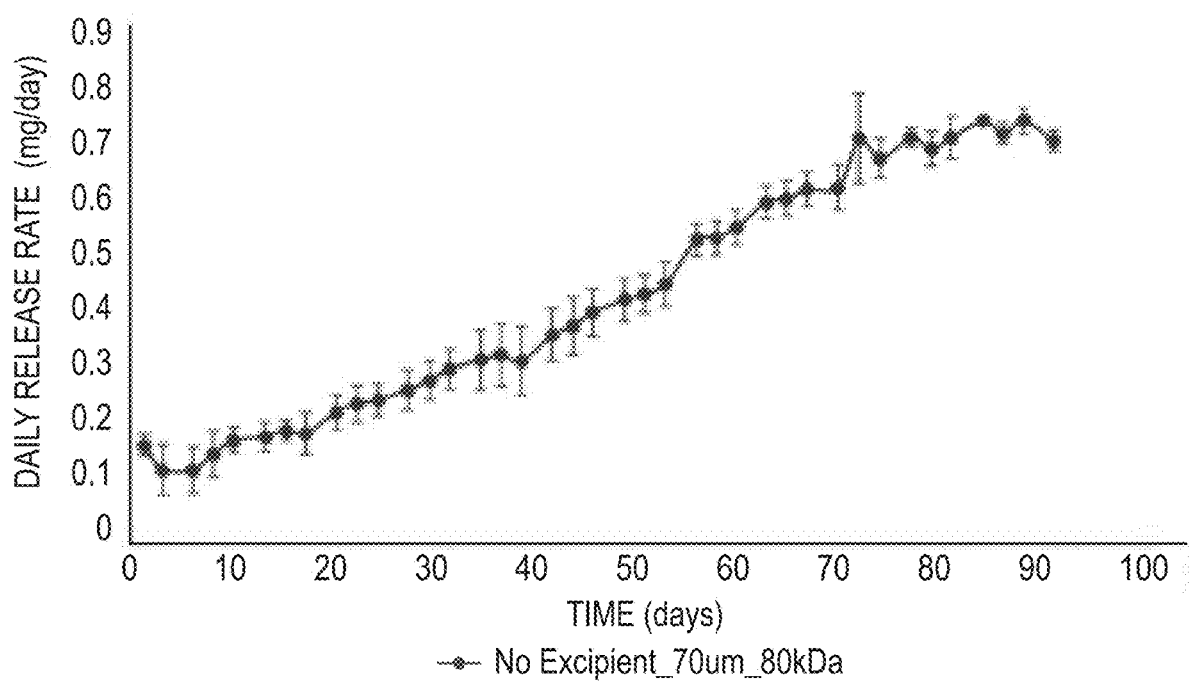
FIG. 17 is a line chart showing the daily release rate without excipient over a 90 day period.

Testing was performed to evaluate the release profile of the active agent from a device with no excipient. Pure TAF without inclusion of an excipient was loaded into an extruded PCL tube (70 μm wall thickness and 80 kDa MW) and tested in an in-vitro assay. FIG. 17 is a line chart showing the daily release rate over a 90 day period. As can be seen, the lack of excipient resulted in a non-zero order release behavior.

Example 11. In Vivo Demonstration of Zero-Order Kinetics

Figure 18:
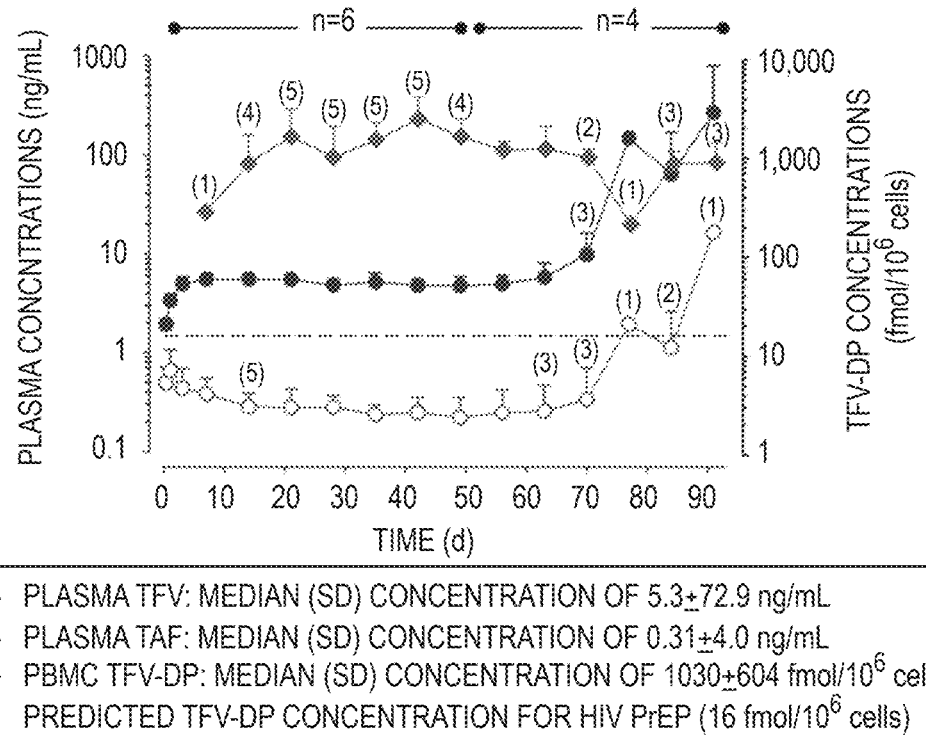
FIG. 18 is a line chart showing plasma concentration over time for 90 days.

Testing was performed to evaluate the in vivo release profile of an exemplary device. Female New Zealand White rabbits were subcutaneously implanted with devices containing either 1) TAF formulated with an excipient or 2) control devices containing only excipient for up to 90 days of drug release. FIG. 18 is a line chart showing plasma concentration over time for 90 days. As shown in FIG. 18, levels of TFV and TAF in plasma, and the TFV-DP levels in PBMCs, remained constant and zero-order through at least 70 days. Additionally, minimal reactivity was detected at the site of the implant.

Example 12. In Vitro Release from a Segmented Device

Testing was performed to evaluate the in vitro release profile for an exemplary segmented device. In-vitro conditions included a simulated physiological media of a salt solution at pH between 6.5 and 7.5 at a temperature of 37° C. The exemplary device was engineered to release two APIs simultaneously, both at zero-order release kinetics. The device was fabricated with a segmented architecture that contained LNG formulated with ethyl oleate at a 1:4 ratio and EFdA formulated with castor oil at a 1:1 ratio and housed in separate compartments within a single implant design. Different segment lengths, polymer membrane thicknesses and polymer properties were tested. Table 9 provides a listing of the different device configurations that were evaluated.

TABLE 9

Experimental Design For In-Vitro Release Profiles From Segmented Implants.

| Formulation | PCL grade | Length EFdA segment (mm) | Length LNG segment (mm) | PCL wall thickness (μm) |
| --- | --- | --- | --- | --- |
| LNG: ethyl oleate (1:4) | Sigma 80 KDa | 15 | 10 | 70 |

TABLE 9-continued

Experimental Design For In-Vitro Release Profiles From Segmented Implants.

| Formulation | PCL grade | Length EFdA segment (mm) | Length LNG segment (mm) | PCL wall thickness (μm) |
|---|---|---|---|---|
| EFdA: castor oil (1:1) | PC 12 | 20 | 15 | 70 |

Figure 19:
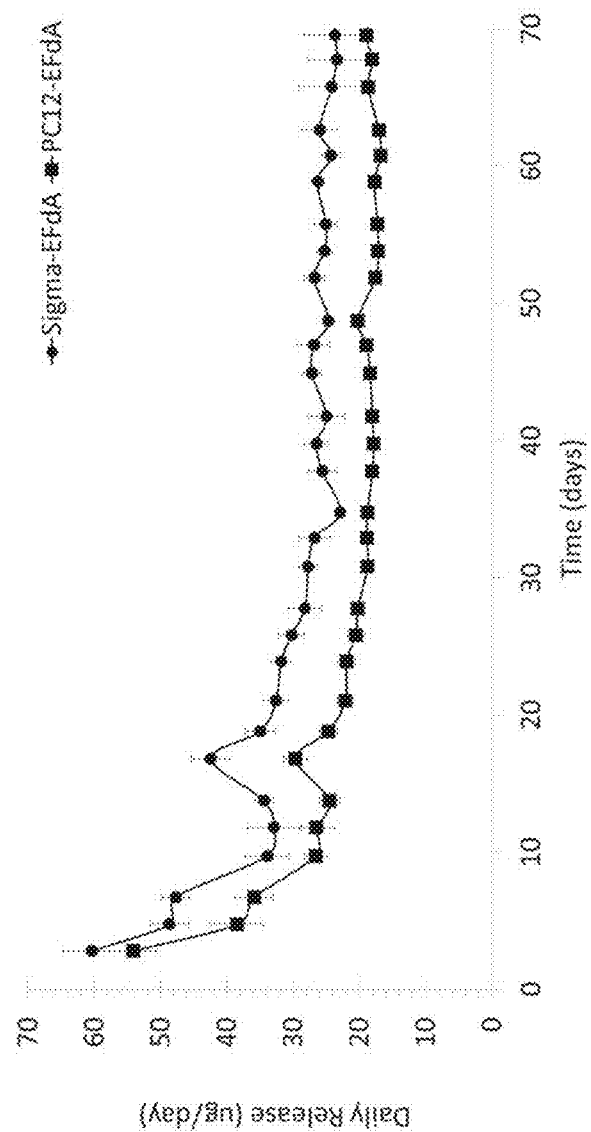
FIG. 19 is a line chart showing daily release rate for EFdA over a period of 70 days.
Figure 20:
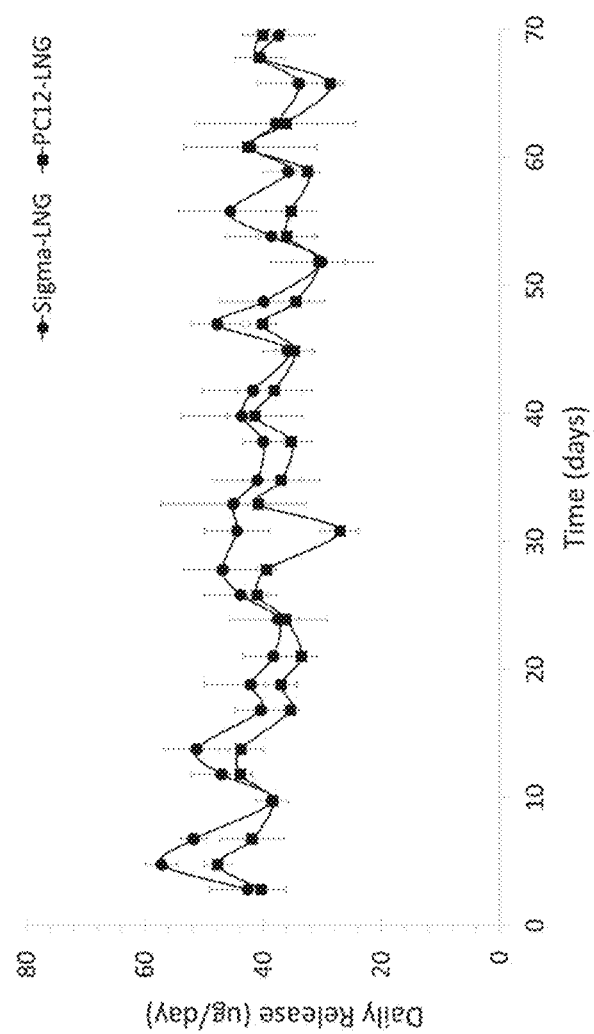
FIG. 20 is a line chart showing daily release rate for LNG over a period of 70 days.
Figure 21:
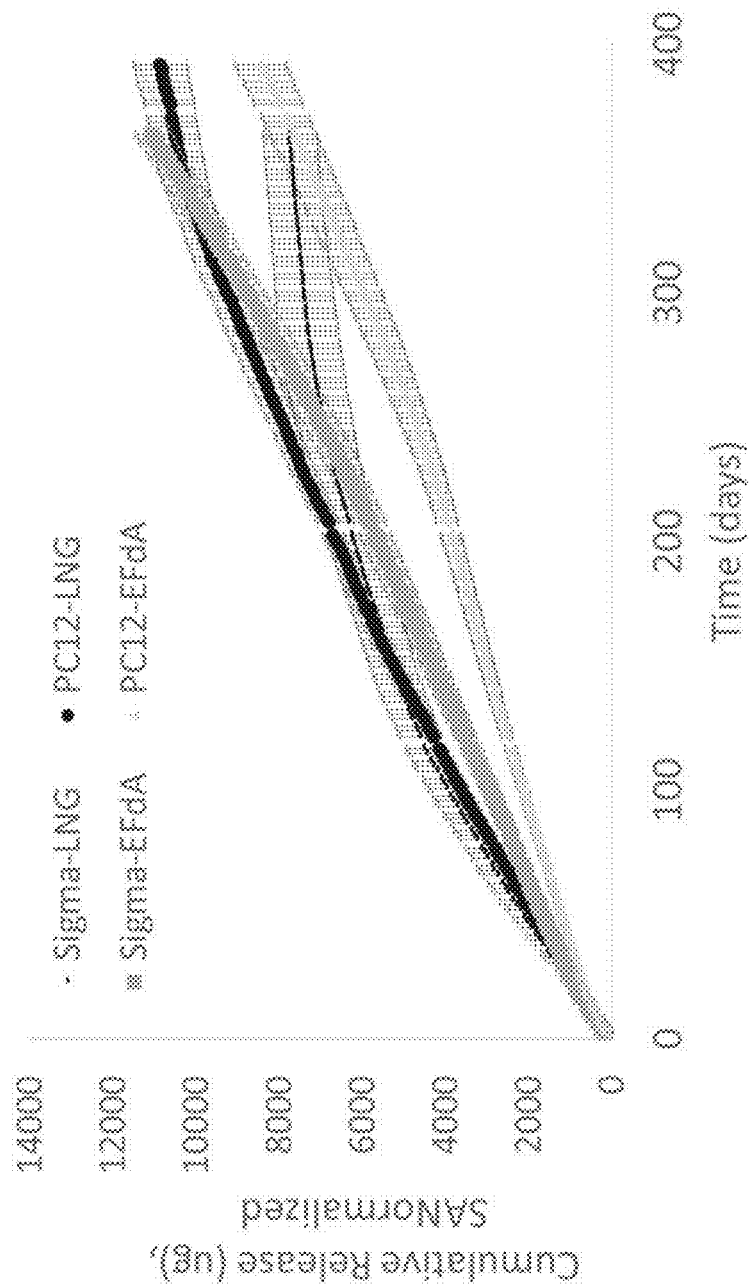
FIG. 21 is a line chart showing cumulative release rate for LNG and EFdA from a segmented single implant over 1 year.

FIGS. 19 and 20 show the in vitro release results from Example 12. Namely, FIG. 19 is a line chart showing daily release rate for EFdA over a period of 70 days, and FIG. 20 is a line chart showing daily release rate for LNG over a period of 70 days. As shown in FIGS. 19 and 20, LNG and EFdA were released from a single implant over 70 days at a constant release rate. Two different PCL types were employed in this study: Sigma grade PCL (80 kDa MW) and medical grade PCL (Corbion PC12, MW 51 kDa). As shown in FIGS. 19 and 20, the release of LNG and EFdA from a single implant occurred at zero-order release rates. FIG. 21 is a line chart showing cumulative release rate for LNG and EFdA from a segmented single implant over 1 year. The release of LNG and EFdA from the implant occurred at zero-order release rates over 6 months. The release rates of the LNG segments were ~30-40 μg/day. The EFdA segments exhibited a small burst release during the first 10 days, followed by a sustained release at a release rate of ~20 μg/day. Due to a low drug to excipient ratio (1:4) of the LNG formulation, the release profiles of the LNG segments in both Sigma and medical grade PCL devices started to deviate from zero order kinetics at ~Day 180 and the release rates of LNG gradually decreased over time until depletion. In contrast, the EFdA segment continued to release linearly and maintain zero-order kinetics over 1 year.

Example 13. Preparation and Analysis of an Exemplary Biodegradable Reservoir-Style Device 13.1 Implant Fabrication PCL pellets were purchased in research-grade from Sigma Aldrich, referred to as "Sigma-PCL" herein (average Mn=103 kDa, Cat #440744, St. Louis, MO) and in medical-grade from Corbion, referred to as "PC-12" herein (average Mn=51 kDa, PURASORB PC 12, Amsterdam, Netherlands). PCL tubes were fabricated via a hot-melt, single screw extrusion process using solid PCL pellets. All tubes were 2.5 mm in outer diameter (OD) and had wall thicknesses of 45, 70, 100, 150, 200 or 300 μm, as measured with a 3-axis laser measurement system and light microscopy.

PCL tubes were first sealed at one end using two different approaches: impulse heat sealing and injection sealing. For the first approach, an impulse heat sealer was used to clamp the tube flat and then apply a pulse of heat for a few seconds and allow the tubing to cool for about 10 seconds. Thicker tubes were sealed with longer heat pulses. The sealing step fused the PCL tube wall together through melting and created a flat-shaped seal. The seal was trimmed with scissors to remove excess PCL. For the injection sealing, the PCL tube was marked and trimmed to the correct length to achieve an implant with a 40-mm paste length with 3 mm of headspace at both ends for sealing. The initial seal was then created on one end of the implant by placing the tube over a stainless steel rod that filled all the tube except for a 3 mm headspace at one end, placing a polytetrafluoroethene (PTFE) collar around the headspace to support the tube wall and injecting molten PCL into the cavity of the headspace. After the injected PCL was solidified, excess PCL was trimmed and the collar was removed to form a cylindrical seal approximately 2 mm long that is compatible with commercial contraceptive trocars.

TAF was mixed with pharmaceutical grade, Super Refined™ Castor Oil (Croda, Cat #SR40890, Snaith, UK) at 2:1 mass ratio immediately prior to loading into the implant. The mixture was first ground with a mortar and pestle to create a smooth paste, and then back loaded into a 1 mL syringe fitted with a 14-gauge blunt tip needle. The TAF and castor oil paste was then extruded through the needle into the empty tube. Otherwise, the TAF formulation was loaded into the PCL tube using a modified spatula. After the filled formulation reached the 40-mm mark, the interior tube wall was cleaned with a rod and sealed in a similar manner to the first seal. After fabrication, all devices were weighed to determine the total payload and photographed with a ruler to record the final dimensions. Paste area was measured with ImageJ and release rates were normalized to the surface area of a full-sized implant (2.5 mm OD, 40 mm in length), 314 $mm^2$. The end of the implants (i.e., end-seals) were not included in calculations of the implant surface area.

13.2 Device Sterilization

All implants were fabricated and handled under aseptic conditions using a biosafety cabinet. Certain devices were exposed to gamma-irradiation. Devices exposed to gamma-irradiation were first packed in amber glass vials and then irradiated with a dose range of 18-24 kGy at room temperature, using a Cobalt-60 gamma-ray source (Nordion Inc., Ottawa, Canada) at Steris (Mentor, OH). Samples were exposed to the source on a continuous path for a period of 8 hours.

13.3 In Vitro Release Studies

In vitro release characterization involved incubation of the implants in 40 mL 1× phosphate buffered saline (PBS) (pH 7.4) at 37° C. and placed on an orbital shaker. TAF species in the release media was measured by ultraviolet-visible (UV) spectroscopy at 260 nm using the Synergy MX multi-mode plate reader (BioTek Instruments, Inc, Winooski, VT). The release buffer was sampled three times per week during which the devices were transferred to 40 mL of fresh buffer to maintain sink conditions. TAF quantity released in each PBS buffer during the time interval was calculated and cumulative mass of drug release as a function of time was determined.

13.4 Stability Analysis of TAF Formulation

The purity of TAF formulations inside the device reservoir was evaluated by opening a device, extracting the entire reservoir contents into an organic solution, and measuring TAF chromatographic purity using ultra performance liquid chromatography coupled with UV spectroscopy (UPLC/UV). The analysis was performed using a Waters BEH C18 column (2.1 mm×50 mm, 1.7 μm) under gradient, reversed phase conditions with detection at 260 nm. For each device, one single aliquot was prepared and quantitated by linear regression analysis against a 5-point calibration curve. TAF purity was calculated as % peak area associated with TAF relative to total peak area of TAF related degradation products (detected above the limit of detection (LOD)≥0.05%). The TAF formulations within the implant were analyzed after exposure of the implant to a simulated physiological condition (i.e., 1×PBS, pH 7.4 at 37° C.) for up to 180 days.

13.5 Characterization of PCL Extruded Tubes
13.5.1 Differential Scanning Calorimetry (DSC)

The melting behavior of PCL samples was assessed with modulated differential scanning calorimetry (MDSC) (TA Instruments Q200, RCS90 cooling system). Approximately 8 mg of extruded polymer tubing was placed in a Tzero™ Pan and sealed with a Tzero™ Lid and a dome-shaped die, resulting in a crimped seal. Samples were then placed in a nitrogen-purged DSC cell, cooled to 0° C., then heated to 120° C. at a rate of 1° C./minute with an underlying heat-only modulation temperature scan of ±0.13° C. every 60 seconds. The $T_m$ of the polymer was determined by the peak temperature of the melting endotherm, and the enthalpy associated with melting was determined by integrating linearly the area of the melt peak (between 25 and 65° C.) using the TA Universal Analysis software. PCL samples did not exhibit exothermic peaks in the non-reversing heat flow signal indicating that PCL did not experience cold-crystallization during the melting process; therefore, the total heat flow curve was used to assess the mass % crystallinity. The mass % crystallinity was calculated using Equation 1, where $X_c$ represents the mass fraction of crystalline domains in PCL, $\Delta H_m$ represents the enthalpy of melting measured by the DSC, and $\Delta H_{fus}$ represents the theoretical enthalpy of melting for 100% crystalline PCL, reported as 139.5 J/g.

$$X_c = \frac{\Delta H_m}{\Delta H_{fus}} \times 100 \qquad \text{Equation (1)}$$

The peak melting temperatures of polymers were used calculate crystallite sizes within the sample using the Thompson-Gibbs equation (Equation 2):

$$L = \frac{2\sigma_e T_m^o}{\Delta H_m^o (T_m^o - T_m)} \qquad \text{Equation (2)}$$

Where L is the crystallite size in nm, $\sigma_e$ is the free energy of chain folds in mJ/m², $T_m^o$ is the equilibrium melting temperature in K, $T_m$ is the melting temperature measured by DSC in K, and $\Delta H_m^o$ is the enthalpy of fusion for 100% crystalline polymer in J/g. $T_m^o$ and $\Delta H_m^o$ were taken from the ATHAS data bank as 342.2 K and 139.5 J/g, respectively. The free energy associated with chain folding was taken as 60 mJ/m².

13.5.2 X-Ray Diffraction (XRD)

The extruded PCL tubes at wall thickness of 100 μm were cryo-grinded in a freezer mill using liquid nitrogen. The material was ground for 1.5 minutes after cooling for three minutes before initiating the grinding cycle. The X-ray diffraction (XRD) patterns were acquired using a Bruker AXS, Inc. D8 Advance model utilizing standard Bragg-Brentano geometry and a LynxEye XE-T high resolution detector. Samples were packed into a zero background sample holder and scanned at 40 kV and 40 mA power settings (1600 Watts) for a scan covering 5° to 70°, with a step size of 0.02° and a dwell time of 2 seconds per step. The MDI Jade version 9.6 software was used to analyze results and the 2019 ICDD PDF 4+ database was used to search match crystalline phases present in the materials. The crystallite size was determined via the Scherrer equation (Equation 3).

$$L = \frac{K\lambda}{\beta \cos\theta} \qquad \text{Equation (3)}$$

where L=crystallite size, K=Scherrer constant (0.94 from literature), λ=X-ray wavelength, β=full-width at half maximum of a crystallographic peak, and θ=Bragg angle.

13.5.3 Gel Permeation Chromatography (GPC)

The MW of PCL was analyzed via GPC by first dissolving samples in tetrahydrofuran (THF) to 10 mg/mL and injecting 40 μL of sample using an Agilent 1100/1200 HPLC-UV instrument (flow rate of 1.0 mL/min). Polystyrene polymer standards (MWs of 2460 to 0.545 kDa) were used to calibrate the MW of samples.

13.5.4 Statistical Analysis

Where indicated, significance testing was performed with GraphPad Prism 7.00 using an unpaired, parametric, two tailed, t-test with a confidence level of 95%. P-values≤0.05 were considered statistically significant.

Figure 22A:
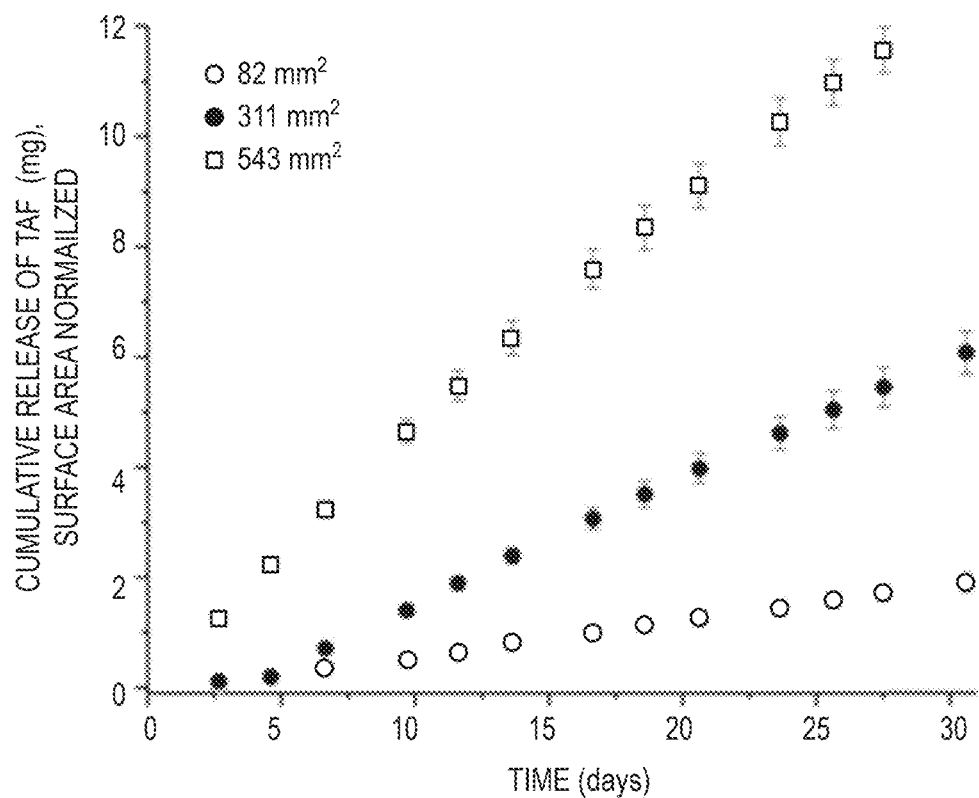
FIG. 22A is a line chart showing the cumulative release of TAF from the implants versus time for approximately 30 days.

13.6 Results
13.6.1 Tuning TAF Release Rates: Surface Area and Wall Thickness To evaluate the relationship between release rates and the surface area of the extruded PCL tubes, implants were fabricated with three different surface areas: 82±1 mm², 311±4 mm², and 543±5 mm². All devices comprised Sigma-PCL with a wall thickness of 100 μm, an OD of 2.5 mm, a formulation of 2:1 TAF:castor oil. FIG. 22A is a graph showing the cumulative release of TAF from the implants versus time for approximately 30 days.

Figure 22B:
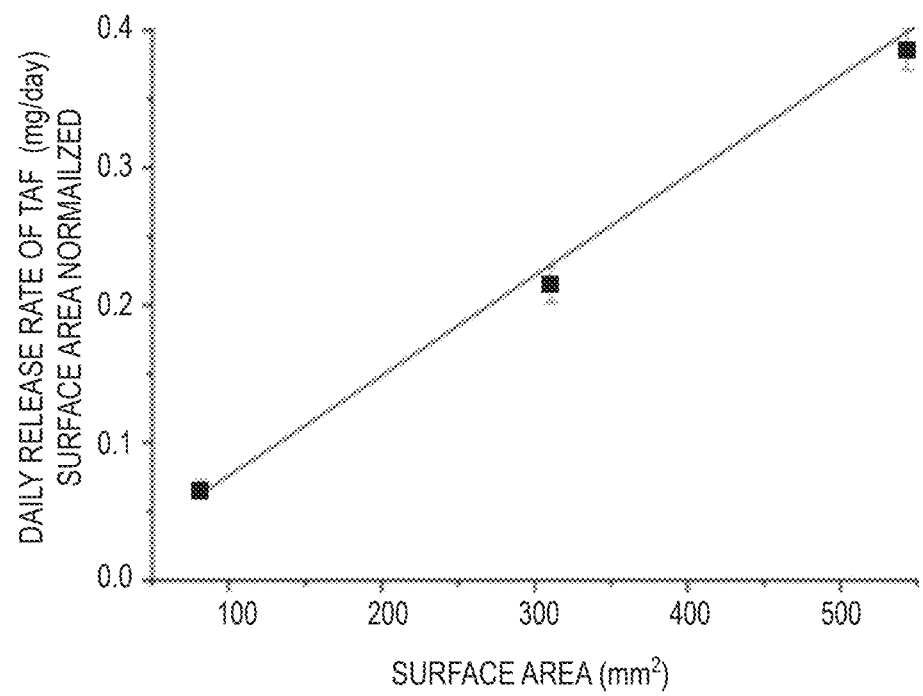
FIG. 22B is a line chart showing the daily release rate of TAF (mg/day) versus surface area in $mm^2$.

FIG. 22B is a graph showing the daily release rate of TAF (mg/day) versus surface area in mm². As can be seen, the higher surface area resulted in a higher release rate of TAF from the implant. Furthermore, the linear relationship between daily release rates and surface area supported the mechanism of membrane-controlled release from these implants.

Devices were fabricated using PCL tubes prepared via melt extrusion, which produced thicker walled tubes (between 45-200 μm). Despite the thicker PCL wall, the devices maintained membrane-controlled release in the range of wall thickness, demonstrating the robustness of the PCL-based drug delivery platform. The cylindrical geometry was fixed at 2.5 mm OD and 40 mm length to accommodate commercially available trocars utilized for contraceptive implants, and the release rates were normalized to the surface area of 314 mm².

Figure 23:
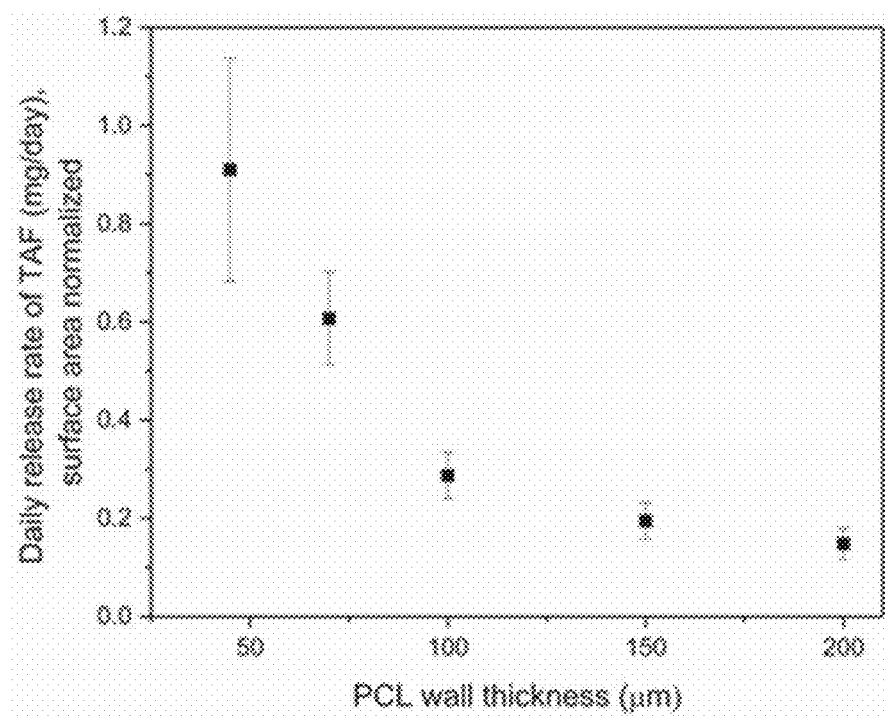
FIG. 23 is a line chart showing the daily release rates of TAF from implants comprising PCL of different wall thicknesses and containing a formulation of 2:1 TAF:castor oil excipient.

The thickness of the implant walls was another attribute that affected release rates of drug. FIG. 23 is a graph showing the daily release rates of TAF from implants comprising PCL of different wall thicknesses and containing a formulation of 2:1 TAF:castor oil excipient. The release rates of TAF inversely correlated with thickness of the PCL walls: 0.91±0.23 mg/day (45 μm), 0.61±0.09 mg/day (70 μm), 0.29±0.05 mg/day (100 μm), 0.19±0.04 mg/day (150 μm), and 0.15±0.03 mg/day (200 μm). As the wall thickness increased from 45 to 200 μm, the release rates approached a plateau wherein the release rates of TAF showed minimal change. The daily release rates were calculated over the first 30 days of TAF release from the implants, which included a burst release that is more pronounced in thinner walled implants that results in a higher standard deviation (e.g., 45 μm walled implant). To reserve adequate volume in the reservoir for drug load, the study only investigated wall thickness up to 200 μm. The study demonstrated the ability to employ two parameters, surface area or wall thickness, to tailor the release rates of TAF from a reservoir-style implant fabricated with extruded PCL tubes.

13.6.2 Effects of PCL Properties on Implant Performance

PCL is a semi-crystalline, hydrophobic polymer with biodegradation kinetics that depend on the initial MW, typically occurring on the order of 1-2 years, which supports a long-acting PrEP implant. PCL with two different MWs were used: Sigma-PCL ($M_n$ of 103 kDa) and PC-12 PCL ($M_n$ of 51 kDa). PCL tubes of different wall thicknesses (70, 100, 200 µm) were extruded with either Sigma-PCL or PC-12 and subsequently filled with a formulation of 2:1 TAF:castor oil.

Figure 24:
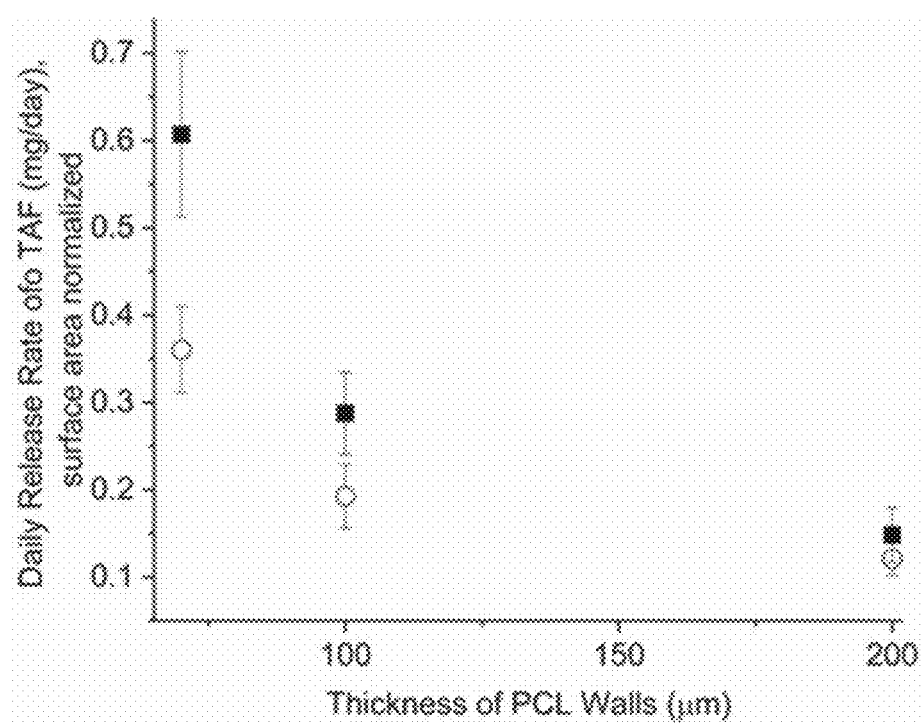
FIG. 24 is a line chart showing the daily release rate of TAF (mg/day) versus wall thickness (μm).

FIG. 24 is a graph showing the daily release rate of TAF (mg/day) versus wall thickness (µm). Daily release rates were calculated from release over 35 days and samples were performed in triplicate. As can be seen in FIG. 24, the release rates of drug from the implant depended on the type of PCL. In particular, TAF released at a higher rate from implants comprising Sigma-PCL as compared to implants comprising PC-12. However, the influence of PCL type on TAF release rates was minimal in tubes with thicker walls (e.g., 200 µm) versus thinner walls (e.g., 70 µm). As shown, TAF dosage was tuned between 0.78±0.03 mg/day (45 µm wall thickness) and 0.13±0.01 mg/day (200 µm wall thickness). FIG. 24 also shows that irrespective of the PCL type used to fabricate the implant, the release rates of TAF scaled inversely with wall thickness.

Figure 25A:
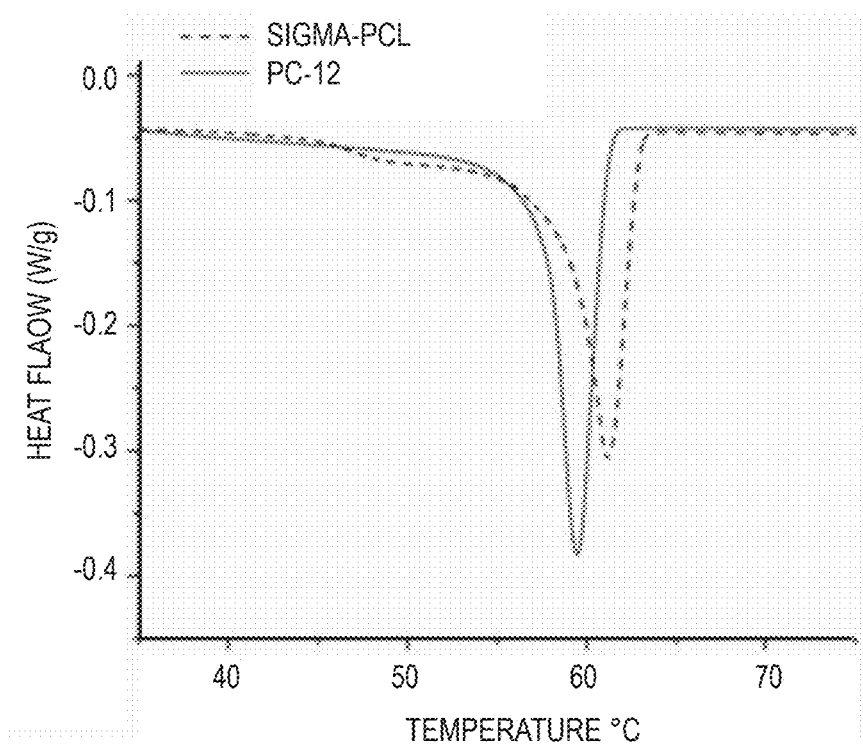
FIG. 25A is a DSC scan for PC-12 and Sigma-PCL membranes.

To further understand the effect of polymer properties on release rates of drug, extruded tubes comprising PC-12 or Sigma-PCL were evaluated with DSC and XRD. Analysis by DSC showed that all PCL tubes exhibit a melting endotherm with a peak near 60° C. (FIG. 25A), the characteristic melting temperature ($T_m$) of PCL. However, notable differences in the melting endotherms were also evident, such as a narrower melt transition of PC-12 compared to Sigma-PCL and the presence of a small shoulder peak around 50° C. in Sigma-PCL which was absent in PC-12. Quantitatively, the specific $T_m$ values also differed; Sigma-PCL showed a slightly higher $T_m$ compared to PC-12 for all thicknesses of the tube walls (Table 10). For each sample, Equation 1 was used to calculate the mass % crystallinity and Equation 2 (Thompson-Gibbs equation) was used to calculate the crystallite sizes.

Results in Table 10 show that irrespective of the wall thickness, the crystallite size of PC-12 was slightly lower than the crystallite size of Sigma-PCL. Moreover, the crystallite size of Sigma-PCL slightly varied with different tube thicknesses, whereas PC-12 remained consistent for all tubes. The % crystallinity was slightly higher in certain cases for PC-12 compared to Sigma-PCL, showing statistically significant differences for extruded tubes with 70 and 200 µm wall thicknesses.

TABLE 10

Thermal properties of PCL extruded tubes from DSC analysis.

| PCL Type | Wall Thickness (µm) | Tm (° C.) | % Crystallinity | Crystallite Size (nm) |
|---|---|---|---|---|
| PC-12 | 70 | 59.4 ± 0.1 | 56 ± 1.0 | 27 ± 0.2 |
|  | 100 | 59.4 ± 0.1 | 53 ± 2.0 | 27 ± 0.4 |
|  | 200 | 59.7 ± 0.4 | 56 ± 1.0 | 27 ± 1.0 |
| Sigma-PCL | 70 | 60.7 ± 0.1 | 53 ± 0.3 | 31 ± 0.2 |
|  | 100 | 61.1 ± 0.2 | 52 ± 1.2 | 32 ± 0.6 |
|  | 200 | 61.3 ± 0.1 | 53 ± 0.1 | 33 ± 0.3 |

Figure 25B:
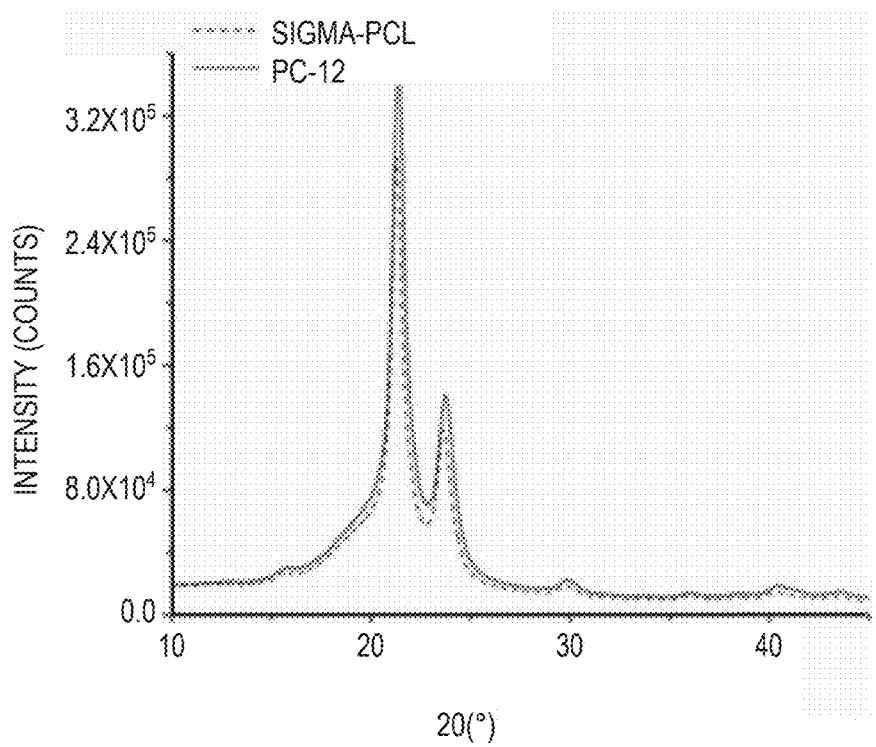
FIG. 25B is an XRD pattern for PC-12 and Sigma-PCL membranes.

XRD analysis was also performed to further examine the crystallite size of PCL extruded tubes using the Scherrer equation (Equation 3). Extruded tubes (100 µm wall thickness) fabricated from Sigma-PCL and PC-12 showed similar diffraction patterns that include intense Bragg peaks at 2θ near 21.3° and 23.7°, correlating to diffraction of the (110) and (200) planes of the PCL crystallite, respectively (FIG. 25B).

Results from XRD analysis (Table 11) show that the crystallite sizes of PC-12 were slightly smaller than Sigma-PCL, where Sigma-PCL total crystallite sizes was 25 nm (14.2+10.8) and PCL-12 was 23.4 nm (13.2+10.2), which also agrees with DSC data. Both techniques used to measure crystallite size indicate a similar order of magnitude from the two PCL types, therefore it is unlikely that crystal size alone was responsible for the differences in drug diffusion kinetics from the materials considered in this study, however the observation that crystallite size increased with tube thickness for Sigma-PCL (as measured by DSC) may play a role in release kinetics.

TABLE 11

Thermal properties of PCL tubes* from XRD analysis.

| | Crystallite Size (nm) | |
|---|---|---|
| PCL Type | $L_{110}$ | $L_{200}$ |
| PC-12 | 13.2 | 10.2 |
| Sigma-PCL | 14.2 | 10.8 |

*Extruded tubes comprised 100 µm wall thickness

These data indicate that PCL is an ideal polymer suited for membrane-controlled drug diffusion applications given its material properties and semi-crystalline nature. For example, PCL has a $T_g$ of −60° C. which allows for drug transport at physiological conditions (37° C.) where the amorphous regions exhibit adequate free volume for passive diffusion of small molecules and fluid driven by concentration gradients. Concurrently, PCL crystals impart structural integrity to the implant and act as a transport barrier which modulate drug diffusion and allow for sustained release of TAF. The DSC and XRD results presented here suggest that crystallite size, quantity of crystallinity, and ultimately polymer free volume within PCL will impact transport properties of TAF through the polymer.

The results show that extruded tubes with lower MW (PC-12) contain smaller sizes of crystals and slightly higher % crystallinity (statistically significant for 70 and 200 µm tubes), p=0.008 and p=0.007, respectively as compared to PCL with higher MW (Sigma-PCL). This suggests that higher degree of crystallinity and smaller crystallites could create a more tortuous path for diffusion of the drug, leading to a lower release rate from the implant. At 37° C., TAF likely diffuses through the amorphous regions of PCL, where the polymer exhibits greater segmental mobility to facilitate passage of small molecules. The size and quantity of the crystal regions would affect the spatial arrangement and quantity of these amorphous regions, ultimately affecting transport kinetics. These findings are supported by the mathematical relationship between membrane flux through a given area which is inversely proportional to distance traveled (wall thickness) by the constant of mass diffusivity, i.e. Fick's first law of diffusion. The diffusion constant is a function of temperature, molecular size, and viscosity. For polymers, the viscosity term describes polymer free volume, which is impacted by crystallinity, hence the differences in material properties and resultant release rates were observed here.

13.6.3 Performance and Fabrication of a Long-Acting PCL Implant for Delivery of TAF Two parameters are important in the duration of a reservoir-style implant for TAF: the drug quantity within the reservoir and the rate of drug release from the implant. Testing was performed using selected implant dimensions (2.5 mm OD, 40 mm length), TAF payload within the reservoir for the 2:1 TAF:castor oil formulation of approximately 115 mg, and an implant wall thicknesses of 100 µm. Within these constraints of drug payload, the duration of a single TAF implant for PrEP depends on the daily drug release required for protection as administered via the subcutaneous route. In this testing, in-vitro release rates from exemplary implants were tailored to the range between approximately 0.2 and 0.8 mg/day from a single device.

Figure 26:
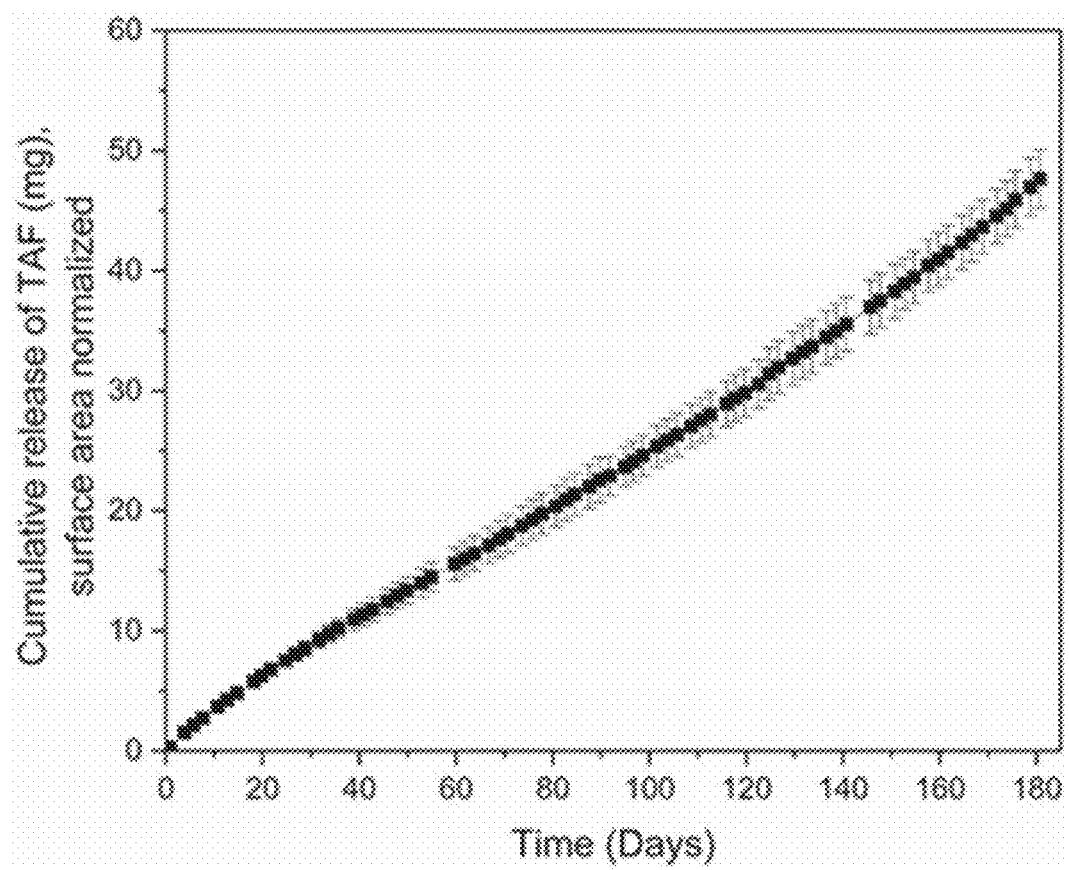
FIG. 26 is a line chart showing cumulative release of TAF (mg) over time in days for 6 months.

Using the dimensional parameters, TAF implants were fabricated from extruded PCL tubes for a 6-month in-vitro study to assess the release of TAF. FIG. 26 is a graph showing cumulative release of TAF (mg) over time in days for 6 months. The implants released TAF at a rate of 0.25±0.03 mg/day over the course of 180 days. After 180 days, approximately 68 mg of TAF remained within the implant, with a chromatographic purity of 89.2±0.8%. Without being bound by theory, it is believed that the trend of decreased TAF stability over time results from ingress of water into the implant as drug depletes, which, in turn, facilitates hydrolytic degradation of TAF. The implant maintained structural integrity throughout the 180-day release period in simulated physiological conditions.

Gamma-irradiation was used to sterilize the implant after fabrication. Studies were performed to evaluate its potential effects on the implant performance. The MW of PCL, including samples of PCL raw material used for the extrusion process and extruded PCL tubes before and after gamma-irradiation, was measured. Both PCL types (Sigma-PCL and PC-12) showed a slight decrease in MW after gamma-irradiation, but the extrusion process minimally affected the MW of PCL.

In vitro release assays were performed on implants with and without gamma-irradiation at dosages between 18-24 kGy. As shown in Table 12, the release rates were comparable irrespective of treatment with gamma-irradiation and the values were not statistically significant when comparing non-irradiated and gamma-irradiated release rates ($p=0.15$ and $p=0.30$ for Sigma-PCL and PC-12, respectively).

TABLE 12

Daily TAF release rates from implants pre-and post-gamma irradiation

| PCL Type | Wall Thickness (µm) | Release Rates of TAF (mg/day) | |
|---|---|---|---|
| | | Non-Irradiated | Gamma-Irradiated |
| Sigma-PCL | 70 | 0.62 ± 0.09 | 0.54 ± 0.06 |
| | 100 | 0.29 ± 0.05 | 0.32 ± 0.03 |
| PC-12 | 70 | 0.37 ± 0.05 | 0.30 ± 0.03 |
| | 100 | 0.20 ± 0.03 | 0.20 ± 0.02 |

Example 14. In-Vitro Studies with ENG

Example 14.1. The in-vitro release of ENG formulated in implants was evaluated. PCL tubes with wall thicknesses of 70 µm and PCL of 89 kDa MW were used. The implant dimensions measured 10 mm in length by 2.5 mm outer diameter. The implants contained ENG formulated with ethyl oleate, castor oil, or sesame oil in a mass ratio of 1:4.

Figure 27:
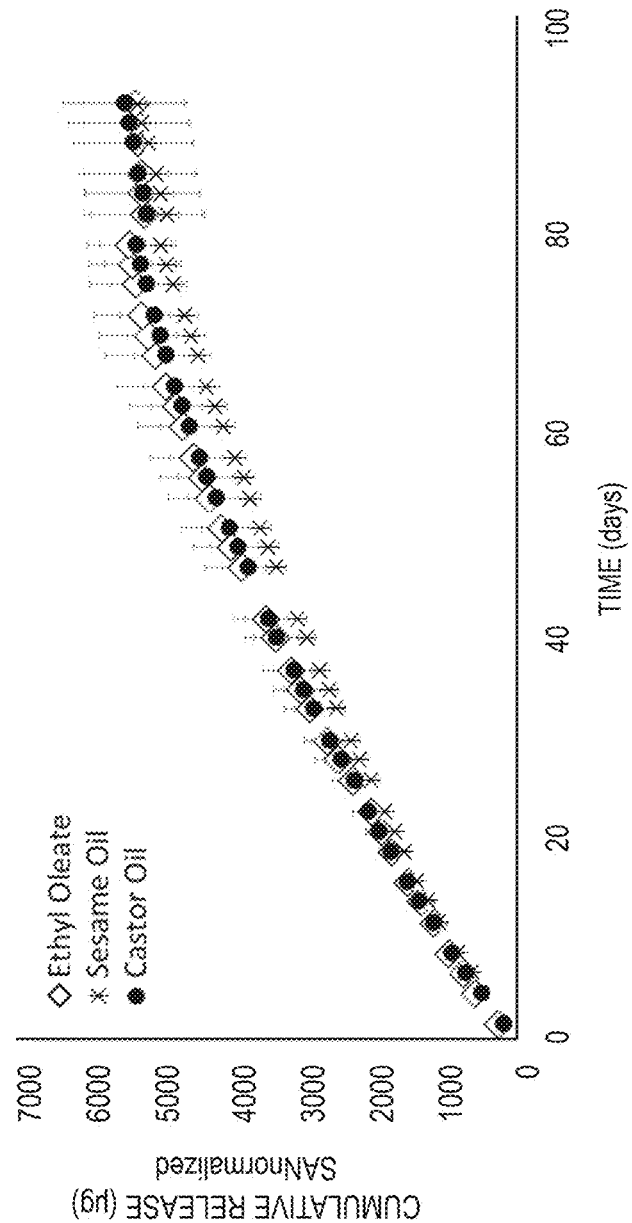
FIG. 27 is a line chart showing the cumulative release profiles of the ENG formulations over time in days.

FIG. 27 is a line chart showing the cumulative release profiles of the ENG formulations over time in days. Formulations with drug excipient ratio of 1:4 were used. Drug excipient ratio can be adjusted to maximize the drug load and increase the implant duration. The purity of these ENG formulations was assessed at defined timepoints during the study. Table 13 shows that ethyl oleate in combination with ENG is not stable. Sesame oil performed well in the chromatographic purity assessment of the ENG formulations.

TABLE 13

The average release rate and chromatographic purity of ENG formulation with various excipients

| Implant | % Chrom purity at 75 days | % Chrom purity--90 days | % Chrom purity--105 days | Average release rate (ug/day) |
|---|---|---|---|---|
| ENG: ethyl oleate (1:4) | 2.3 ± 0.1 | 69.2 ± 0.1 | 0.2 ± 0.0 | 76.9 |
| ENG: sesame oil (1:4) | 99.2 ± 0.2 | 99.2 ± 0.0 | 99.5 ± 0.0 | 67.9 |
| ENG: castor oil (1:4) | 99.8 ± 0.0 | 99.6 ± 0.1 | 97.8 ± 0.0 | 74.7 |

Example 15. In-Vitro Study for Segmented Devices with TAF and Either ENG or LNG The in-vitro release of TAF formulated with sesame oil and castor oil and either LNG or ENG formulated with sesame oil in segmented implants was evaluated. In the segmented device, the TAF formulations and the LNG or ENG formulations were in two separate compartments in PCL tubes. The implants were extruded from PCL of 89 kDa MW with different configurations for each API. Table 14 shows the testing parameters.

TABLE 14

Testing Parameters

| API combination for segmented implant | API | Excipient | API: excipient ratio | Length of device (mm) | PCL wall thickness (µm) |
|---|---|---|---|---|---|
| LNG, TAF base | LNG | Sesame oil | 2:1 | 20 | 70 |
| | TAF base | Sesame oil | 2:1 | 30 | 70 |
| LNG, TAF base | LNG | Sesame oil | 2:1 | 20 | 70 |
| | TAF base | Castor oil | 2:1 | 30 | 70 |
| ENG, TAF base | ENG | Sesame oil | 2:1 | 10 | 200 |
| | TAF base | Sesame oil | 2:1 | 40 | 70 |
| ENG, TAF base | ENG | Sesame oil | 2:1 | 10 | 200 |
| | TAF base | Castor oil | 2:1 | 40 | 70 |

Figure 28A:
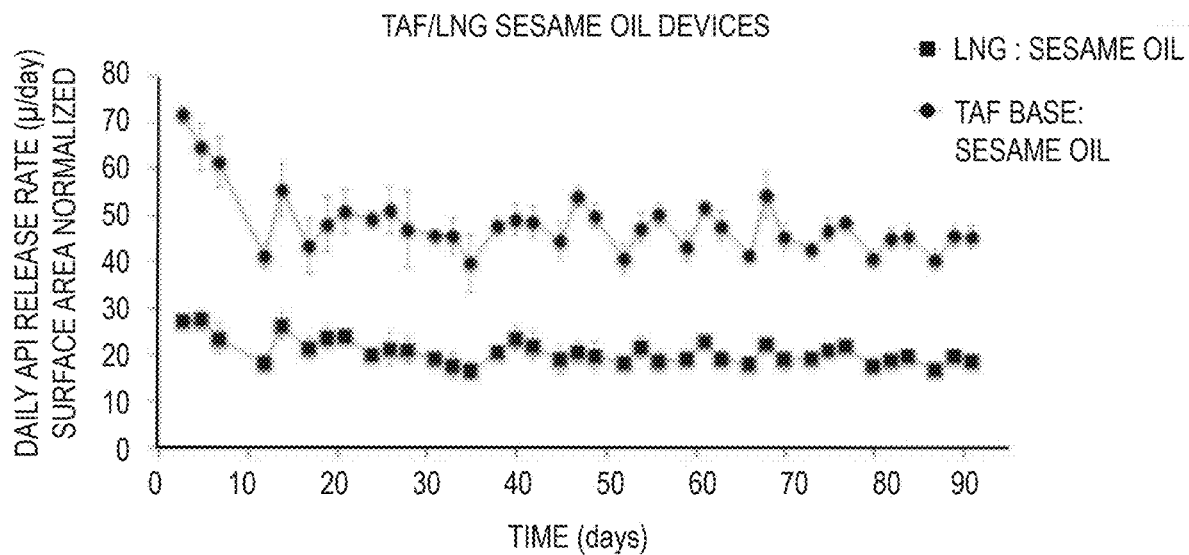
FIGS. 28A-28D are line charts showing the daily release profiles for each API combination over a time period of either 50 days or 90 days.
Figure 28B:
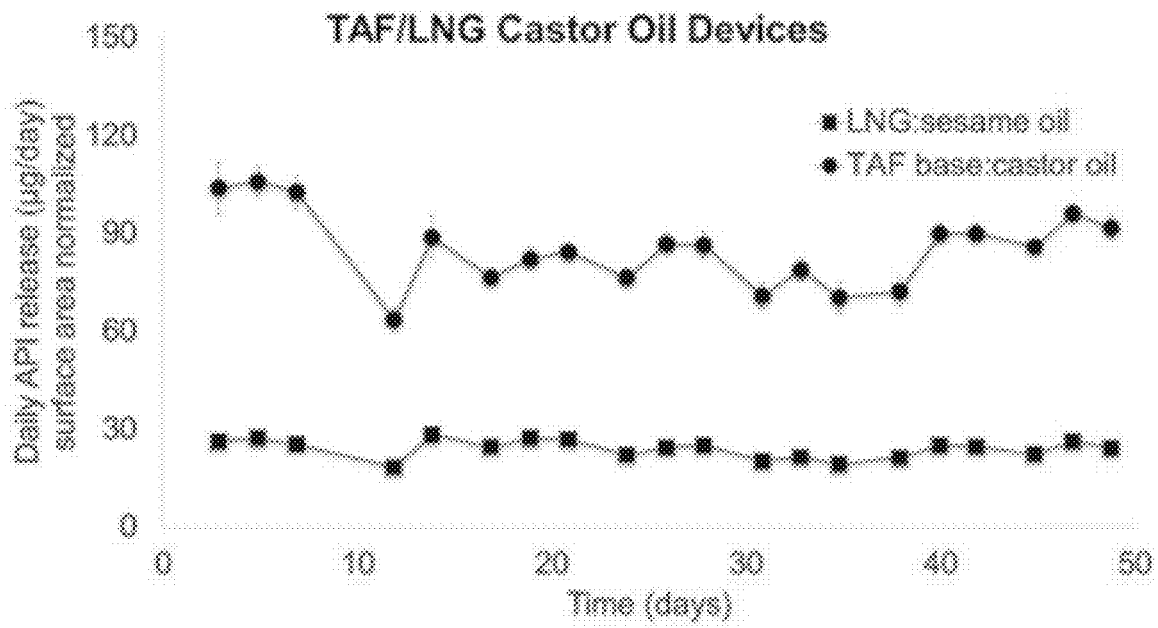
Figure 28C:
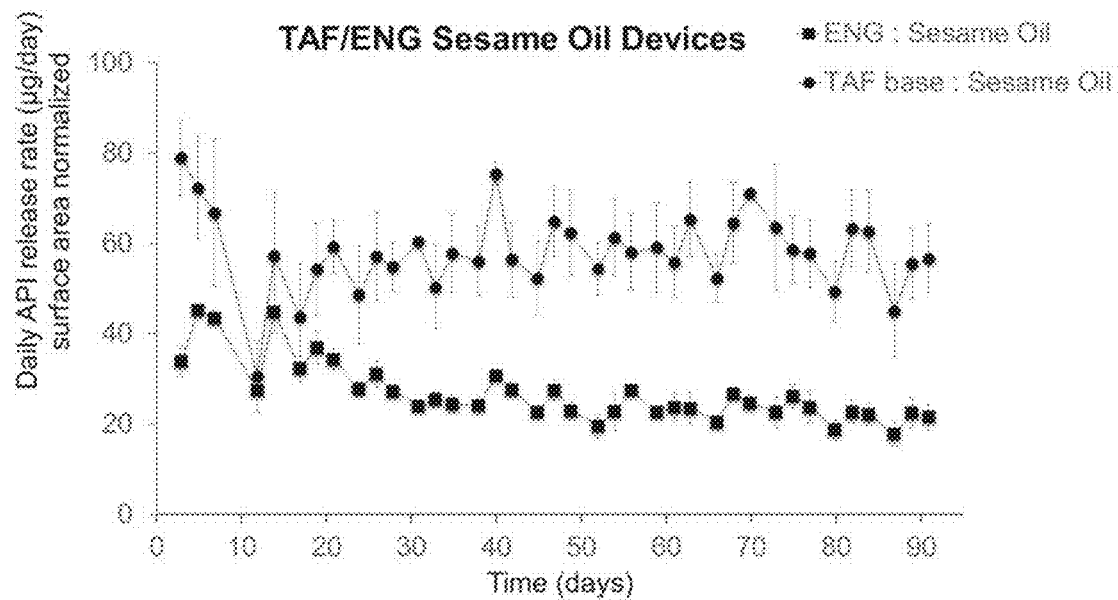
Figure 28D:
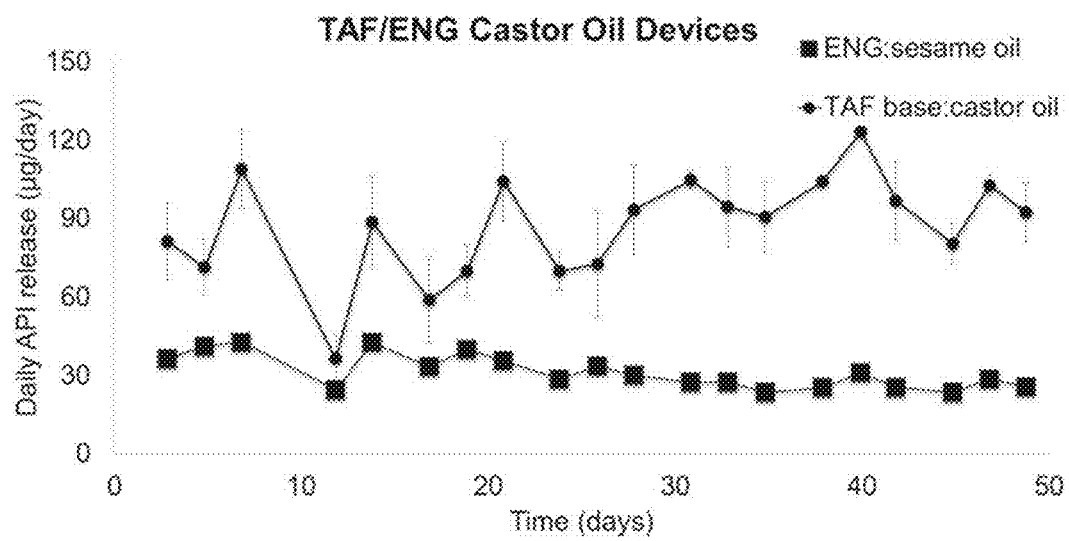
Figure 28E:
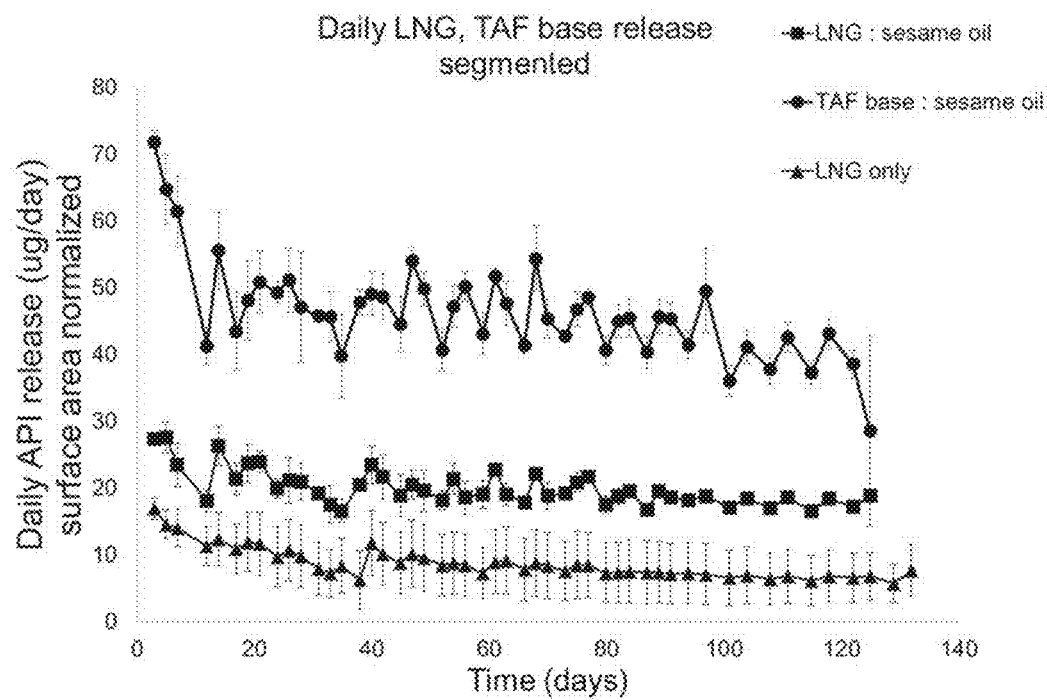
FIGS. 28E, 28F, 28G, and 28H are line charts showing the release rates for a time period of over 100 days.
Figure 28F:
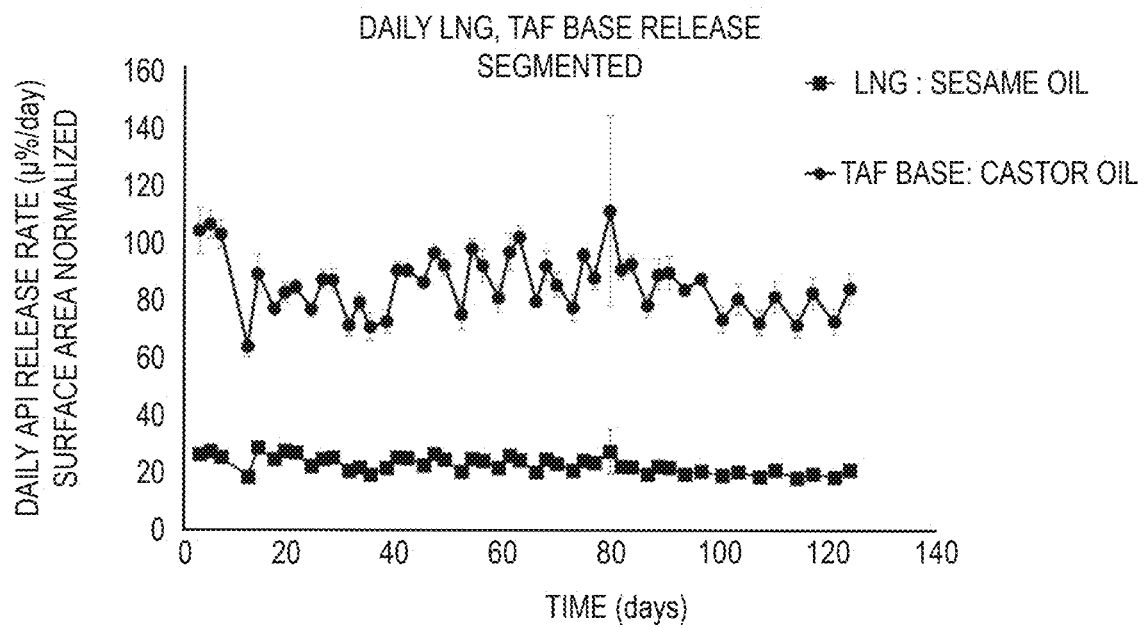
Figure 28G:
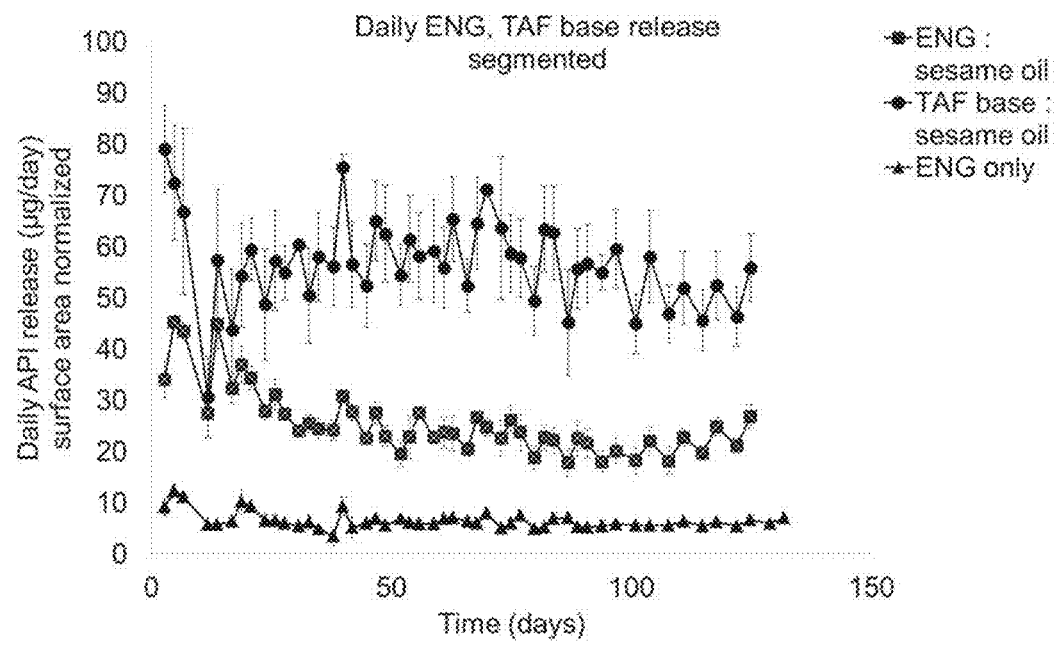
Figure 28H:
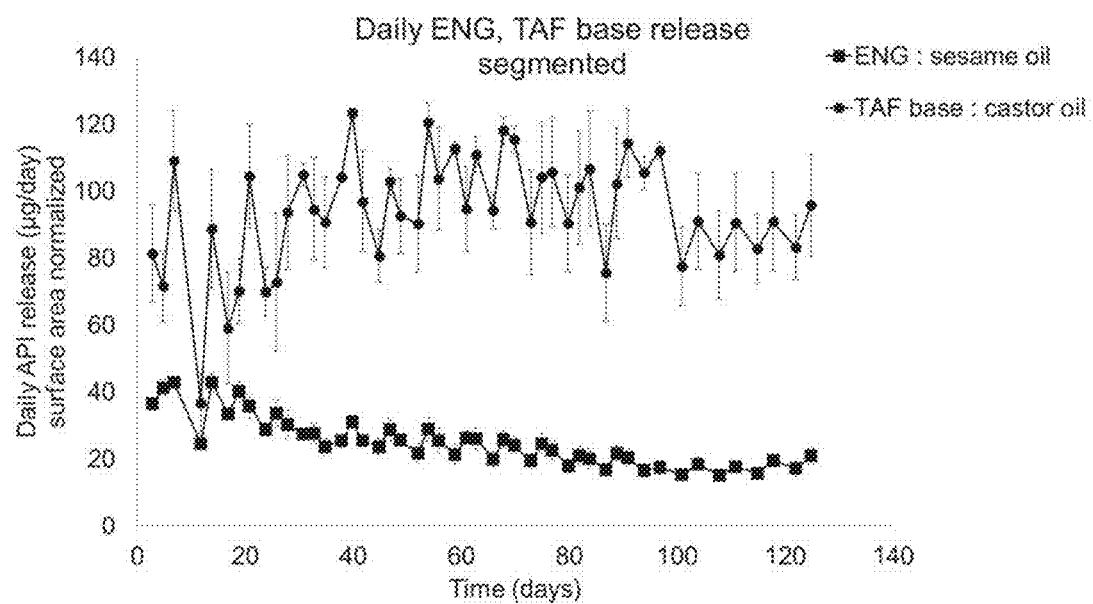

FIGS. 28A-28D are line charts showing the daily release profiles for each API combination over a time period of either 50 days or 90 days. FIGS. 28A and 28B are for TAF and LNG. FIGS. 28C and 28D are for TAF and ENG. The release of LNG, ENG and TAF from segmented implants occurred at zero-order release rates over 50 days.

The same devices were tested for over 100 days. FIGS. 28E, 28F, 28G, and 28H are line charts showing the release rates for a time period of over 100 days. Table 15 provides a summary of the results.

TABLE 15

Summary of Results

| API combination | API | Excipient | Daily RR (µg/day) |
|---|---|---|---|
| LNG, TAF base | LNG | Sesame oil | 20.4 ± 2.7 |
|  | TAF base | Sesame oil | 47.7 ± 6.7 |
|  | LNG | Sesame oil | 23.0 ± 2.7 |
|  | TAF base | Castor oil | 86.4 ± 10.3 |
| ENG, TAF base | ENG | Sesame oil | 26.3 ± 6.7 |
|  | TAF base | Sesame oil | 57.9 ± 8.6 |
|  | ENG | Sesame oil | 26.2 ± 7.1 |
|  | TAF base | Castor oil | 94.8 ± 17.6 |

Example 16. Effect of Polymer Type on Release Rate of TAF

Figure 29:
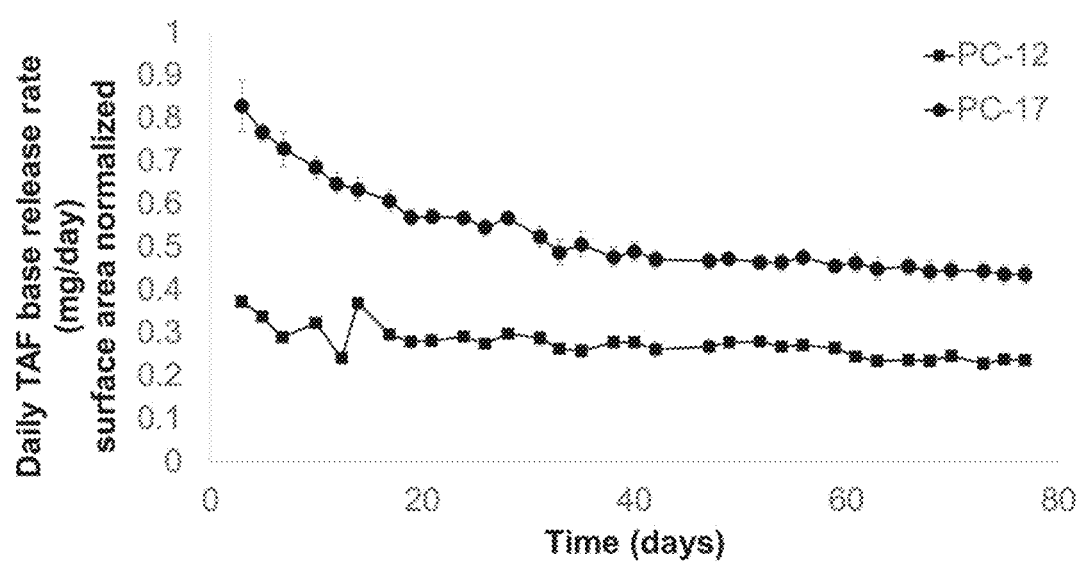
FIG. 29 is a line chart showing the daily release profiles of implants fabricated with PC12 or PC17.
Figure 30:
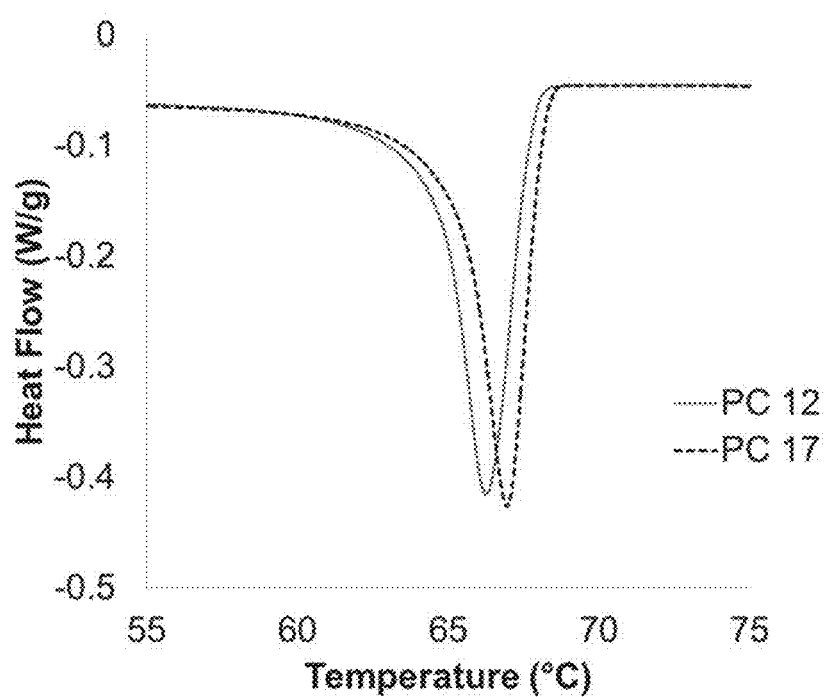
FIG. 30 is a DSC scan for PC12 and PC 17.

The effect of polymer properties on the release of active agent was investigated. Devices comprising PC12 or PC17 at the same wall thickness were evaluated using an in-vitro release assay. This study used 70 µm PCL extruded tubes encapsulating a formulation of 2:1 TAF:castor oil. FIG. 29 shows the daily release profiles of implants fabricated with PC12 or PC17. TAF releases at a higher rate from implants comprising PC17 as compared to implants comprising PC12. The difference may be attributed to the differences in crystallinity between the two types of PCL starting materials. These polymers, therefore, were further characterized using differential scanning calorimetry (DSC). FIG. 30 is a DSC scan for PC12 and PC 17. Analysis by DSC showed that both PCL tubes exhibited a melting endotherm with a peak near 60° C., the characteristic melting temperature (Tm) of PCL. However, PC17 showed a slightly higher $T_m$ (66.9° C.) compared to PC12 (66.2° C.) (FIG. 30). The mass % crystallinity was calculated using reported heat of fusion (33.3 cal/g) of 100% crystalline PCL. The % crystallinity for PC12 (56.1±1.4) was significantly higher compared to PC17 (48.7±0.2) at 70 µm wall thickness. As PCL crystals act as a transport barrier that modulates passive diffusion of drug molecules, it is expected that PCL material with a higher degree of crystallinity exhibited a lower release rate. Thus, the MW and % crystallinity of selected polymer affects the release rate of active agent and biodegradation timeframe of the implant.

Example 17. Evaluating Polymer Blends

Extruded tubes comprising melt blend products of two medical grade PCL were fabricated: PC12 was blended with PC17 in three different ratios of 25, 50, and 75 wt. % The % crystallinity of these extruded tubes at 100 µm wall thickness was determined using DSC. As shown in Table 16, the crystallinity increases with increasing weight percentage of PC12 in the blends. The results show that the physical and chemical property of extruded tubes can be further tailored by adjusting the composition of the PCL material.

TABLE 16

Crystallinity of Extruded Tubes of PCL homopolymer and blends

| Formulation | PC-12 | PC-17 | Crystallinity (%) | MW before gamma (kDa) | MW after gamma (kDa) |
|---|---|---|---|---|---|
| 1 | 100% | 0% | 53.0 ± 2.0 | TBD | TBD |
| 2 | 75% | 25% | 52.4 ± 0.1 | 82.9 | 72.5 |
| 3 | 50% | 50% | 50.3 ± 1.3 | 94.0 | 78.1 |
| 4 | 25% | 75% | 46.5 ± 1.5 | 94.6 | 85.8 |
| 5 | 0% | 100% | 45.1 ± 0.9 | TBD | 94.3 |

Example 18. Evaluation of PCL Blend Release Rate for TAF

Figure 31A:
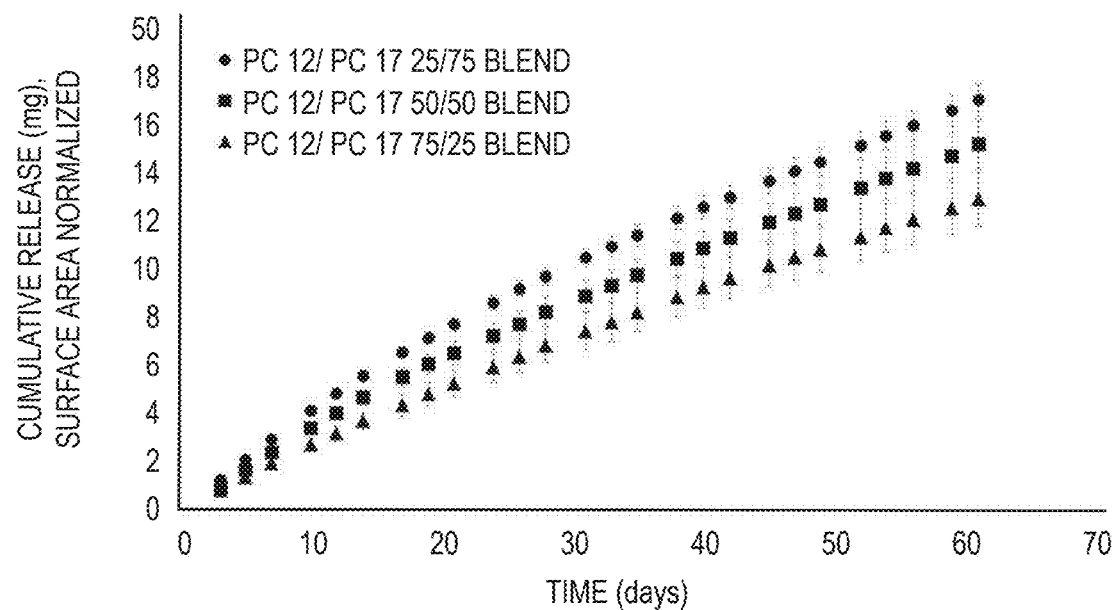
FIG. 31A is a line chart showing cumulative release rate over 60 days.
Figure 31B:
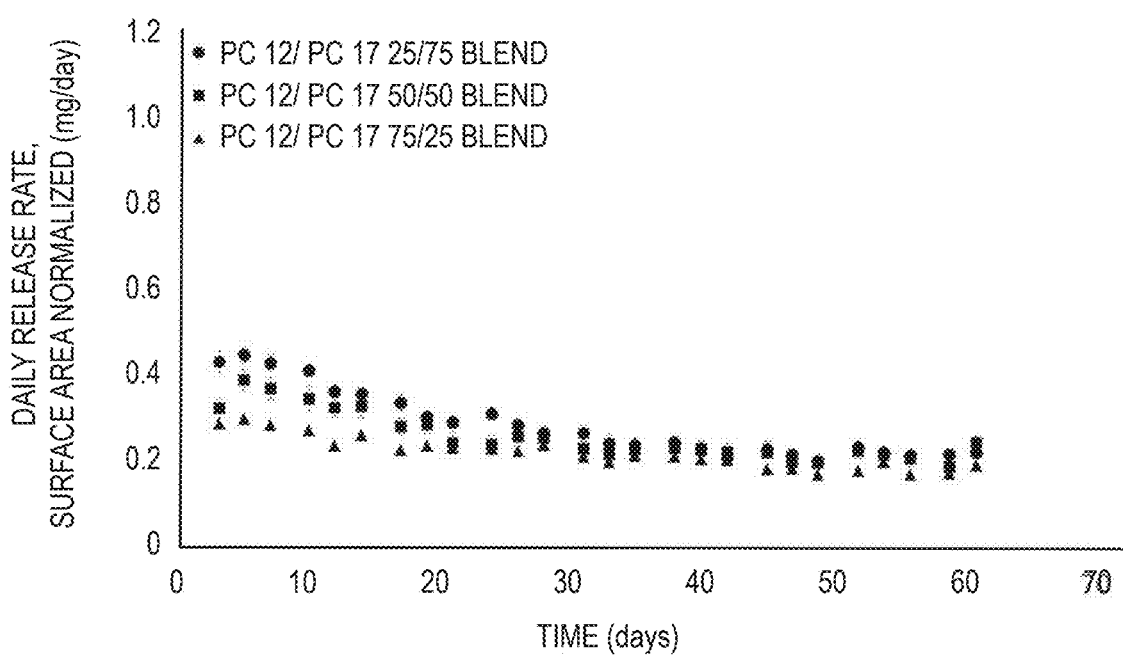
FIG. 31B is a line chart showing daily release rate for the same time period.

Testing was performed to evaluate the effect of PCL blends shown in Example 17 on the release rate of active agent. The exemplary active agent formulation used for the analysis was a 2:1 TAF base to sesame oil excipient. The wall thickness of the devices was 100 µm. FIGS. 31A and 31B are line charts showing the results of the study. FIG. 31A shows cumulative release rate over 60 days. FIG. 31B shows daily release rate for the same time period.

In the testing, the molecular weight increased with increasing weight percentage of PC17 within the blends. The release rate of TAF increased with increasing weight percentage of PC17 within the blends.

Example 19. Evaluating Release Kinetics Using PC17

Testing was performed to evaluate the release kinetics of TAF freebase, LNG and ENG formulations within medical grade PC17 extruded polymer devices (EXPDs) at different wall thicknesses. The testing parameters are shown in Table 17.

TABLE 17

Testing Parameters

| API | Excipient | API:Excipient Ratio | Polymer Thickness (µm) | Length of device (mm) | N |
|---|---|---|---|---|---|
| TAF | Sesame Oil | 2:1 | 200 | 40 | 3 |
|  | Castor Oil | 2:1 | 100 |  | 3 |
|  |  |  | 200 |  | 3 |
| LNG | Sesame Oil | 2:1 | 100 | 10 | 3 |
|  |  |  | 200 |  | 3 |
|  |  | 4:1 | 100 | 10 | 3 |
| ENG | Sesame Oil | 2:1 | 100 | 10 | 3 |
|  |  |  | 200 |  | 3 |
|  |  | 4:1 | 100 | 10 | 3 |

Figure 32A:
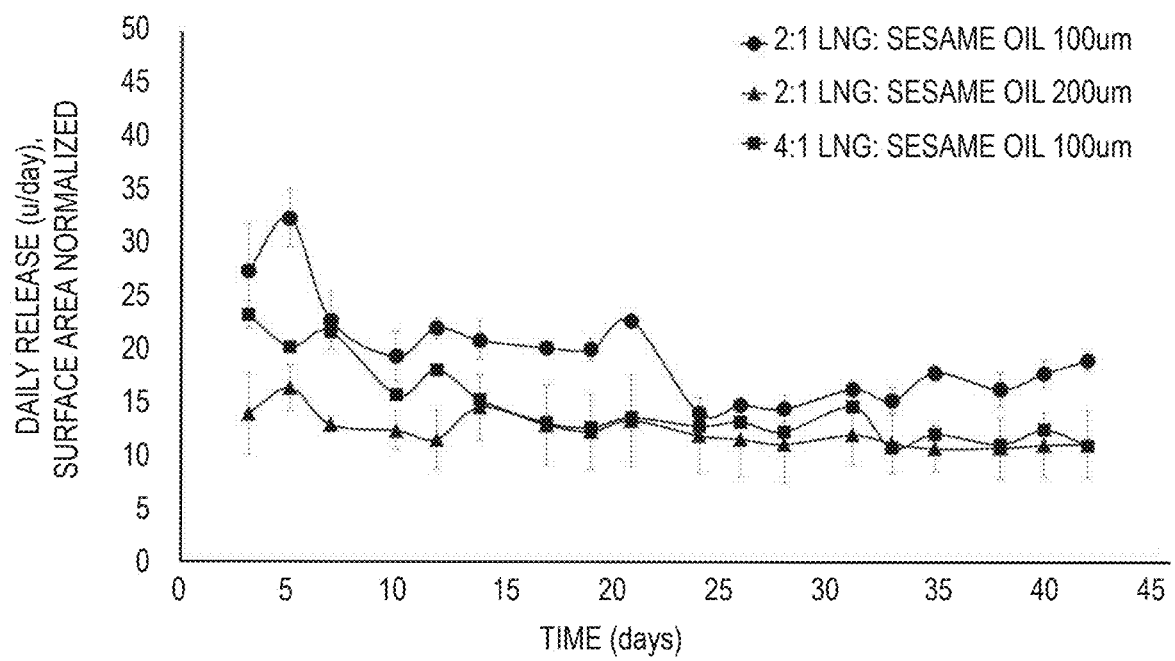
FIG. 32A is a line chart showing the daily release rate of exemplary LNG: Sesame oil samples.
Figure 32B:
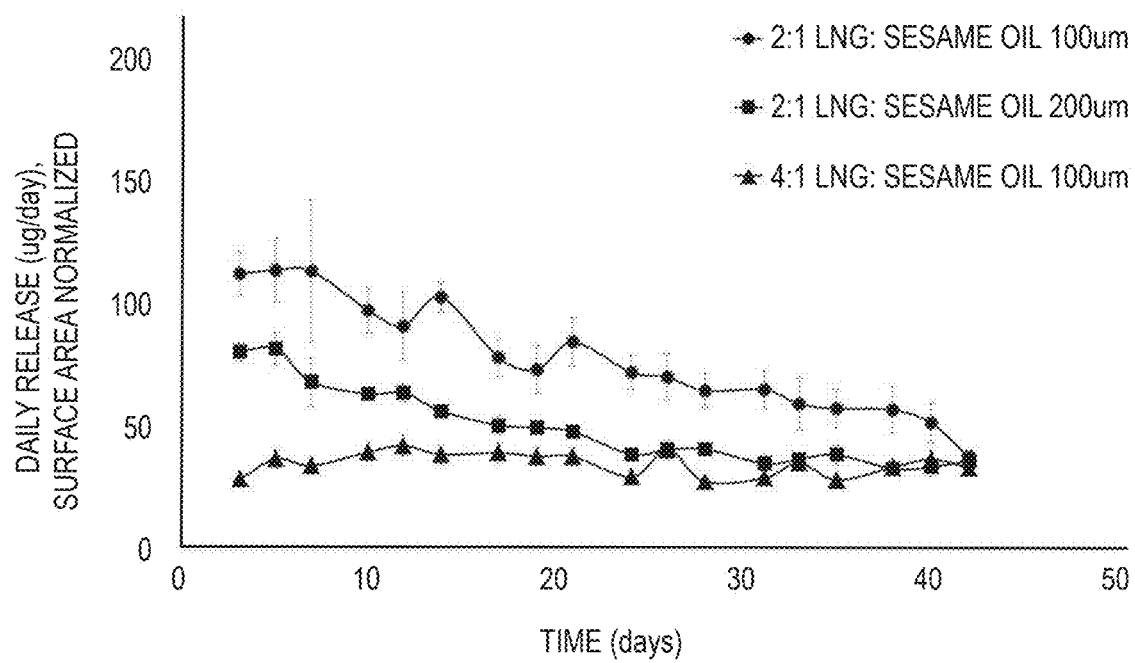
FIG. 32B is a line chart showing the daily release rate of exemplary ENG: Sesame oil samples.
Figure 32C:
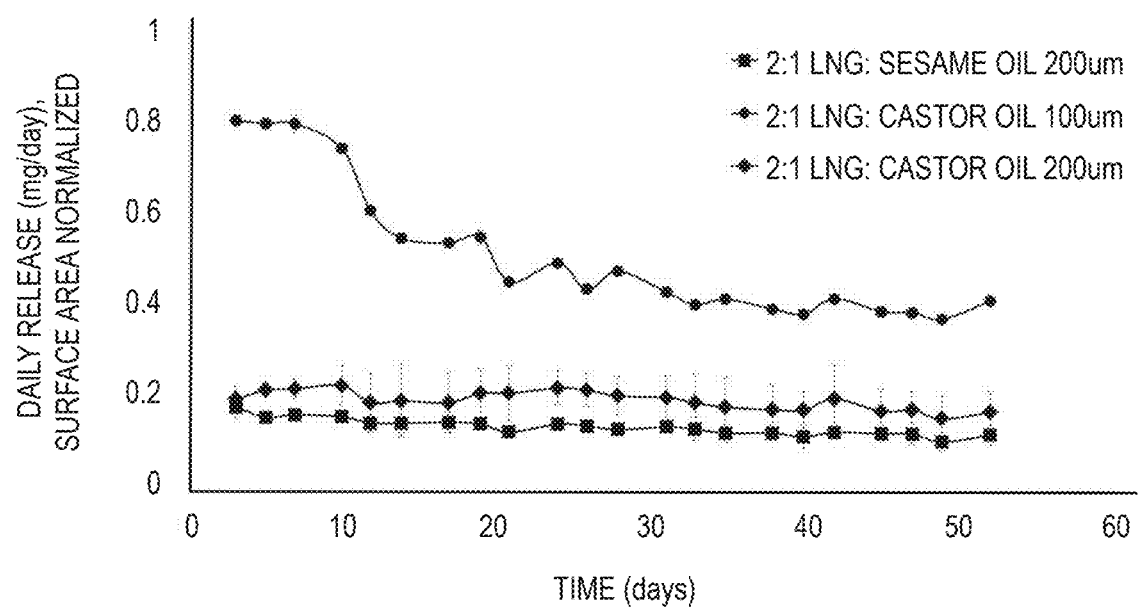
FIG. 32C is a line chart showing the daily release rate of exemplary TAF:sesame oil and castor oil samples.

FIG. 32A is a line chart showing the daily release rate of exemplary LNG: Sesame oil samples. FIG. 32B is a line chart showing the daily release rate of exemplary ENG: Sesame oil samples. FIG. 32C is a line chart showing the daily release rate of exemplary TAF:sesame oil and castor oil samples. Table 18 provides the average daily release for both LNG and ENG samples. Table 19 provides the average daily release rates for TAF samples.

TABLE 18

Average daily release for LNG and ENG samples

| Devices | Release rate (ug/day) |
|---|---|
| 2:1 LNG: Sesame Oil 100 µm | 22.62 ± 4.0 |
| 2:1 LNG: Sesame Oil 200 µm | 12.85 ± 1.4 |
| 4:1 LNG: Sesame Oil 100 µm | 16.59 ± 3.7 |

TABLE 18-continued

Average daily release for LNG and ENG samples

| Devices | Release rate (ug/day) |
| --- | --- |
| 2:1 ENG: Sesame Oil 100 μm | 97.41 ± 14.8 |
| 2:1 ENG: Sesame Oil 200 μm | 63.24 ± 12.1 |
| 4:1 ENG: Sesame Oil 100 μm | 37.74 ± 3.7 |

TABLE 19

Average daily release rates for TAF samples

| Devices | Release rate (mg/day) |
| --- | --- |
| 2:1 TAF: Sesame Oil 200 μm | 0.15 ± 0.01 |
| 2:1 TAF: Castor Oil 100 μm | 0.61 ± 0.13 |
| 2:1 TAF: Castor Oil 200 μm | 0.21 ± 0.01 |

Example 20. In Vivo Study Comparing Implantation of One Device to Two Devices

In vivo analysis was performed with 20 naïve New Zealand white rabbits. The animals with two implants had an exemplary ARV active agent and an exemplary hormone active agent. In particular, female NZW rabbits each received two subcutaneous implants bilaterally inserted into the subscapular region: (1) one implant that contained an ARV drug and (2) one implant that contained a hormonal contraceptive drug. Both implants remained in the subcutaneous space for 90 days. Blood samples were taken at 0, 1, 3, 7, 1, 30, 45, 60, 75, and 90 days. After 90 days, the animals were euthanized, and the implants were retrieved. Tissues were collected and analyzed for levels of ARVs (TFV, TAF, and TFV-DP). As a comparator for the dual insertion modality, each female NZW rabbit in a separate group received a single implant, where each implant contained a single drug formulation: either ARV or hormone. The implant remained in the subcutaneous space for 90 days. Blood samples were taken at 0, 1, 3, 7, 15, 30, 45, 60, 75, and 90 days. After 90 days, the animals were euthanized, and the implants were retrieved. Tissues were collected and analyzed for levels of ARVs (TFV, TAF, and TFV-DP). The study design is shown in Table 20 below. The polymer was PC12.

TABLE 20

Study Design

| | | | | |
| --- | --- | --- | --- | --- |
| Animals with 2 Implants | LNG + TAF/Castor Oil (n = 2 rabbits) | LNG + TAF/Sesame Oil (n = 2 rabbits) | ENG + TAF/Castor Oil (n = 2 rabbits) | ENG + TAF/Sesame Oil (n = 2 rabbits) |
| Animals with 1 Implant | LNG Only (n = 3 rabbits) | ENG Only (n = 3 rabbits) | TAF/Castor Oil (n = 3 rabbits) | TAF/Sesame Oil (n = 3 rabbits) |

| Drug | Excipient | PCL Wall Thickness (μm) | Drug:Excipient Ratio | Implant Length (mm) | Target Release Rate |
| --- | --- | --- | --- | --- | --- |
| LNG | Sesame Oil | 70 | 2:1 | 20 | 30 μg/day |
| ENG | Sesame Oil | 200 | 2:1 | 10 | 30 μg/day |
| TAF HD | Castor Oil | 70 | 3:1 | 40 | 400 μg/day |
| TAF LD | Sesame Oil | 70 | 2:1 | 40 | 200 μg/day |

In the testing, the hormones, including LNG and ENG, were stable in vivo for 90 days: LNG (99.2%±0.1), ENG (99.5%). The implants (e.g., ENG) demonstrated membrane controlled release. Using implants with 200 μm thickness, the implants remained intact and were not physically compromised at 90 days in vivo. Hormone levels that are comparable to currently commercially available non-biodegradable devices were achieved using a polymeric implant that is biodegradable, which is not currently commercially available on the market. For example, plasma concentration of ENG between 0.61±0.34 and 0.34±0.01 ng/mL* were measured. Moreover, plasma concentration of LNG between 0.51±0.1 and 0.33±0.07 ng/mL* were measured. Implants comprising PC-12 with 70 μm walls were mechanically compromised. Implants having walls with 200 μm thickness were not compromised.

Figure 33:
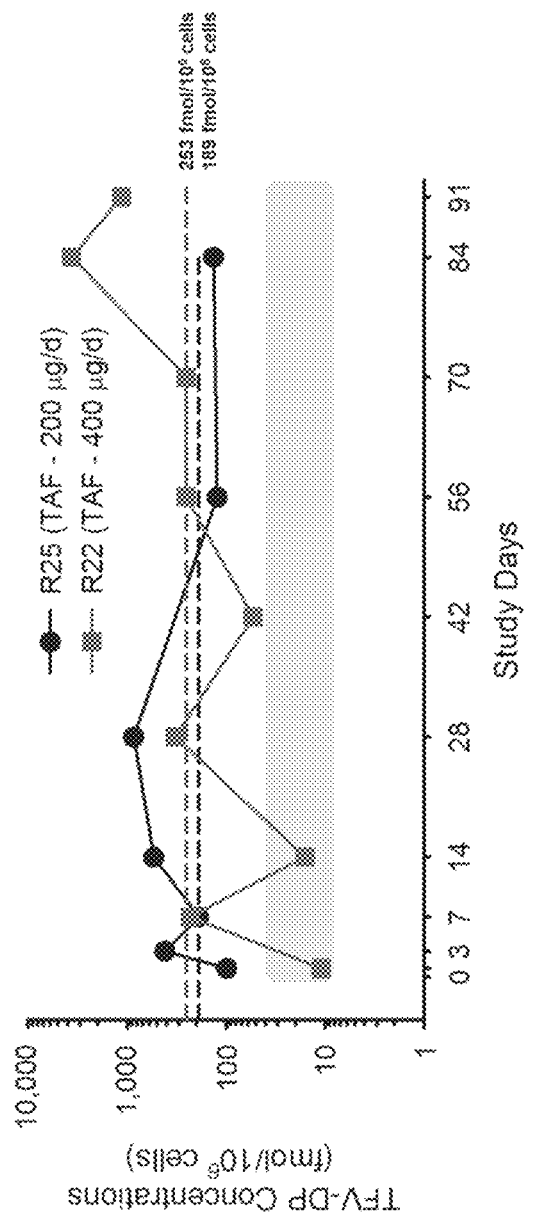
FIG. 33 is a line chart showing tenofovir-diphosphate levels (TFV-DP) in peripheral blood mononuclear cells (PBMCs) over 90 days for the NZW rabbits that received single implants (either TAF-Castor Oil or TAF-Sesame Oil).

FIG. 33 is a line chart showing tenofovir-diphosphate levels (TFV-DP) in peripheral blood mononuclear cells (PBMCs) over 90 days for the NZW rabbits that received single implants (either TAF-Castor Oil or TAF-Sesame Oil). The solid lines (R25 and R22) in FIG. 33 represent one animal from each treatment group that had detectable PMBC TFV-DP concentrations during the duration of the study. Dashed lines indicate the median concentrations of TFV-DP derived from time course of the data points from each animal. The shaded area indicates PBMC TFV-DP concentrations associated with 90% (16 fmol/M) and 99% (33 fmol/M) reduced HIV-1 acquisition. These TAF implants, which comprised PC-12 with 70 μm wall thickness were fragmented at the end of the 90-day study.

Figure 34:
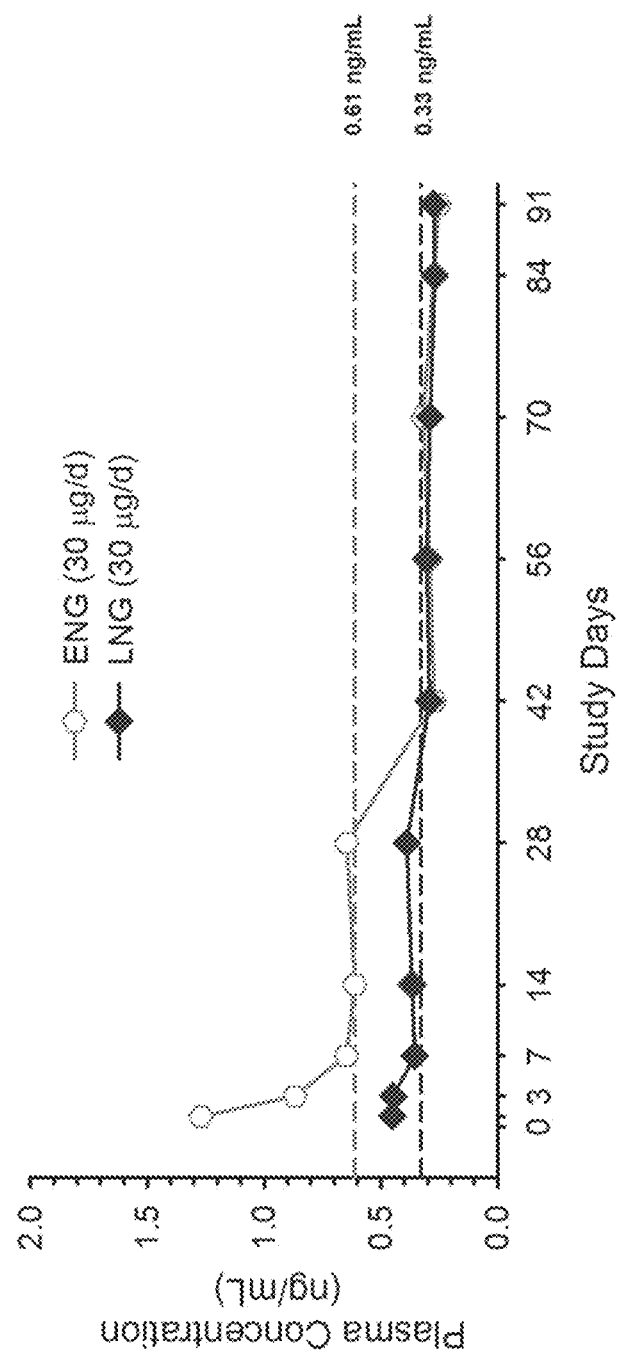
FIG. 34 is a line chart showing the plasma levels of hormones over 90 days for the NZW rabbits that received either a single PC-12 LNG or PC-12 ENG implant.

FIG. 34 is a line chart showing the plasma levels of hormones over 90 days for the NZW rabbits that received either a single PC-12 LNG or PC-12 ENG implant. Dashed lines indicate the median concentrations of hormone derived over the time course of the study. Unlike the LNG implants (70 μm wall thickness), the thicker ENG implants (200 μm wall thickness) remained intact (i.e., not fragmented) at the end of the study.

Example 21. In Vitro Release Study of Naltrexone from Device

Figure 35:
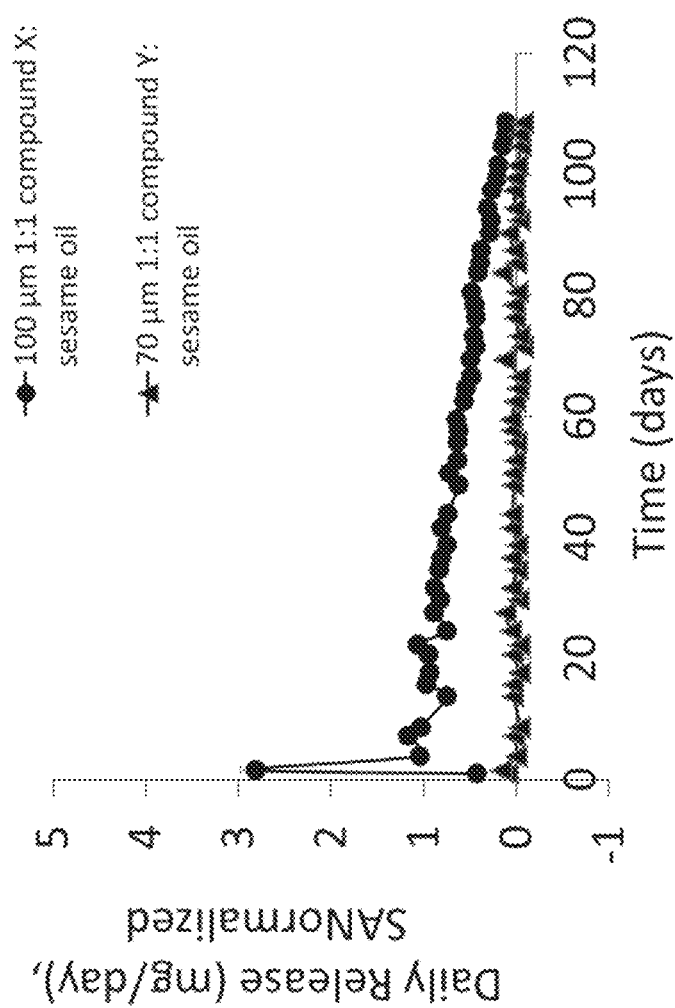
FIG. 35 is a line chart of daily release rates over time for the naltrexone study.

Heat extruded polycaprolactone (PCL) tubes were fabricated (2.5 mm×40 mm) using 80 kDa PCL to produce devices with 70 μm and 100 μm wall thicknesses. Devices were loaded with a paste consisting of the Naltrexone Salt or Naltrexone base using a 1:1 ratio of sesame oil to drug and then enclosed by heat sealing. In vitro release studies involved incubation of devices in 40 mL of phosphate buffered saline (PBS), pH 7.4 in a shaking incubator at 37° C. Implants were transferred to fresh buffer three times per week to maintain sink conditions. The concentration of drugs released in media over time was measured via UV-vis spectroscopy. Solubility, stability, and purity of APIs in excipient were evaluated via HPLC. FIG. 35 is a line chart of daily release rates over time for the naltrexone study.

Example 22. Formulation Screen for Naltrexone

The purity of Naltrexone salt and Naltrexone base were screened using a rapid solubility assay with the candidate APIs and several excipients identified from the FDA's Generally Recognized as Safe (GRAS) list for subcutaneous implantation. Tables 21a and 21b show the results of the excipient screen for naltrexone base and naltrexone salt. Table 21c shows the stability results for Naltrexone base. These results show that Naltrexone base was more soluble in some excipients than others.

TABLE 21a

Results of the excipient screen

| Sample | Assay (mg/mL) | Chromatographic purity (% total area) | Sum of impurities (% total area) |
|---|---|---|---|
| Naltrexone Base | — | 97.50% | 2.50% |
| Castor oil | 9.63 | 95.50% | 4.50% |
| Sesame oil | 4.62 | 96.80% | 3.20% |
| Ethyl oleate | 2.79 | 90.40% | 9.60% |
| PEG600 | 46.2 | 97.90% | 2.10% |

TABLE 21b

Results of the excipient screen

| Sample | Assay (mg/mL) | Chromatographic purity (% total area) | Sum of impurities (% total area) |
|---|---|---|---|
| Naltrexone Salt | — | 95.90% | 4.10% |
| Castor oil | <0.1 mg/mL | N/A | N/A |
| Sesame oil | No measurable solubility | N/A | N/A |
| Ethyl oleate | No measurable solubility | N/A | N/A |
| PEG600 | <0.1 mg/mL | N/A | N/A |

TABLE 21c

Stability results for Naltrexone base

| Excipient used with Naltrexone Base | Chromatographic purity (% total area) | Sum of impurities (% total area) |
|---|---|---|
| Castor oil | 94.80% | 5.20% |
| Sesame oil | 93.60% | 6.40% |
| Ethyl oleate | 90.10% | 9.90% |
| PEG600 | 94.90% | 5.10% |

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

REFERENCES (HPTN), H.P.T.N. HPTN 083. A Phase 2b/3 Double Blind Safety and Efficacy Study of Injectable Cabotegravir Compared to Daily Oral Tenofovir Disoproxil Fumarate/Emtricitabine (TDF/FTC), for Pre-Exposure Prophylaxis in HIV-Uninfected Cisgender Men and Transgender Women who have Sex with Men. Available online.

(HPTN), H.P.T.N. HPTN 084. A Phase 3 Double Blind Safety and Efficacy Study of Long-Acting Injectable Cabotegravir Compared to Daily Oral TDF/FTC for Pre-Exposure Prophylaxis in HIV-Uninfected Women Available online.

Solorio, L., Carlson, A., Zhou, H., Exner, A. A. Implantable Drug Delivery Systems. In Engineering Polymer Systems for Improved Drug Delivery, First ed.; Bader, R. A., Putnam, D. A., Ed. John Wiley & Sons, Inc.: 2014; doi:10.1002/9781118747896.ch7.

Yang, W.-W.; Pierstorff, E. Reservoir-Based Polymer Drug Delivery Systems. Journal of Laboratory Automation 2012, 17, 50-58, doi:10.1177/2211068211428189. Langer, R. Implantable controlled release systems. Pharmacology & Therapeutics 1983, 21, 35-51, doi:https://doi.org/10.1016/0163-7258(83)90066-9.

Gunawardana, M.; Remedios-Chan, M.; Miller, C. S.; Fanter, R.; Yang, F.; Marzinke, M. A.; Hendrix, C. W.; Beliveau, M.; Moss, J. A.; Smith, T. J., et al. Pharmacokinetics of long-acting tenofovir alafenamide (GS-7340) subdermal implant for HIV prophylaxis. Antimicrobial agents and chemotherapy 2015, 59, 3913-3919, doi:10.1128/aac.00656-15.

Chua, C. Y. X.; Jain, P.; Ballerini, A.; Bruno, G.; Hood, R. L.; Gupte, M.; Gao, S.; Di Trani, N.; Susnjar, A.; Shelton, K., et al. Transcutaneously refillable nanofluidic implant achieves sustained level of tenofovir diphosphate for HIV pre-exposure prophylaxis. Journal of Controlled Release 2018, 286, 315-325, doi:https://doi.org/10.1016/j.jconrel.2018.08.010.

A New Collaboration for HIV Prevention, Available online.

Barrett, S. E.; Teller, R. S.; Forster, S. P.; Li, L.; Mackey, M. A.; Skomski, D.; Yang, Z.; Fillgrove, K. L.; Doto, G. J.; Wood, S. L., et al. Extended-Duration MK-8591-Eluting Implant as a Candidate for HIV Treatment and Prevention. Antimicrobial agents and chemotherapy 2018, 62, e01058-01018, doi:10.1128/aac.01058-18.

G. Pitt, C.; Chasalow, F.; Hibionada, Y. M.; M. Klimas, D.; J. Schindler, A. Aliphatic polyesters. I. The degradation of poly(ε-caprolactone) in vivo; 1981; Vol. 26, pp. 3779-3787.

Woodruff, M. A.; Hutmacher, D. W. The return of a forgotten polymer—Polycaprolactone in the 21st century. Progress in Polymer Science 2010, 35, 1217-1256, doi:https://doi.org/10.1016/j.progpolymsci.2010.04.002.

The invention claimed is:

1. A reservoir device comprising an active agent formulation contained within a reservoir, the reservoir defined by a biodegradable, permeable polymer membrane having a thickness of 100 µm to 300 µm, wherein the active agent formulation comprises an active agent and an excipient, wherein the excipient includes castor oil, wherein a mass ratio of active agent to excipient in the reservoir ranges from 1:1 to 3:1, wherein the active agent dissolves in the excipient to form an active agent solution, wherein a formation rate of the active agent solution is greater than a diffusion rate of the active agent solution through the polymer membrane, wherein the polymer membrane comprises polycaprolactone (PCL) at a molecular weight ranging from 15,000-140,000 Da, the polymer membrane allowing for diffusion of the active agent solution there through when positioned subcutaneously in a body of a subject, wherein the reservoir device is configured for an average release rate of the active agent ranging from 15 to 30 µg/day; and wherein the active agent comprises tenofovir alafenamide fumarate (TAF), 4'-ethynyl-2-fluoro-2'-deoxyadenosine (EFdA), levonorgestrel (LNG); etonogestrel (ENG), emtricitabine (FTC), tenofovir (TFV), tenofovir disoproxil fumarate (TDF), EFdA-alafenamide, bictegravir (BIC), tamoxifen citrate, naltrexone or combinations thereof.

2. The device of claim 1, wherein the permeable polymer membrane has a thickness of 200 μm to 300 μm.

3. The device of claim 1, wherein the reservoir comprises a first segment and a second segment, and wherein the first segment contains a first active agent formulation and the second segment contains a second active agent formulation, which is different from the first active agent formulation.

4. The device of claim 1, wherein the device has a cylindrical shape with a length between 10 mm and 50 mm.

5. The device of claim 1, wherein the polymer membrane has an initial molecular weight at implantation and wherein the membrane is configured such that the molecular weight of the membrane is reduced to a molecular weight ranging from 8 kDa to 3 kDa after the active agent is depleted from the device.

6. The device of claim 1, wherein the biodegradable, permeable polymer membrane is configured for the average release rate of the active agent ranging from 15 to 49 μg/day for at least 90 days, wherein the biodegradable, permeable polymer membrane is configured to substantially or fully degrade within a time period of 4 months to 2 years.

7. The device of claim 1, comprising LNG as the active agent in the formulation, wherein the device has a release profile of 30 μg/day for a time period of 90 days to 24 months in in-vitro conditions.

8. The device of claim 1, comprising ENG as the active agent, wherein the polymer membrane allows for diffusion of the active agent there through with zero-order release kinetics for a time period of at least 100 days when positioned subcutaneously in a body of a subject.

9. The device of claim 1, comprising 4'-ethynyl-2-fluoro-2'-deoxyadenosine (EFdA) as the active agent in the formulation, wherein the device has a length of 40 mm, a width of 2.5 mm, and a wall thickness of 100 μm.

\* \* \* \* \*